United States Patent
Oh et al.

(10) Patent No.: US 11,523,413 B2
(45) Date of Patent: Dec. 6, 2022

(54) METHOD AND APPARATUS FOR DETERMINING TIME DOMAIN RESOURCE AREA IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Jonghyun Bang, Gyeonggi-do (KR); Hyunseok Ryu, Gyeonggi-do (KR); Sungjin Park, Gyeonggi-do (KR); Cheolkyu Shin, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/865,777

(22) Filed: May 4, 2020

(65) Prior Publication Data
US 2020/0351919 A1    Nov. 5, 2020

(30) Foreign Application Priority Data

May 2, 2019   (KR) .......................... 10-2019-0051764
Nov. 4, 2019  (KR) .......................... 10-2019-0139618

(51) Int. Cl.
*H04W 72/12* (2009.01)
*H04W 16/14* (2009.01)
(Continued)

(52) U.S. Cl.
CPC ....... *H04W 72/1268* (2013.01); *H04W 16/14* (2013.01); *H04W 48/10* (2013.01); *H04W 74/006* (2013.01); *H04W 74/0808* (2013.01)

(58) Field of Classification Search
CPC . H04W 72/1268; H04W 16/14; H04W 48/10; H04W 74/006; H04W 74/0808;
(Continued)

(56) References Cited

U.S. PATENT DOCUMENTS

2020/0154471 A1*   5/2020   Sun .................. H04W 72/1284
2020/0280971 A1*   9/2020   Moon ................ H04L 5/0094
(Continued)

FOREIGN PATENT DOCUMENTS

KR    2020-012241    2/2020

*Primary Examiner* — Ayaz R Sheikh
*Assistant Examiner* — Louis Samara
(74) *Attorney, Agent, or Firm* — The Farrell Law Firm, P.C.

(57) ABSTRACT

The disclosure relates to a communication technique for convergence between a $5^{th}$-Generation (5G) communication system for supporting higher data rates beyond a $4^{th}$-Generation (4G) system and a technology for Internet of Things (IoT), and a system thereof. The disclosure may be applied to intelligent services (for example, smart homes, smart buildings, smart cities, smart cars or connected cars, health care, digital education, retail businesses, security and safety related services, etc.) based on the 5G communication technology and the IoT-related technology. Disclosed are a method and an apparatus for determining a time domain resource area allocation. A method of a terminal includes receiving, from a base station, downlink control information (DCI) including information indicating a channel occupancy (CO) duration of the base station; identifying a resource associated with a configured grant for an uplink signal within the CO duration; identifying a configuration for a symbol of the resource, in case that a slot format indicator (SFI) for the resource is not provided in the DCI; and transmitting, to the base station, the uplink signal in the resource based on the identified configuration.

20 Claims, 17 Drawing Sheets

(51) Int. Cl.
*H04W 48/10* (2009.01)
*H04W 74/08* (2009.01)
*H04W 74/00* (2009.01)

(58) Field of Classification Search
CPC ............ H04W 72/0446; H04W 72/14; H04W 74/0816; H04W 72/1284; H04L 5/0053; H04L 5/0094; H04L 5/0044; H04L 5/0012; H04L 5/0051; H04B 7/088
See application file for complete search history.

(56) References Cited

U.S. PATENT DOCUMENTS

| | | | |
|---|---|---|---|
| 2020/0305191 A1* | 9/2020 | Moon | H04W 72/1289 |
| 2020/0322932 A1* | 10/2020 | Kim | H04W 72/042 |
| 2020/0351847 A1* | 11/2020 | Kim | H04W 72/0446 |
| 2021/0235491 A1* | 7/2021 | Iyer | H04W 72/042 |
| 2021/0235496 A1* | 7/2021 | Park | H04L 5/0012 |
| 2021/0392685 A1* | 12/2021 | Myung | H04W 74/0816 |
| 2021/0400705 A1* | 12/2021 | Wu | H04W 74/0816 |

* cited by examiner

METHOD AND APPARATUS FOR DETERMINING TIME DOMAIN RESOURCE AREA IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2019-0051764 and 10-2019-0139618, which were filed in the Korean Intellectual Property Office on May 2, 2019 and Nov. 4, 2019, respectively, the entire disclosure of each of which is incorporated herein by reference.

BACKGROUND

1. Field

The disclosure relates generally to a wireless communication system and, more specifically, to a method and an apparatus for determining a time resource area of an uplink signal or a data channel, by a terminal, when transmitting an uplink signal in a wireless communication system.

2. Description of Related Art

To meet the increasing demand for wireless data traffic since deployment of $4^{th}$ generation (4G) communication systems, efforts have been made to develop an improved $5^{th}$ generation (5G) or pre-5G communication system. The 5G or pre-5G communication system may also be referred to as a "beyond 4G network communication system" or a "post long term evolution (LTE) system". A 5G communication system defined in a $3^{rd}$ generation partnership project (3GPP) may be referred to as a new radio (NR) system.

The 5G communication system is intended to be implemented in higher frequency (mmWave) bands, e.g., 60 GHz bands, in order to utilize higher data rates. To decrease propagation loss of the radio waves and increase the transmission distance, beamforming, massive multiple-input multiple-output (MIMO), full dimensional MIMO (FD-MIMO), array antennas, analog beamforming, and large-scale antenna techniques have been discussed and adopted in 5G communication systems.

In 5G communication systems, development for system network improvement is under way based on advanced small cells, cloud Radio Access Networks (RANs), ultra-dense networks, device-to-device (D2D) communication, wireless backhaul, moving networks, cooperative communication, coordinated multi-points (CoMPs), reception-end interference cancellation, etc.

In the 5G system, hybrid frequency shift keying (FSK) and quadrature amplitude modulation (QAM) Modulation (FQAM) and sliding window superposition coding (SWSC) have been developed as advanced coding modulation (ACM), and filter bank multi carrier (FBMC), non-orthogonal multiple access (NOMA), sparse code multiple access (SCMA), etc., have been developed as advanced access technologies.

The Internet is now evolving to the Internet of things (IoT) network in which distributed entities, i.e., things, exchange and process information. The Internet of everything (IoE), which is a combination of the IoT technology and big data processing technology has also emerged through connection with a cloud server.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have recently been researched for the connection between things. Such an IoT environment may provide intelligent Internet technology services that collect and analyze data generated among connected things. The IoT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, in a 5G communication system, such as a sensor network, M2M communication, and MTC may be implemented by techniques such as beamforming, MIMO, and array antennas. Application of a cloud radio access network (RAN) as the above-described big data processing technology may also be considered to be as an example of convergence between the 5G technology and the IoT technology.

With the development of a wireless communication system, various improvements for uplink transmission have been recently made, and there is an increasing demand for an improved time domain resource area allocation for an uplink.

SUMMARY

An aspect of the disclosure is to provide an apparatus and a method for determining a time resource area in a wireless communication system.

Another aspect of the disclosure is to provide an apparatus and method for determining a time resource area of an uplink signal or channel, and performing a channel access procedure in order to transmit an uplink signal or channel via an unlicensed band.

In accordance with an aspect of the disclosure, a method is provided for a terminal in a wireless communication system. The method includes receiving, from a base station, downlink control information (DCI) including information indicating a channel occupancy (CO) duration of the base station; identifying a resource associated with a configured grant for an uplink signal within the CO duration; identifying a configuration for a symbol of the resource, in case that a slot format indicator (SFI) for the resource is not provided in the DCI; and transmitting, to the base station, the uplink signal in the resource based on the identified configuration.

In accordance with another aspect of the disclosure, a terminal is provided for use in a wireless communication system. The terminal includes a transceiver; and a controller configured to receive, from a base station, via the transceiver, downlink control information (DCI) including information indicating a channel occupancy (CO) duration of the base station, identify a resource associated with a configured grant for an uplink signal within the CO duration, identify a configuration for a symbol of the resource, in case that a slot format indicator (SFI) for the resource is not provided in the DCI, and transmit, to the base station, via the receiver, the uplink signal in the resource based on the identified configuration.

In accordance with another aspect of the disclosure, a method is provided for a base station in a wireless communication system. The method includes transmitting, to a terminal, downlink control information (DCI) including information indicating a channel occupancy (CO) duration of the base station, wherein a slot format indicator (SFI) is not provided in the DCI; and receiving, from the terminal, a uplink signal in a resource associated with a configured grant for the uplink signal, in case that the resource is within the CO duration and a configuration for a symbol of the resource is identified by the terminal.

In accordance with another aspect of the disclosure, a base station (BS) is provided for use in a wireless communication system. The BS includes a transceiver; and a controller configured to transmit, to a terminal, via the transceiver, downlink control information (DCI) including information indicating a channel occupancy (CO) duration of the BS, wherein a slot format indicator (SFI) is not provided in the DCI; and receive, from the terminal, via the transceiver, an uplink signal in a resource associated with a configured grant for the uplink signal, in case that the resource is within the CO duration and a configuration for a symbol of the resource is identified by the terminal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
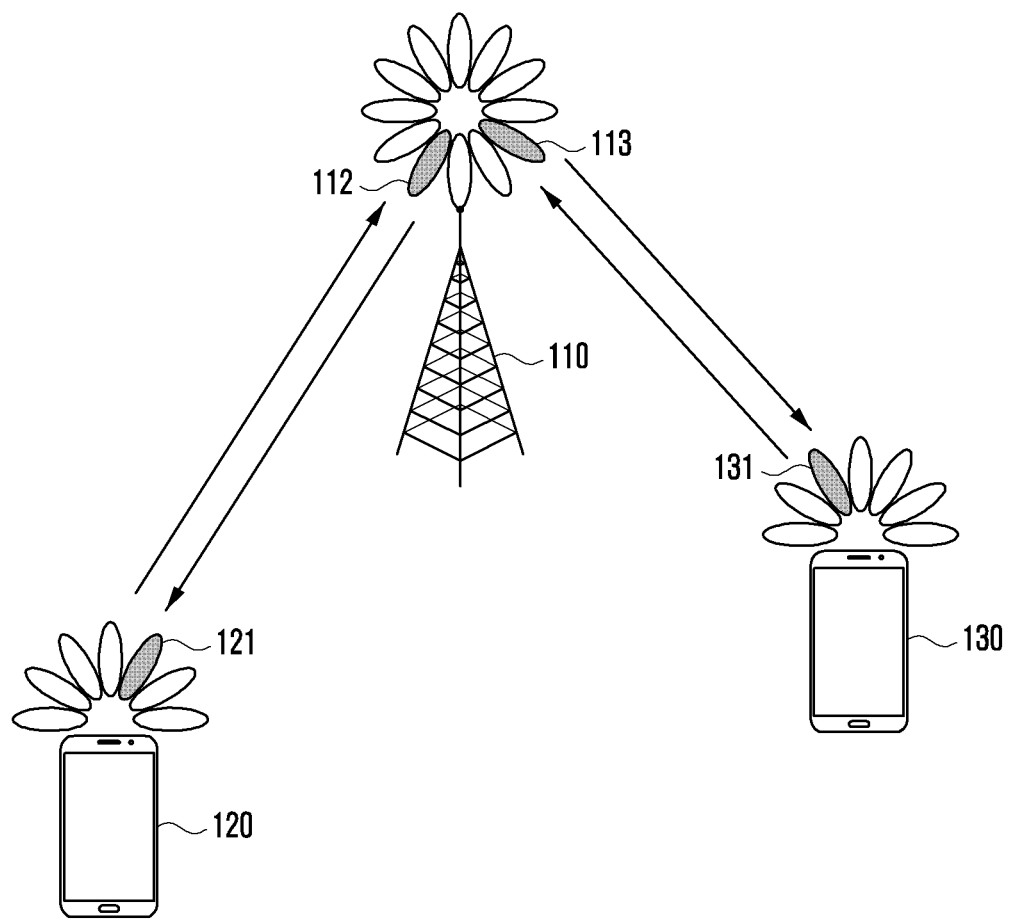
FIG. 1 illustrates a wireless communication system according to an embodiment.

Hereinafter, embodiments of the disclosure will be described in detail in conjunction with the accompanying drawings. In the following description of the disclosure, detailed descriptions of known functions or configurations incorporated herein will be omitted when they may make the subject matter of the disclosure rather unclear. The terms which will be described below are defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided to describe the disclosure and inform those skilled in the art of the scope of the disclosure, and the disclosure is defined only by the scope of the appended claims. Throughout the specification, the same or like reference numerals designate the same or like elements.

In the accompanying drawings, some elements may be exaggerated, omitted, or schematically illustrated. Further, the size of each element does not completely reflect the actual size. In the drawings, identical or corresponding elements are provided with identical reference numerals.

Each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur out of the order. For example, two blocks shown in succession may be executed substantially concurrently or the blocks may be executed in the reverse order, depending upon the functionality involved.

Herein, the term "unit" refers to a software element or a hardware element, such as a field programmable gate array (FPGA) or an application specific integrated circuit (ASIC), which performs a predetermined function. However, a "unit" is not limited to software or hardware. A "unit" may be constructed either to be stored in an addressable storage medium or to execute one or more processors. Therefore, a "unit" may include software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" may be either combined into a smaller number of elements, or a "unit", or divided into a larger number of elements, or a "unit", the elements and "units" or may be implemented to reproduce one or more central processing units (CPUs) within a device or a security multimedia card. Further, a "unit" may include one or more processors.

The term "unit", "-or/er", etc., may indicate a unit for processing at least one function or operation, and can be implemented by hardware, software, or a combination thereof.

A wireless communication system, which initially provided voice-oriented service, has evolved into a wideband wireless communication system that provides high-speed and high-quality packet data services, e.g., communication standards such as high speed packet access (HSPA), LTE or evolved universal terrestrial radio access (E-UTRA), and LTE-Advanced (LTE-A) of 3GPP, high rate packet data (HRPD) and an ultra-mobile broadband (UMB) of 3GPP2, and 802.16e of Institute of Electrical and Electronics Engineers (IEEE). Further, the communication standard of 5G or NR is being developed as a $5^{th}$ generation wireless communication system.

For a 5G communication system, in order to provide various services and support a high data transmission rate, various technologies including re-transmission in a code block group (CBG) unit, or transmitting an uplink signal without uplink scheduling information (e.g., grant-free uplink transmission) will be introduced. Therefore, to perform 5G communication via an unlicensed band, more efficient channel access procedures in consideration of various parameters are required.

As described above, in a wireless communication system including a 5G system, at least one service of an enhanced mobile broadband (eMBB), massive MTC (mMTC), and ultra-reliable and low-latency communication (URLLC) may be provided to a terminal. The above-described services may be provided to the same terminal during the same time interval. The eMBB may provide high-speed transmission of a large amount of data, the mMTC may minimize terminal power and provide access of multiple terminals, and the URLLC may provide high reliability and low latency. While these three types of services may be major scenarios in an LTE system or systems such as 5G/NR of beyond LTE, the services are not limited thereto. Further, a system providing a URLLC service may be referred to as a "URLLC system", and a system providing an eMBB service may be referred to as an "eMBB system". The terms "service" and "system" may be interchangeably used.

Hereinafter, a base station (BS) is described as performing resource assignment to a terminal, and may include at least one of an eNodeB (eNB), a Node B, a radio access unit, a BS controller, an access point (AP), a gNodeB (gNB), a wireless point, a transmission/reception point (TRP), or a node on a network, e.g., a 5G node. A terminal may include at least one of a user equipment (UE), a mobile station (MS), a subscriber station, a remote terminal, a wireless terminal, a user device, a cellular phone, a smartphone, a computer, or a multimedia system capable of performing a communication function. In the disclosure, downlink (DL) refers to a radio transmission path of a signal transmitted from a BS to a terminal, and uplink (UL) refers to a radio transmission path of a signal transmitted from a terminal to a BS. In addition, embodiments of the disclosure are described below by taking an LTE or LTE-A system as an example, and in order to describe a method and an apparatus proposed in the disclosure, the terms "physical channel" and "signal" of the conventional LTE or LTE-A system may be used. The embodiments of the disclosure may be applied to other communication systems having a similar technical background or channel form to that of the mobile communication system described in the disclosure. For example, a 5G mobile communication technology (5G or NR) being developed beyond LTE-A may be included thereto. Further, the embodiments of the disclosure may be applied to other communication systems through some modifications without largely departing from the range of the disclosure, based a determination of those skilled in the art.

A 5G system or an NR system, as a representative example of a broadband wireless communication system, adopts an orthogonal frequency division multiplexing (OFDM) scheme in DL, and adopts an OFDM scheme and a single carrier frequency division multiple access (SC-FDMA) or a discrete Fourier transform (DFT) spread OFDM (DFT-s-OFDM) scheme in UL. In a multiple-access scheme, data or control information may be distinguished per a user by assigning or managing time-frequency resources for carrying data or control information of each user, so that the time-frequency resources do not overlap, i.e., orthogonality is established.

An NR system adopts a hybrid automatic repeat request (HARQ) scheme of retransmitting corresponding data in a physical layer when a decoding failure occurs in an initial transmission. According to the HARQ scheme, when a receiver fails to accurately decode data, the receiver may transmit information (e.g., negative acknowledgement (NACK)) notifying a decoding failure, to a transmitter, so that the transmitter can retransmit the corresponding data in the physical layer. The receiver may combine data retransmitted by the transmitter with data having previously failed, thereby increasing data reception performance. According to the HARQ scheme, when the receiver accurately decodes data, the receiver may transmit information (e.g., acknowledgement (ACK)) notifying the successful decoding, to the transmitter, so that the transmitter can transmit new data.

Terms indicating a signal, terms indicating a channel, terms indicating control information, terms indicating network entities, terms indicating a configuration element of a device, etc., which are used hereinafter, are illustrated for the convenience of the description. Accordingly, the disclosure is not limited to terms to be described below, and other terms having the equivalent technical meaning may be used.

In addition, the disclosure describes various embodiments using terms used in some communication standards (e.g., 3GPP), but these terms are merely illustrative. Various embodiments may be easily modified and applied in other communication systems as well.

Various embodiments of the disclosure are described based on the NR system, but the content of the disclosure is not limited to the NR system, and may be applied to other wireless communication systems such as LTE, LTE-A, LTE-A-Pro, and 5G. Further, the content of the disclosure describes a system and a device for transmitting or receiving a signal using an unlicensed band, but may also be applied in a system operated in a licensed band.

Hereinafter, higher layer signaling or a higher signal may be a signal transmission method of transmitting a signal from a BS to a terminal using DL data channel of a physical layer, or a signal transmission method of transmitting a signal from a terminal to a BS using a UL data channel of a physical layer, and may include at least one method of transmitting a signal using radio resource control (RRC) signaling or packet data convergence protocol (PDCP) signaling, or a media access control (MAC) control element (CE) (MAC CE). In addition, the higher layer signaling or the higher signal may include system information, e.g., a system information block (SIB), which is commonly transmitted to a plurality of terminals, and information remaining after excluding a master information block (MIB) from among information transmitted through a physical broadcast channel (PBCH). Here, the MIB may be included in the higher signal.

FIG. 1 illustrates a wireless communication system according to an embodiment.

Referring to FIG. 1, the wireless communication system includes a BS 110, a terminal 120, and a terminal 130 as nodes using a wireless channel. Although FIG. 1 illustrates a single BS 110, the communication system may include multiple BSs.

The BS 110 provides radio access to the terminals 120 and 130. The BS 110 has a coverage defined as a predetermined geographical region based on a distance within which a signal is transmitted. The BS 110 may be referred to as an AP, an eNB, a gNB, a 5G node, a wireless point, a TRP, or other device having an equivalent technical meaning as the above-described terms, in addition to the BS.

Each of the terminals 120 and 130 may be used by a user, and performs communication with the BS 110 through a wireless channel. The terminals 120 and 130 may perform MTC, and may not be carried by a user. Each of the terminals 120 and 130 may be referred to as a UE, an MS, a subscriber station, a remote terminal, a wireless terminal, a user device, or other device having an equivalent technical meaning as those of the above-described terms, in addition the terminal.

Wireless communication environment may include wireless communication in an unlicensed band. The BS 110, the terminal 120, and the terminal 130 may transmit and receive a wireless signal in an unlicensed band (e.g., 5-7 GHz, or 64-71 GHz). In the unlicensed band, a cellular communication system and another communication system (e.g., a wireless local area network (WLAN)) may coexist. In order to guarantee the fairness between two communication systems, i.e., in order to prevent a situation in which one system exclusively uses a channel from occurring, the BS 110, the terminal 120, and the terminal 130 may perform a channel access procedure for the unlicensed band, e.g., listen-before-talk (LBT).

The BS 110, the terminal 120, and the terminal 130 may transmit and receive a wireless signal in a millimeter wave (mmWave) band (e.g., 28 GHz, 30 GHz, 38 GHz, and 60 GHz). To improve channel gain, the BS 110, the terminal 120, and the terminal 130 may perform beamforming, e.g., transmission beamforming and reception beamforming. That is, the BS 110, the terminal 120, and the terminal 130 may assign directivity to a transmission signal and a reception signal. To this end, the BS 110 and the terminals 120 and 130 may select serving beams through a beam search and a beam management procedure. After the serving cells are selected, communication may be performed through resources having a quasi co-located (QCL) relationship with the resources having transmitted the serving beams.

Figure 2:
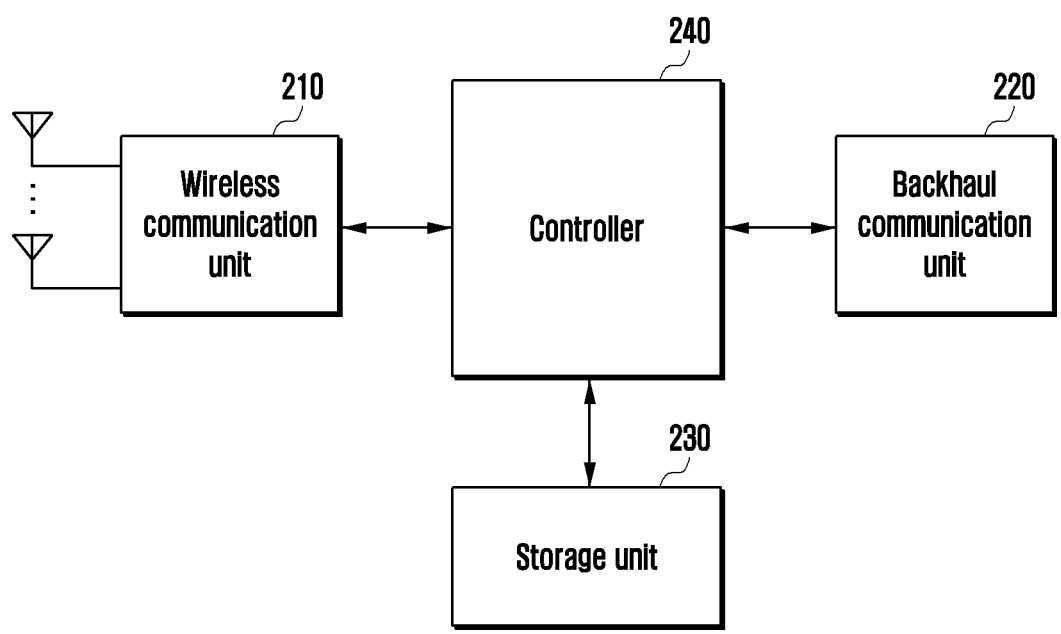
FIG. 2 illustrates a base station in a wireless communication system according to an embodiment.

FIG. 2 illustrates a BS in a wireless communication system according to an embodiment.

Referring to FIG. 2, the BS includes a wireless communication unit 210, a backhaul communication unit 220, a storage unit 230, and a controller 240.

The wireless communication unit 210 may perform functions for transmitting or receiving a signal through a wireless channel. The wireless communication unit 210 may perform a function of conversion between a baseband signal and a bitstream according to a physical layer standard of the system. When transmitting data, the wireless communication unit 210 may encode and modulate a transmission bitstream to generate complex symbols. When receiving data, the wireless communication unit 210 may demodulate and decode a baseband signal to restore a reception bitstream.

The wireless communication unit 210 may up-convert a baseband signal into a radio frequency (RF) band signal and then transmit the RF band signal through an antenna, and down-convert an RF band signal received through an antenna into a baseband signal. The wireless communication unit 210 may include a transmission filter, a reception filter, an amplifier, a mixer, an oscillator, a digital-to-analog convertor (DAC), an analog-to-digital convertor (ADC), etc. The wireless communication unit 210 may also include multiple transmission/reception paths. The wireless communication unit 210 may include at least one antenna array including multiple antenna elements.

In terms of hardware, the wireless communication unit 210 may include a digital unit and an analog unit. The analog unit may include multiple sub-units according to operating power, operating frequency, etc. The digital unit may be implemented by at least one processor (e.g., a digital signal processor (DSP)).

As described above, the wireless communication unit 210 may transmit and receive a signal. Accordingly, some or an entirety of the wireless communication unit 210 may be referred to as a "transmitter", a "receiver", or a "transceiver". In addition, transmission and reception performed through a wireless channel include the processing performed by the wireless communication unit 210 as described above. The wireless communication unit 210 may include at least one transceiver.

The backhaul communication unit 220 may provide an interface for performing communication with other nodes in the network. That is, the backhaul communication unit 220 may convert a bitstream transmitted from the BS to another node, e.g., another access node, another BS, a higher node, a core network, etc., into a physical signal, and convert a physical signal received from another node into a bitstream.

The storage unit 230 may store a basic program for operating a BS, an application program, and data such as configuration information. The storage unit 230 may include a memory, e.g., a volatile memory, a nonvolatile memory, or a combination of the volatile memory and the nonvolatile memory. The storage unit 230 may provide data stored according to a request from the controller 240.

The controller 240 may include at least one processor and may control overall operations of the BS. The controller 240 may transmit and receive a signal through the wireless communication unit 210 or the backhaul communication unit 220. In addition, the controller 240 records data in the storage unit 230 and reads the recorded data therefrom. The controller 240 may perform functions of a protocol stack required by the communication standard. The protocol stack may be included in the wireless communication unit 210.

The controller 240 may control the BS to perform operations according to embodiments to be described below. For example, the controller 240 may perform a channel access procedure in an unlicensed band. The wireless communication unit 210 may receive signals transmitted in the unlicensed band, and the controller 240 may compare the strength of the received signal with a threshold, and determine whether the unlicensed band is in an idle state, based on the comparison. In addition, the controller 240 may transmit a control signal to the terminal or receive a control signal from the terminal, through the wireless communication unit 210. The controller 240 may transmit data to the terminal, or receive data from the terminal through the wireless communication unit 210. The controller 240 may determine a transmission result with respect a signal transmitted to the terminal, based on the control signal or the data signal received from the terminal. The controller 240 may maintain or change a value of a contention window (hereinafter, referred to as contention window adjustment) for a channel access procedure, based on the transmission result, i.e., based on the reception result of the terminal with respect to the control signal or the data signal. The controller 240 may determine a reference slot to obtain a transmission result for the contention window adjustment. The controller 240 may determine a data channel for the contention window adjustment in the reference slot. The controller 240 may determine a reference control channel for the contention window adjustment in the reference slot. If the unlicensed band is determined to be in an idle state, the controller 240 may occupy the channel.

Figure 3:
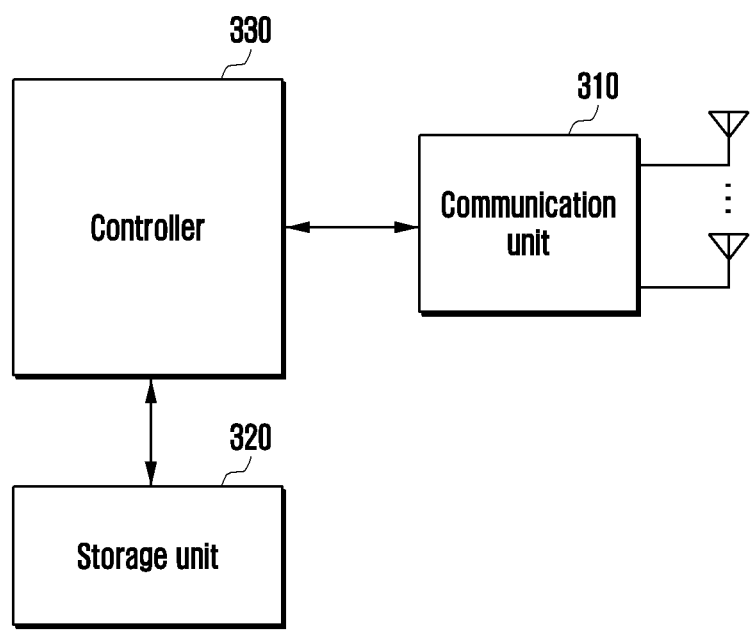
FIG. 3 illustrates a terminal in a wireless communication system according to an embodiment.

FIG. 3 illustrates a terminal in a wireless communication system according to an embodiment.

Referring to FIG. 3, the terminal includes a communication unit 310, a storage unit 320, and a controller 330.

The communication unit 310 may perform functions for transmitting or receiving a signal through a wireless channel. For example, the communication unit 310 performs a function of conversion between a baseband signal and a bitstream according to a physical layer standard of the system. When transmitting data, the communication unit 310 may encode and modulate a transmission bitstream to generate complex symbols. When receiving data, the communication unit 310 may demodulate and decode a baseband signal to restore a reception bitstream. In addition, the communication unit 310 may up-convert a baseband signal into an RF base signal and then transmit the RF band signal through an antenna, and down-convert an RF base signal received through an antenna into a baseband signal. The communication unit 310 may include a transmission filter, a reception filter, an amplifier, a mixer, an oscillator, a DAC, an ADC, etc.

In addition, the communication unit 310 may include multiple transmission/reception paths. Further, the communication unit 310 may include at least one antenna array including multiple antenna elements. In terms of hardware, the communication unit 310 may include a digital circuit and an analog circuit (e.g., a radio frequency integrated circuit (RFIC)). The digital circuit and the analog circuit may be implemented by one package. The communication unit 310 may also include multiple RF chains. The communication unit 310 may perform beamforming.

As described above, the communication unit 310 may transmit and receive a signal. Accordingly, some or an entirety of the communication unit 310 may be referred to as a "transmitter", a "receiver", or a "transceiver". In addition, hereinafter, transmission and reception performed through a wireless channel includes the processing performed by the communication unit 310 as described above. The communication unit 310 may include at least one transceiver.

The storage unit 320 may store a basic program for operating the terminal, an application program, and data such as configuration information. The storage unit 320 may include a memory, e.g., a volatile memory, a nonvolatile memory, or a combination of the volatile memory and the nonvolatile memory. The storage unit 320 may provide data stored according to a request from the controller 330.

The controller 330 may include at least one processor and may control overall operations of the terminal. For example, the controller 330 may transmit and receive a signal through the communication unit 310. The controller 330 records data in the storage unit 320 and reads the recorded data therefrom. The controller 330 may perform functions of a protocol stack required by the communication standard. To this end, the controller 330 may include at least one processor or a micro-processor, or may be a part of a processor.

A part of the communication unit 310 and/or the controller 330 may be referred to as a communication processor.

The controller 330 may control the terminal to perform operations according to embodiments described below. The controller 330 may receive a DL signal (a DL control signal or DL data) transmitted by the BS, through the communication unit 310. The controller 330 may determine a transmission result on the DL signal. The transmission result may include information relating to feedback on ACK, NACK, discontinuous transmission (DTX), etc., of the transmitted DL signal. The transmission result in the disclosure may be referred to as a reception state, a reception result, a decoding result, HARQ-ACK information, etc., of the DL signal. In addition, the controller 330 may transmit a UL signal as a response signal to the DL signal, to the BS through the communication unit 310. The UL signal may explicitly or implicitly include a transmission result on the DL signal.

The controller 330 may perform a channel access procedure in an unlicensed band. For example, the communication unit 310 may receive signals transmitted in the unlicensed band, and the controller 330 may compare the strength of the received signal with a threshold, and then determine whether the unlicensed band is in an idle state based on the comparison. The controller 330 may perform an access procedure for the unlicensed band to transmit a signal to the BS.

Figure 4:
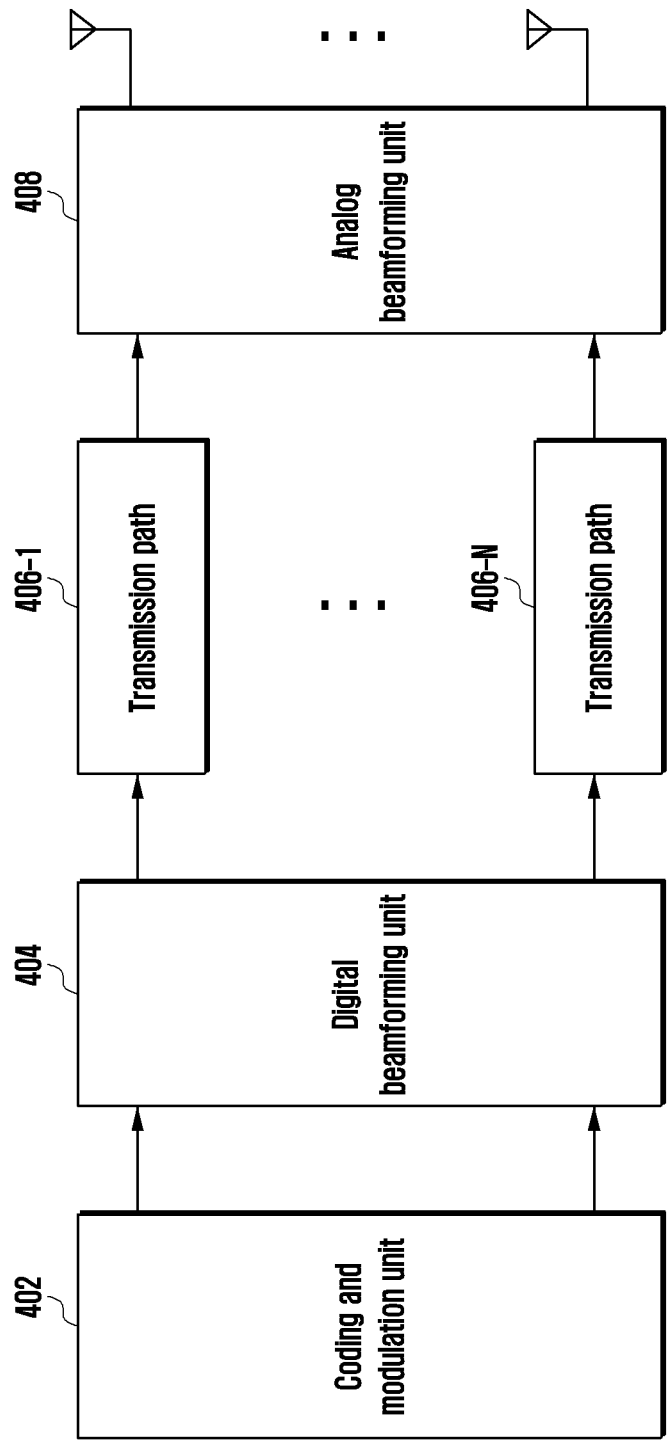
FIG. 4 illustrates a communication unit in a wireless communication system according to an embodiment.

FIG. 4 illustrates a communication unit in a wireless communication system according to an embodiment. Specifically, FIG. 4 illustrates an example of a communication unit that may be implemented as the wireless communication unit 210 of FIG. 2 and/or the communication unit 310 of FIG. 3.

Referring to FIG. 4, the communication unit includes a coding and modulation unit 402, a digital beamforming unit 404, multiple transmission paths 406-1 to 406-N, and an analog beamforming unit 408.

The coding and modulation unit 402 may perform channel encoding. For the channel encoding, at least one of a low density parity check (LDPC) code, a convolution code, and a polar code may be used. The coding and modulation unit 402 may perform constellation mapping to generate complex symbols.

The digital beamforming unit 404 may perform beamforming on a digital signal (e.g., complex symbols). The digital beamforming unit 404 may multiply the modulated symbols by beamforming weights. The beamforming weights are used to change the magnitude or the phase of a signal, and may be referred to as a "precoding matrix", a "precoder", etc. The digital beamforming unit 404 may output the modulated symbols having gone through the digital beamforming to the multiple transmission paths 406-1 to 406-N. According to a MIMO transmission technique, the modulated symbols may be multiplexed, or the same modulated symbols may be provided to the multiple transmission paths 406-1 to 406-N.

The multiple transmission paths 406-1 to 406-N may convert the digital signals having gone through the digital beamforming into analog signals. Each of the multiple transmission paths 406-1 to 406-N may include an inverse Fourier transform (IFFT) calculator, a cyclic prefix (CP) inserter, a DAC, and an up-converter. The CP inserter may be used for an OFDM scheme, and may be excluded when another physical layer scheme (e.g., an FBMC) is applied. That is, the multiple transmission paths 406-1 to 406-N may provide an independent signal processing process with respect to multiple streams generated by the digital beamforming. However, according to an implementation method, a part of elements of the multiple transmission paths 406-1 to 406-N may be shared.

The analog beamforming unit 408 may perform beamforming on an analog signal. The analog beamforming unit 408 may multiply analog signals by beamforming weights, which are used to change the magnitude and the phase of a signal.

According to a connection structure between the multiple transmission paths 406-1 to 406-N and antennas, the analog beamforming unit 408 may be configured in various ways. For example, each of the multiple transmission paths 406-1 to 406-N may be connected to one antenna array, the multiple transmission paths 406-1 to 406-N may be connected to one antenna array, or the multiple transmission paths 406-1 to 406-N may be adaptively connected to one antenna array or connected to two or more antenna arrays.

In consideration of various services and requirements, in the 5G system, a frame structure should be flexibly defined. For example, each service may have different subcarrier spacings (SCSs) according to the requirements. A current 5G communication system may support a plurality of SCSs, and each of the SCSs may be determined from Equation (1).

$$\Delta f = f_o * 2^m \quad (1)$$

In Equation (1), $f_0$ indicates a default SCS of the system, m indicates a scaling factor that is an integer, and $\Delta f$ indicates an SCS. For example, when $f_0$ is 15 kHz, a set of SCSs that the 5G communication system can have may include at least one of 3.75 kHz, 7.5 kHz, 15 kHz, 30 kHz, 60 kHz, 120 kHz, 240 kHz, and 480 kHz. An available set of SCSs may vary according to frequency bands. For example, in a frequency band less than 7 GHz, at least one of SCSs of 3.75 kHz, 7.5 kHz, 15 kHz, 30 kHz, and 60 kHz may be used, and in a frequency band greater than or equal to 7 GHz, at least one of SCSs of 60 kHz, 120 kHz, 240 kHz or higher may be used.

The length of a corresponding OFDM symbol may vary according to a SCS constituting an OFDM symbol because the SCS and the length of the OFDM symbol have an inverse relationship. For example, when the SCS increases by two times, the length of the symbol is shortened by a half, and inversely, when the SCS decreases by a half, the length of the symbol is lengthened by two times.

Figure 5:
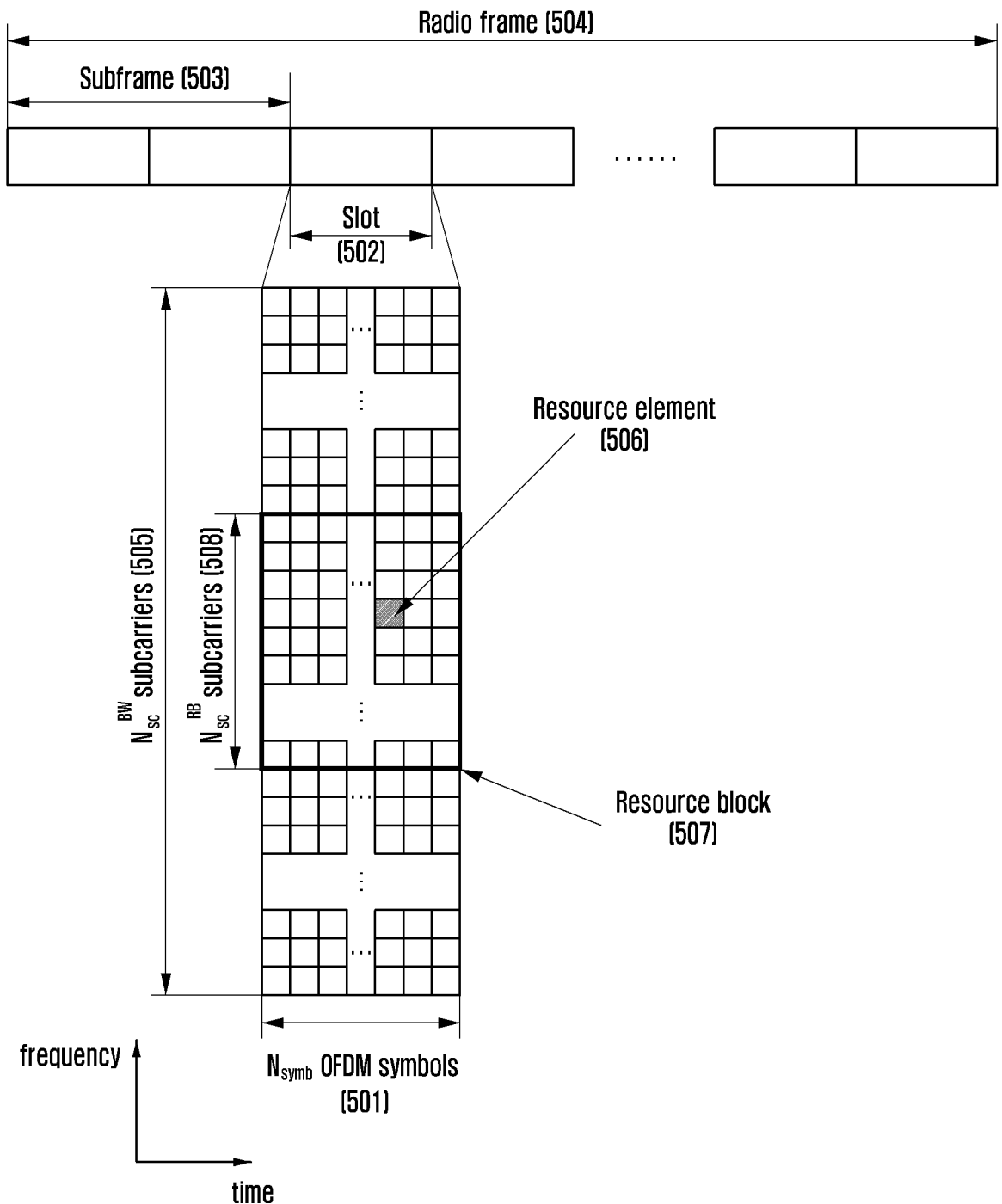
FIG. 5 illustrates a radio resource area in a wireless communication system according to an embodiment.

FIG. 5 illustrates a radio resource area in a wireless communication system according to an embodiment.

Referring to FIG. 5, a horizontal axis represents a time domain, and a vertical axis represents a frequency domain in the radio resource area. In the time domain, a minimum transmission unit may be an OFDM and/or a DFT-spread-OFDM (DFT-s-OFDM) symbol, and $N_{symb}$ OFDM and/or DFT-s-OFDM symbols 501 may be gathered to constitute one slot 502. The OFDM symbol may include a symbol for transmitting or receiving a signal using an OFDM multiplexing scheme, and the DFT-s-OFDM symbol may include a symbol for transmitting or receiving a signal using a DFT-s-OFDM or a single carrier frequency division multiple access (SC-FDMA) multiplexing scheme. For the convenience of the description, an embodiment relating to an OFDM symbol will be described, but the embodiment may also be applicable to a DFT-s-OFDM symbol. In addition, embodiments relating to DL signal transmission or reception will be described, but the embodiments may also be applicable to UL signal transmission or reception.

If an SCS is 15 kHZ, one slot 502 may constitute one subframe 503, unlike FIG. 5, and the length of each of the slot 502 and the subframe 503 may be 1 ms. The number of slots 502 constituting one subframe 503 and the length of the slot 502 may vary according to the SCS. For example, if the SCS is 30 kHZ, two slots may constitute one subframe 503. In this case, the length of the slot is 0.5 ms, and the length of the subframe 503 is 1 ms. In addition, a radio frame 504 may be a time domain interval including 10 subframes. A minimum transmission unit in the frequency domain is a subcarrier, and a carrier bandwidth constituting a resource grid may include $N_{sc}^{BW}$ subcarriers 505 in total.

However, the SCS, the number of slots 502 included in the subframe 503, the length of the slot 502, and the length of the subframe 503 may be variably applied. For example, in an LTE system, the SCS may be 15 kHz, and two slots may constitute one subframe 503. The length of the slot 502 may be 0.5 ms, and the length of the subframe 503 may be 1 ms. However, in an NR system, a spacing carrier (μ) may be one of 15 k Hz, 30 kHz, 60 kHz, 120 kHz, and 240 kHz, and the number of slots included in one subframe may be 1, 2, 4, 8, or 16, according to the spacing carrier (μ).

A basic unit of a resource in the time-frequency domain may be a resource element (RE) 506, and the RE 506 may be expressed as an OFDM symbol index and a subcarrier index. A resource block (RB) may include a plurality of REs.

In an LTE system, an RB (or a physical RB (PRB)) may be defined as $N_{symb}$ consecutive OFDM symbols in the time domain, and $N_{SC}^{RB}$ consecutive subcarriers in the frequency domain. The number of symbols included in one RB may be 14 ($N_{symb}$=14), the number of subcarriers may be 12 ($N_{SC}^{RB}$=12), the number of symbols included in one RB may be 7 ($N_{symb}$=7), the number of subcarriers may be 12 ($N_{SC}^{RB}$=12), and the number of RBs ($N_{RB}$) may change according to the bandwidth of a system transmission band.

In an NR system, an RB 507 may be defined as $N_{SC}^{RB}$ consecutive subcarriers in the frequency domain. The number of subcarriers may be 12 ($N_{SC}^{RB}$=12). The frequency domain may include a common RB (CRB), and a PRB may be defined in a bandwidth part (BWP) on the frequency domain. CRB numbering and PRB numbering may be determined differently according to the SCS.

DL control information may be transmitted within first N OFDM symbol(s) in a slot. In general, N may be configured such that N={1, 2, 3}, and a terminal may be configured from a BS with respect to the number of symbols on which DL control information can be transmitted through higher layer signaling. In addition, according to the amount of control information to be transmitted from a current slot, the BS may change, for each slot, the number of symbols on which DL control information can be transmitted from a slot, and may transmit information relating to the number of symbols to the terminal through a separate DL control channel.

In the NR and/or LTE system, scheduling information relating to DL data or UL data may be transmitted from the BS to the terminal through DL control information (DCI). The DCI may be defined according to various formats, and each format may indicate whether the DCI includes UL data scheduling information (e.g., a UL grant), whether the DCI includes DL data scheduling information (e.g., a DL grant), whether the DCI is compact DCI, the control information of which has a small size, or fallback DCI, whether spatial multiplexing using a multiplexing antenna is applied, and/or whether the DCI is DCI for controlling power.

For example, a DCI format (e.g., DCI format 1_0 of NR), which is DL data scheduling control information (a DL grant), may include at least one of the following pieces of control information. NR DCI format 1_0 may include scheduling with respect to the DL data.

DCI format identifier: An identifier for identifying a format of DCI.
Frequency domain resource assignment: An indicator of an RB assigned to data transmission.
Time domain resource assignment: An indicator of a slot and a symbol assigned to data transmission.
Virtual resource block (VRB)-to-PRB mapping: An indicator of whether to apply VRB mapping scheme.
Modulation and coding scheme (MCS): An indicator of a modulation scheme used for data transmission and the size of transport block that is data to be transmitted.
New data indicator: An indicator of whether it is HARQ initial transmission or retransmission.
Redundancy version: An indicator of a redundancy version of HARQ.
HARQ process number: An indicator of a process number of HARQ.
Physical DL shared channel (PDSCH) assignment information (DL assignment index): An indication to the terminal with respect to the number of PDSCH reception results to be reported (e.g., the number of HARQ-ACK) to the BS.
Transmit power control (TPC) command for a physical UL control channel (PUCCH): An indicator of transmission power control for a PUCCH that is a UL control channel.
PUCCH resource indicator: An indicator of a PUCCH resource to be used for a HARQ-ACK report including a reception result on a PDSCH configured through corresponding DCI.
PDSCH-to-HARQ_feedback timing indicator: An indicator of slot or symbol information on which a PUCCH is to be transmitted for a HARQ-ACK report including a reception result on a PDSCH configured through corresponding DCI.

The DCI may be transmitted via a physical downlink control channel (PDCCH) (or control information) that is a DL physical control channel, or an enhanced PDCCH (EPDCCH) (or enhanced control information), after passing through a channel coding and modulation process. The transmission or reception of the PDCCH or the EPDCCH may be understood as transmission or reception of DCI via the PDCCH or the EPDCCH, and the transmission or reception of a PDSCH may be understood as transmission or reception of DL data via the PDSCH.

A cyclic redundancy check (CRC) may be added to the DCI, which is scrambled by an independent specific radio network temporary identifier (RNTI) (or terminal identifier cell RNTI (C-RNTI)) with respect to each terminal, and the DCI for each terminal may go through channel coding and may then be configured as an independent PDCCH to be transmitted. The PDCCH in the time domain may be transmitted during a control channel transmission period. A mapping location of the PDCCH in the frequency domain may be at least determined by an identifier (ID) of each terminal, and the PDCCH may be transmitted through the entire system transmission bandwidth or a configured frequency bandwidth among system transmission bandwidths. Alternatively, the mapping location of the PDCCH in the frequency domain may be configured by higher layer signaling.

DL data may be transmitted via a PDSCH that is a physical channel for transmitting DL data. The PDSCH may be transmitted after the control channel transmission period, and scheduling information such as a mapping location of the PDSCH and a modulation scheme for the PDSCH in the frequency domain may be determined by the DCI transmitted via the PDCCH.

The BS may notify the terminal of a modulation scheme applied to the PDSCH to be transmitted and a transport block size (TBS) to be transmitted by using an MCS from control information constituting the DCI. For example, the MCS includes 5 bits. The TBS corresponds to the size of a transport block (TB) before channel coding for error correction is applied to the data to be transmitted by the BS.

The modulation scheme supported for UL and DL data transmission in the NR system may include at least one of quadrature phase shift keying (QPSK), 16QAM, 64QAM, and 256QAM, and each modulation order ($Q_m$) may be 2, 4, 6, and 8 For QPSK modulation, 2 bits per symbol may be transmitted, for 16QAM modulation, 4 bits per symbol may be transmitted, for 64QAM modulation, 6 bits per symbol may be transmitted, and for 256QAM modulation, 8 bits per symbol may be transmitted. In addition, a modulation scheme of 256QAM or more may be used according to system modification.

In a system that performs communication in an unlicensed band, a communication device (the BS or the terminal) for transmitting a signal via the unlicensed band may perform, before signal transmission, a channel access procedure or LBT with respect to the unlicensed band in which communication is to be performed. When it is determined that the unlicensed band is in an idle state according to the channel access procedure, the communication device may access the unlicensed band and perform signal transmission. When it is determined that the unlicensed band is not in the idle state according to the channel access procedure, the communication device may not perform signal transmission.

The channel access procedure in the unlicensed band may be divided according to whether a start time of the channel access procedure of the communication device is fixed (frame-based equipment (FBE)) or variable (load-based equipment). Instead of using the start time of the channel access procedure, the communication device may be determined to be an FBE device or an LBE device according to whether a transmit/receive structure of the communication device has a single period or not. The fixed start time of the channel access procedure indicates that the channel access procedure of the communication device may be periodically started according to a predefined period or a period declared or configured by the communication device. As another example, the fixed start time of the channel access procedure may indicate that the transmit/receive structure of the communication device has a single period. The variable start time of the channel access procedure indicates that the start time point of the channel access procedure may be anytime when the communication device is to transmit a signal via the unlicensed band. As another example, the variable start time point of the channel access procedure may indicate that the transmit/receive structure of the communication device may be determined as needed without having a single period.

Hereinafter, a channel access procedure (a traffic-based channel access procedure or an LBE-based channel access procedure) in a case where the start time of a channel access procedure is variable (LBE) will be described.

For the channel access procedure in the unlicensed band, a communication device may measure a signal strength received via an unlicensed band during the fixed time or the time calculated according to a predefined rule (e.g., the time calculated through at least one random value selected by a BS or a terminal). The communication device may compare the measured signal strength with a predefined threshold or a threshold calculated by a function for determining the magnitude of a reception signal strength according to at least one variable of a channel bandwidth, a signal bandwidth through which a signal to be transmitted is transmitted, and/or the magnitude of the transmission power, and then determine whether the unlicensed band is in an idle state.

The communication device may measure the signal strength received during X μs (e.g., 25 μs) immediately before the time point at which the signal is to be transmitted, determine that the unlicensed band is in an idle state when the measured signal strength is less than threshold T (e.g., −72 dBm), which is predefined or pre-calculated, and transmit the configured signal. The maximum time during which consecutive signal transmission is possible after the channel access procedure may be limited according to the maximum channel occupancy time which is defined per country, region, and frequency bandwidth, according to each unlicensed band, and may also be limited according to a type of the communication device (e.g., a BS or a terminal, or a master device or a slave device). For example, in Japan, a BS or a terminal in a 5 GHz unlicensed band may occupy a channel for a maximum of 4 ms without an additional channel access procedure and transmit a signal.

When a BS or a terminal is to transmit a DL or a UL signal via an unlicensed band, a channel access procedure that may be performed by the BS or the terminal may be divided into at least the following types:

Type 1: UL or DL signal transmission after performing channel access procedure for variable time Type 2: UL or DL signal transmission after performing channel access procedure for fixed time Type 3: UL or DL signal transmission without performing channel access procedure A transmission device (e.g., a BS or a terminal) that is to transmit a signal via an unlicensed band may determine a scheme (or type) of a channel access procedure according to a type of signal to be transmitted. In the 3GPP, an LBT procedure, may be divided into four categories. The four categories include a first category, which is a scheme of not performing LBT, a second category, which is a scheme of performing LBT without random back-off, a third category, which is a scheme of performing LBT through random back-off in a contention window having a fixed size, and a fourth category, which is a scheme of performing LBT through random back-off in a contention window having a variable size. Type 1, type 2, and type 3 may illustrate the third and the fourth category, the second category, and the first category, respectively. In this case, the second category or type 2, which is a type of a channel access procedure performed for the fixed time, may be divided into at least one type according to fixed time during which a channel access procedure is performed. For example, type 2 may be divided into a type of performing a channel access procedure for fixed time of A μs (e.g., 25 μs) and a type of performing a channel access procedure for fixed time of B μs (e.g., 16 μs).

Hereinafter, for the convenience of the description, it will be assumed that the transmission device is a BS, and the terms transmission device and the BS may be used interchangeably.

When the BS is to transmit a DL signal including a DL data channel via an unlicensed band, the BS may perform a type 1 channel access procedure. When the BS is to transmit a DL signal not including a DL data channel via an unlicensed band, e.g., a synchronization signal or a DL control channel, the BS may perform a type 2 channel access procedure and transmit a DL signal.

In this case, a scheme of the channel access procedure may be determined according to a transmission length of a signal to be transmitted via the unlicensed band or the length of time or interval during which the unlicensed band is occupied and used. Generally, the channel access procedure may be performed for a longer time by the scheme of type 1 compared to the scheme of type 2. When the communication device is to transmit a signal for a short time interval or for a time less than the reference time (e.g., X ms or Y symbol), a type 2 channel access procedure may be performed. However, when the communication device is to transmit a signal for a long time interval or for a time that is greater than or equal to the reference time (e.g., X ms or Y symbol), a type 1 channel access procedure may be performed. Accordingly, different channel access procedures may be performed according to unlicensed band usage time.

If the transmission device performs a type 1 channel access procedure according to at least one of the above-described conditions, the transmission device which is to transmit a signal via an unlicensed band may determine a channel access priority class (or a channel access priority) according to a quality of a service class identifier (QCI) of the signal to be transmitted via the unlicensed band. The transmission device may perform, with respect to the determined channel access priority class, the channel access procedure by using at least one of configuration values predefined as shown in Table 1 below.

Table 1 shows an example of a mapping relationship between a channel access priority class and a QCI.

For example, QCI 1, 2, and 4 may indicate QCI values for services such as conversational voice, a conversational video (live streaming), and a non-conversational video (buffered streaming), respectively. When transmitting a signal for a service which does not match the QCI in Table 1 via the unlicensed band, the transmission device may select a QCI closest to the service and the QCI in Table 1, and select a channel access priority class therefor.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | ~ |

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31 63} |
| 4 | 7 | 15 | 1023 | 8 or 10 ms | {15, 31 63, 127, 255, 511, 1023} |

A parameter value for a channel access priority class may be determined as shown in Table 2 below.

The parameter value may include a defer duration, a set of a contention window value or size (CW_p), a minimum and a maximum value of a contention window (CW_min,p and CW_max,p), and a maximum channel occupancy time (T_mcot,p), according to the determined channel access priority (p). Table 2 shows a parameter value according to the channel access priority class for the DL.

Figure 6:
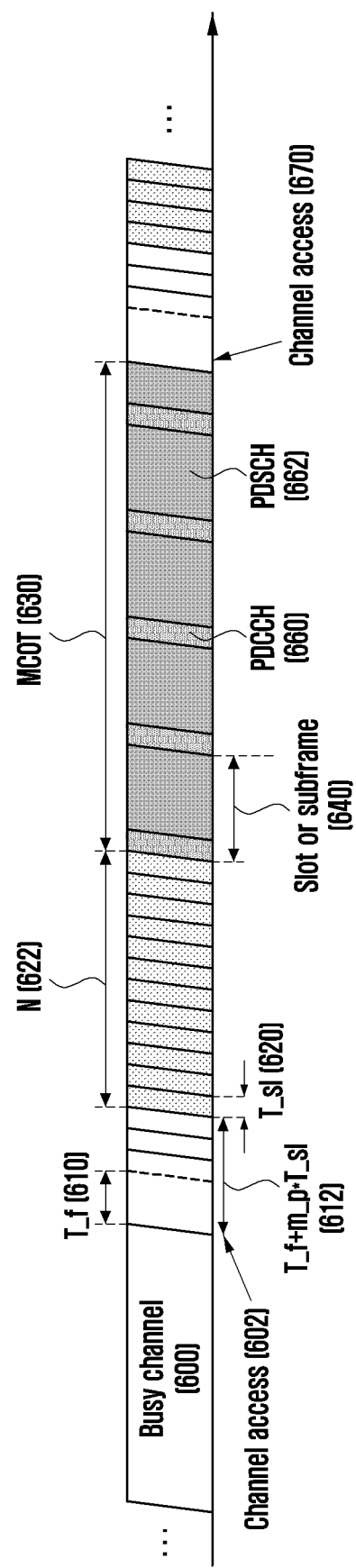
FIG. 6 illustrates a channel access procedure in an unlicensed band in a wireless communication system according to an embodiment.

FIG. 6 illustrates a channel access procedure in an unlicensed band in a wireless communication system according to an embodiment. Specifically, FIG. 6 describes is a situation in which a BS performs a channel access procedure in order to occupy an unlicensed band.

Referring to FIG. 6, the BS which is to transmit a DL signal via an unlicensed band may perform the channel access procedure for the minimum T_f+m_p*T_sl time (e.g., a defer duration 612) with respect to the unlicensed band. When the BS is to perform the channel access procedure by channel access priority class 3 (p=3), the size of T_f+m_p*T_sl may be configured by using m_p=3 with respect to the size of a defer duration (T_f+m_p*T_sl) required to perform the channel access procedure. T_f indicates a fixed value (e.g., a duration 610) of 16 μs, the first T_sl time is to be in an idle state, and the BS may not perform the channel access procedure at remaining time (T_f-T_sl) after the T_sl time within the T_f time. Even though the BS performs the channel access procedure at the remaining time (T_f-T_sl), a result obtained from the channel access procedure may not be used. That is, the T_f-T_sl time corresponds to time for delaying the channel access procedure by the BS.

When it is determined that the unlicensed band is in an idle state at all of m_p*T_sl time, N may be N−1 (N=N−1). N may be selected as an arbitrary integer value between 0 and the value (CW_p) of the contention window at the time of performing the channel access procedure. For channel access priority class 3, the minimum contention window value and the maximum contention window value is 15 and 63, respectively. When it is determined that the unlicensed band is in an idle state at the defer duration and an additional duration in which the channel access procedure is performed, the BS may transmit a signal via the unlicensed band for T_mcot,p time (8 ms).

Table 2 shows a channel access priority class (or channel access priority) in DL. For the convenience of the description, embodiments will be described based on the DL channel access priority class. For UL, the same channel access priority class in Table 2 may be used, or a separate channel access priority class may be used for UL transmission.

The initial contention window value (CW_p) is the minimum contention window (CW_min,p). The BS which has selected the value of N may perform the channel access procedure in T_sl duration (e.g., a slot duration 620), change the value to N=N−1 when the unlicensed band is determined to be in an idle state through the channel access procedure performed in the T_sl duration, and transmit a signal via the unlicensed band for the maximum T_mcot,p time (e.g., a maximum channel occupancy time (MCOT) 630) when N=0. When the unlicensed band determined through the channel access procedure at T_sl time is not in an idle state, the BS may not change the value of N and may perform the channel access procedure again.

The size of contention window (CW_p) value may be changed or maintained according to the ratio Z of NACK among reception results (ACK/NACK) with respect to the DL data transmitted or reported to the BS by at least one terminal which has received DL data transmitted through a DL data channel in a reference subframe, a reference slot, or a reference transmission time interval (TTI). The reference subframe, the reference slot, or the reference TTI may be determined as a first subframe, slot, or TTI of a DL signal transmission interval during which the BS has most recently transmitted the signal via the unlicensed band at a time when the BS starts the channel access procedure, at a time when the BS selects the value of N to perform the channel access procedure, or immediately before the above-mentioned two times, MCOT, or a start subframe, a start slot, or a start TTI of the transmission interval.

Referring to FIG. 6, in order to occupy the unlicensed band, the BS may try channel access. The first slot (or a start slot in which the channel occupancy interval starts), subframe, or TTI 640, of a DL signal transmission interval (MCOT 630) during which the BS has most recently transmitted the signal via the unlicensed band at a time point 670 when the channel access procedure starts, at a time point when the BS selects the value of N in order to perform the channel access procedure, or immediately therebefore may be defined as a reference slot, a reference subframe, or a reference TTI. Specifically, the reference slot may be defined as one or more consecutive slots including a first slot, among all slots in the MCOT 630, by which a signal is transmitted. In addition, when the MCOT starts from a symbol subsequent to the first symbol of the slot, slots including a slot from which the DL signal transmission starts and a slot subsequent to the slot from which the DL signal transmission starts may be defined as the reference slot. When a ratio of NACKs among reception results with respect to DL data transmitted or reported to a BS by at least one terminal which has received DL data transmitted through a DL data channel in these reference slots is Z or higher, the BS may determine, as the contention window used for the channel access procedure 670 of the BS, a contention window, the value or the size of which is largest below that of the contention window having been used for the previous channel access procedure 602. Accordingly, the BS may increase the size of the contention window used for the channel access procedure 602. The BS may select the value of N 622 within a range defined according to the increased size of the contention window to perform the next channel access procedure 670.

When the BS fails to obtain a reception result with respect to the DL data channel transmitted in the reference slot of the MCOT 630, e.g., when a time interval between the reference slot and the time point 670 at which the BS starts the channel access procedure is n slots or symbols or less (i.e., when the BS starts the channel access procedure before the minimum time at which the terminal can report the reception result with respect to the DL data channel transmitted in the reference slot to the BS), the first slot of the most recent transmission DL signal transmission time interval at which the signal is transmitted before the MCOT 630 may be a reference slot.

When the BS fails to receive, from the terminal, the reception result with respect to the DL data transmitted from the reference slot 640, at the time point 670 at which the BS starts the channel access procedure, at the time point at which the BS selects the value of N to perform the channel access procedure, or immediately therebefore, the BS may determine the contention window by using the DL data reception result obtained by the terminal with respect to the reference slot in the most recently transmitted DL signal transmission time interval among the reception results obtained with respect to the DL data channel received in advance from the terminals. The BS may determine the size of the contention window used for the channel access procedure 670, by using the DL data reception result received from the terminals with respect to the DL data transmitted through the DL data channel in the reference slot.

The BS that has transmitted the DL signal through the channel access procedure (e.g., CW_p=15) configured according to channel access priority class 3 (p=3) may increase the value of the contention window from the initial value (CW_p=15) to the next contention window value (CW_p=31) when 80% or more of the reception results with respect to the DL data transmitted to the terminal through the DL data channel in the reference slot among the DL signals transmitted via the unlicensed band are determined to be NACKs. The ratio value 80% is illustrative and other modifications may be possible.

When it is not determined that 80% of the reception results are NACKs among the reception results, the BS may maintain the value of the contention window as the existing value or change the value to the initial value of the contention window. Changing the contention window may be commonly applied to all channel access priority classes, or to only a channel access priority class used for the channel access procedure. A method of determining the reception result that is valid for the determination on the changing the size of the contention window among the reception results on the DL data transmitted or reported to the BS by the terminal with respect to the DL data transmitted through the DL data channel in the reference slot where changing the size of the contention window is determined, i.e., a method of determining the value of Z, may be performed as follows.

When transmitting at least one codeword or TB to at least one terminal in the reference slot, the BS may determine the value of Z according to the ratio of NACKs among the reception results transmitted or reported by the terminal with respect to the TBs received by the terminal in the reference slot. For example, when two codewords or two TBs are transmitted to one terminal in the reference slot, the BS may receive the reception result or the report on the reception result of the DL data signal with respect to the two TBs, from the terminal. When the ratio Z of NACKs of two reception results is greater than or equal to a threshold (e.g., Z=80%) configured between the BS and the terminal, the BS may change or increase the size of the contention window.

When the terminal bundles the reception result of the DL data with respect to at least one slot (e.g., M slots) including the reference slot to transmit or report the reception result to the BS, the BS may determine that the terminal has transmitted M reception results. In addition, the BS may determine the value of Z according to the ratio of NACK among the M reception results, and change, maintain, or initialize the size of the contention window.

When a reference slot is the second slot of two slots included in one subframe, or when the DL signal is transmitted starting from a symbol subsequent to the first symbol in the reference slot, the reference slot and the subsequent slot may be determined to be a reference slot, and the value of Z may be determined according to the ratio of NACK among the reception results transmitted or reported by the terminal to the BS with respect to the DL data received in the reference slot.

In addition, when scheduling information or DL control information relating to the DL data channel transmitted by the BS is transmitted in the same cell or frequency band as a cell or frequency band on which the DL data channel is transmitted, when it is determined that the terminal has not transmitted the reception result relating to the DL data received in the reference slot, or the reception result relating to the DL data transmitted by the terminal is determined to be at least one of DTX, NACK/DTX, or any state, the BS may determine the reception result as NACK to determine the value of Z.

When scheduling information or DCI relating to the DL data channel transmitted by the BS is transmitted via an unlicensed band, but is transmitted in a different cell or a different frequency from a cell on which the DL data channel is transmitted, when it is determined that the terminal has not transmitted the reception result relating to the DL data received in the reference slot, or the reception result relating to the DL data transmitted by the terminal is determined to be at least one of discontinuous transmission (DTX), NACK/DTX, or any state, the BS may determine the reception result as NACK to determine the value of Z.

When scheduling information or DCI relating to the DL data channel transmitted by the BS is transmitted via a licensed band, when the reception result relating to the DL data transmitted by the terminal is determined to be at least one of DTX, NACK/DTX, or any state, the BS may not reflect the reception result by the terminal to the reference value Z of changing the contention window. That is, the BS may ignore the reception result by the terminal and determine the value of Z.

When the BS transmits scheduling information or DCI with respect to the DL data channel via a licensed band, when it is determined that the BS has not actually transmitted the DL data (no transmission), among the reception results of the DL data relating to the reference slot transmitted or reported by the terminal to the BS, the BS may ignore the reception result transmitted or reported by the terminal with respect to the DL data and determine the value of Z.

Figure 7:
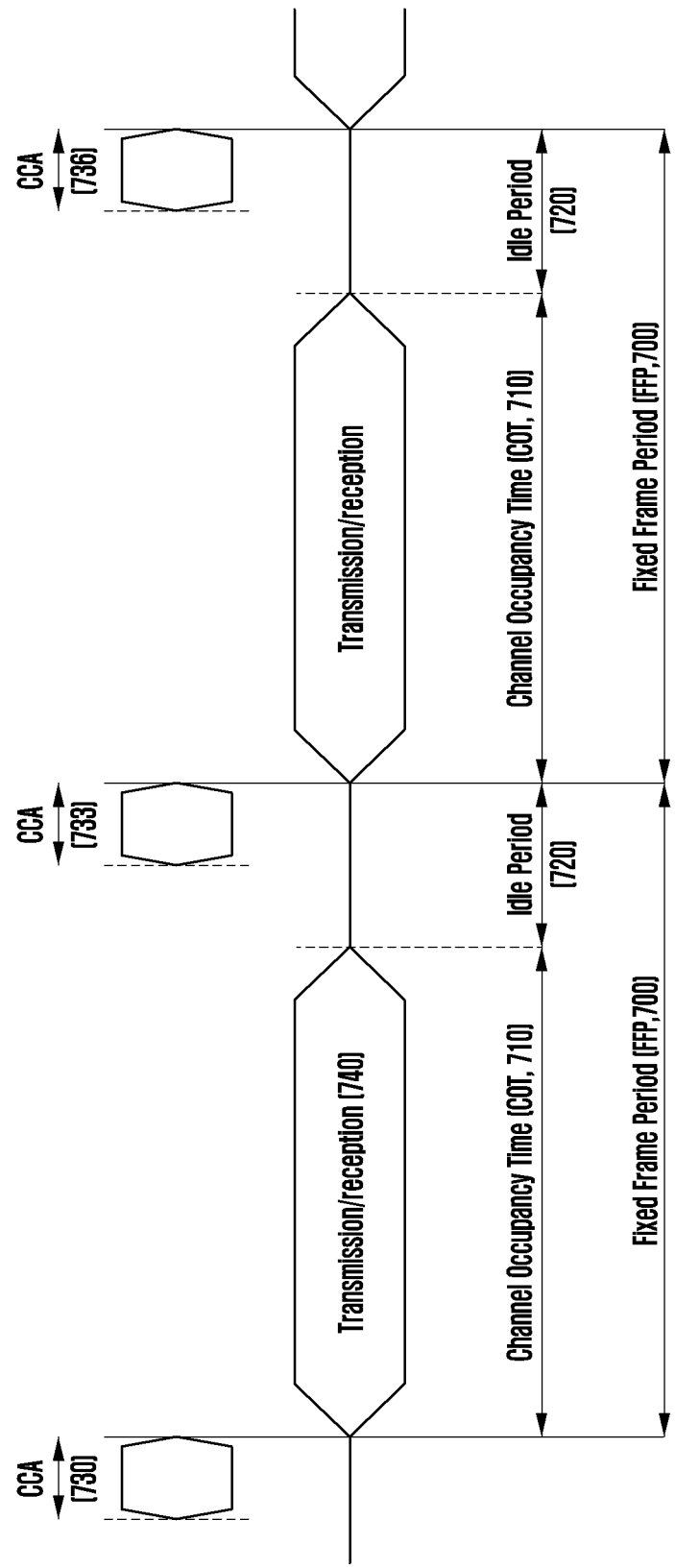
FIG. 7 illustrates a channel access procedure in an unlicensed band in a wireless communication system according to an embodiment.

FIG. 7 illustrates a channel access procedure in an unlicensed band in a wireless communication system according to an embodiment.

Referring to FIG. 7, a communication device for performing the frame-based channel access procedure may periodically transmit or receive a signal according to a fixed frame period (FFP). The FFP 700 may be declared or configured by the communication device (e.g., the BS), and configured to be from 1 ms to 10 ms. The channel access procedure (or clear channel access (CCA)) with respect to the unlicensed band may be performed immediately before each frame period 730, 733, and 736, and the channel access procedure may be performed for a fixed time such as the above-described type 2 channel access procedure or for one observation slot. When it is determined that the unlicensed band is in an idle state or is an idle channel as a result obtained from the channel access procedure, the communication device may transmit or receive a signal for up to 95% of time (channel occupancy time (COT) 710) of the fixed frame period 700, without performing a separate channel access procedure. In this case, at least 5% of time of the fixed frame period 700 is an idle period 720, a signal cannot be transmitted or received in the idle period, and the channel access procedure may be performed within the idle period 720.

The frame-based channel access procedure is advantageous in that a method of performing the channel access procedure is comparably simpler than the traffic-based channel access procedure and channel access via the unlicensed band may be periodically performed. However, since the start time point of the channel access procedure is fixed, the probability of accessing the unlicensed band may be reduced compared to the traffic-based channel access procedure.

Figure 8:
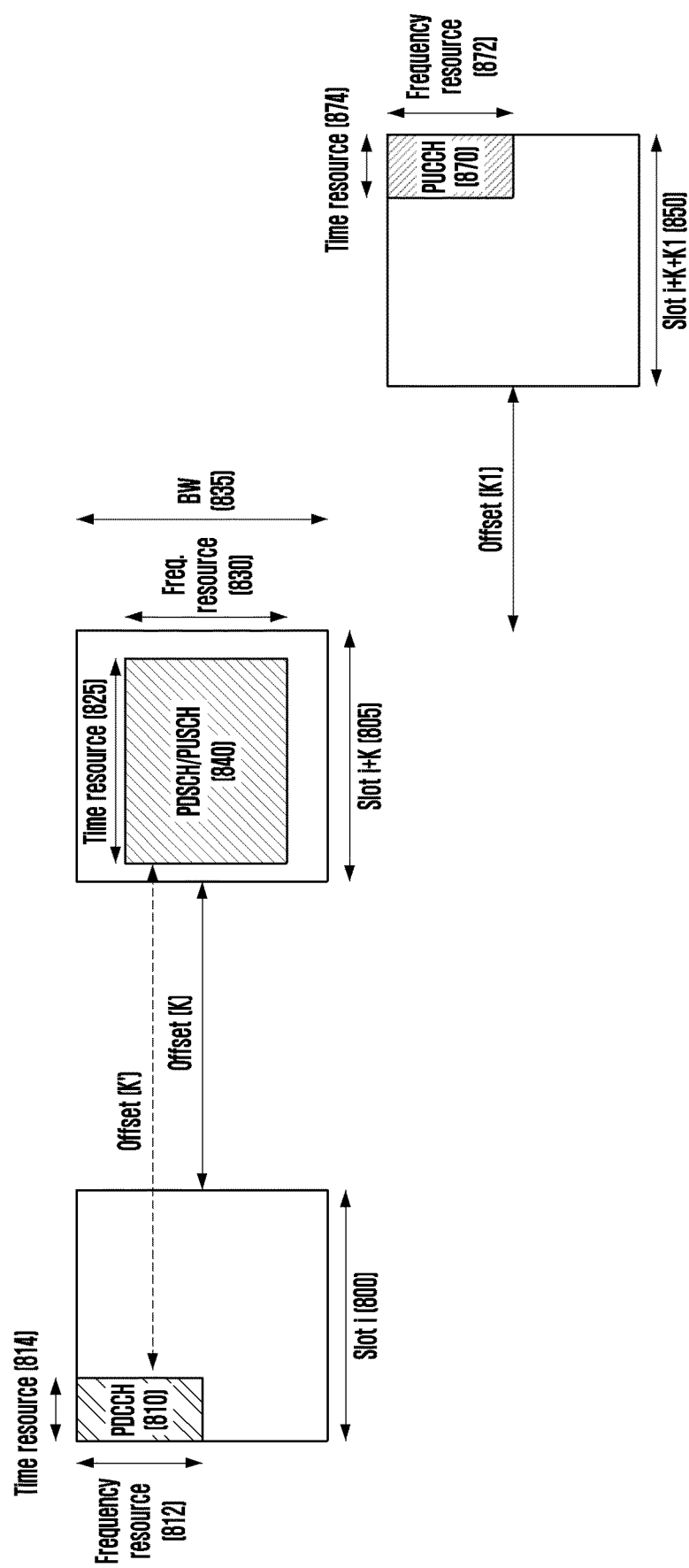
FIG. 8 illustrates scheduling and feedback in a wireless communication system according to an embodiment.

FIG. 8 illustrates scheduling and feedback in a wireless communication system according to an embodiment. The BS may transmit control information including DL and/or UL scheduling to the terminal. The BS may transmit DL data to the terminal. The terminal may transmit HARQ-ACK information, which is feedback on the DL data, to the BS. Alternatively, the terminal may transmit UL data to the BS.

In an NR system, the UL and the DL HARQ scheme may include an asynchronous HARQ scheme in which data a re-transmission time point is not fixed. For example, for the DL, when the BS has received a HARQ-NACK from the terminal as feedback on the initial transmission data, the BS may freely determine the transmission time point of the re-transmission data according to scheduling operation. The terminal, for a HARQ operation, may buffer the data determined to be an error as a result obtained by decoding the received data, and then combine the data determined to be an error with the data retransmitted from the BS.

Referring to FIG. 8, a resource area in which a data channel is transmitted in a 5G or NR communication system is illustrated. The terminal may monitor and/or search for, from a DL control channel (e.g., a PDCCH) area (hereinafter, a control resource set (CORESET) or a search space (SS)) configured from the BS through a higher signal, the PDCCH 810. The DL control channel area includes information on a time resource 814 and a frequency resource 812, the information on the time resource 814 may be configured in a symbol unit, and the information on the frequency resource 812 may be configured in an RB or an RB group unit.

When the terminal has detected the PDCCH 810 from a slot i 800, the terminal may obtain DCI transmitted through the detected PDCCH 810. The terminal may obtain scheduling information relating to a PDSCH/PUSCH 840 through the received DCI. That is, the DCI may include information on a resource area (or a PDSCH resource area) in which the terminal is to receive a DL data channel (e.g., a PDSCH) transmitted from the BS, or resource area information assigned by the terminal from the BS for UL data channel (e.g., a PUSCH) transmission.

When the terminal receives scheduling for a PUSCH transmission, will be described below as an example. The terminal having received the DCI may obtain a slot index or offset information K which is to receive the PUSCH through the DCI, and determine a PUSCH transmission slot index. The terminal may determine that a slot (i+K) 805 has received scheduling to transmit the PUSCH, based on the received offset information K, with reference to the slot index i 800 which has received the PDCCH 810. The terminal may determine the slot (i+K) 805 or a PUSCH start symbol or time in the slot (i+K), based on the received offset information K, with reference to the CORESET which has received the PDCCH 810.

The terminal may obtain information relating to the PUSCH transmission time-frequency resource area 840 in the PUSCH transmission slot 805 from the DCI. The information on a PUSCH transmission frequency resource area 830 may include information in a PRB or a PRB group unit. The information on the PUSCH transmission frequency resource area 830 may be information relating to an area included in an initial UL bandwidth (BW) or an initial UL BWP, which is determined or configured by the terminal through the initial access procedure. When the terminal has been configured to receive the UL BW or the UL BWP through a higher signal, the information on the PUSCH transmission frequency resource area 830 may be information relating to an area included in the UL BW or the UL BWP configured through the higher signal.

The information on the PUSCH transmission time resource area 825 may be information in a symbol or a symbol group unit, or information indicating absolute time information. The information on the PUSCH transmission time resource area 825 may be expressed as a combination of a PUSCH transmission starting time or a symbol and the length of a PUSCH or a PUSCH transmission ending time or a symbol, and may be included in the DCI as one field or value. The terminal may transmit the PUSCH in the PUSCH transmission resource area 840 determined by the DCI.

The terminal that has received the PDSCH 840 may transmit, to the BS, a reception result (e.g., a HARQ-ACK/NACK) on the PDSCH 840 as feedback. A PUCCH 870 transmission resource which transmits the reception result on the PDSCH 840 may be determined by the terminal, based on a PDSCH-to-HARQ timing indicator and a PUCCH resource indicator, which are indicated through the DCI 810 for scheduling the PDSCH 840. That is, the terminal which has received the PDSCH-to-HARQ timing indicator K1 through the DCI 810 may transmit the PUCCH 870 in a slot (i+K+K1) 850 to be subsequent by K1 from the slot (i+K) 805 which is the reception slot of the PDSCH 840.

The BS may configure at least one value of K1 to the terminal through higher layer signaling, or may indicate a specific value of K1 to the terminal through the DCI as described above. K1 may be determined by HARQ-ACK processing capability of the terminal, i.e., the minimum time required to receive the PDSCH, and produce and report the HARQ-ACK on the PDSCH, by the terminal. In addition, the terminal may use, as the value of K1, a value predefined or a default value until being configured to receive the value of K1.

In this case, a PUCCH 870 transmission resource in the PUCCH transmission slot 850 may perform PUCCH transmission in a resource indicated through a PDCCH resource indicator of the DCI 810. When a plurality of PUCCH transmissions are configured or indicated in the PUCCH transmission slot 850, the terminal may perform PUCCH transmission in a PUCCH resource other than the resource indicated by the PUCCH resource indicator of the DCI 810.

In the 5G communication system, in order to dynamically change the DL signal transmission interval and the UL signal transmission interval in the time division duplex (TDD) system, whether each OFDM symbol constituting one slot is a DL symbol, a UL symbol, or a flexible symbol may be indicated by a slot format indicator (SFI). Here, a symbol indicated to be a flexible symbol may be neither a DL symbol nor a UL symbol, or may refer to a symbol that can be changed to DL symbol or UL symbol by U-specific control information or scheduling information. In this case, the flexible symbol may include a gap guard required in the process of converting the DL to the UL.

The SFI may be simultaneously transmitted to a plurality of terminals through a terminal group (or cell) common control channel. The SFI may be transmitted through a PDCCH which is CRC-scrambled by a different identifier (e.g., an SFI-RNTI) from a terminal unique identifier (cell-RNTI (C-RNTI)). The SFI may include information on N slots, and the value of N may be a value in an integer or a natural number greater than 0, or may be a value configured by the BS to the terminal through a higher signal among a set of possible values predefined as 12, 5, 10, 20, etc. In addition, the size of SFI information may be configured by the BS to the terminal through a higher signal. An example of a slot format which can be indicated by the SFI as shown in Table 3 below.

TABLE 3

| | Symbol number (or index) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |

TABLE 3-continued

| | Symbol number (or index) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | F | F | F | F | F | F | F | U | U |
| 45 | D | D | D | D | D | F | F | U | U | U | U | U | U | U |
| 46 | D | D | D | D | F | U | D | D | D | D | D | D | F | U |
| 47 | D | D | F | U | U | U | D | D | F | U | U | U | U | U |
| 48 | D | F | U | U | U | U | D | F | U | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | D | F | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | D | D | F | U | U | U | D | D | D | D | D | D |
| 56-254 | Reserved | | | | | | | | | | | | | |
| 255 | UE determines the slat format for the slot based on TDD-UL-DL-ConfigurationCommon, or TDD-UL-DL-ConfigDedicated and, if any; on detected DCI formats | | | | | | | | | | | | | |

In Table 3, D indicates a DL, U indicates an UL, and F indicates a flexible symbol. According to Table 3, the total number of supportable slot formats is 256. In a current NR system, the maximum size of an SFI information bit is 128 bits, and the SFI information bit may be a value which can be configured by the BS to the terminal through a higher signal (e.g., dci-PayloadSize). In this case, a cell operating in an unlicensed band may introduce at least one additional slot format or modify at least one existing slot format to configure and indicate an additional slot format as shown in Table 4.

Table 4 provides examples of slot formats in which one slot includes a UL (U) symbol and a flexible (F) symbol.

TABLE 4

| | Symbol number (or index) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

The SFI information may include a slot format for a plurality of serving cells, and a slot format for each serving cell may be distinguished through a serving cell ID. In addition, with respect to each serving cell, a slot format combination for at least one slot may be included. When the size of the SFI information bit is 3 bits and the SFI information may be configured to be a SFI for one serving cell, the 3-bit SFI information may be one of the total eight SFIs and a slot format combination, and the BS may indicate one SFI among eight SFIs through a terminal group common DCI (hereinafter, referred to as a format indicator information).

At least one of eight SFIs may be configured to be a SFI for a plurality of slots.

Table 5, below, shows an example of 3-bit SFI information configured in a slot format as shown in Table 3. Five pieces of the SFI information (slot format combination IDs 0, 1, 2, 3, and 4) are information on a SFI for one slot, and the remaining three pieces (slot format combination IDs 5, 6, and 7) are information on a SFI for four slots, which may be sequentially applied to four slots.

TABLE 5

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal may receive configuration information relating to a PDCCH, which is to detect SFI information, through a higher signal, and detect the SFI according the configuration. For example, the terminal may be configured to receive, through a higher signal, at least one of a CORESET configuration that is to detect SFI information, a search space configuration, RNTI information used for CRC-scrambling of DCI through which the SFI is transmitted, and period and offset information of a search space.

Figure 9A:
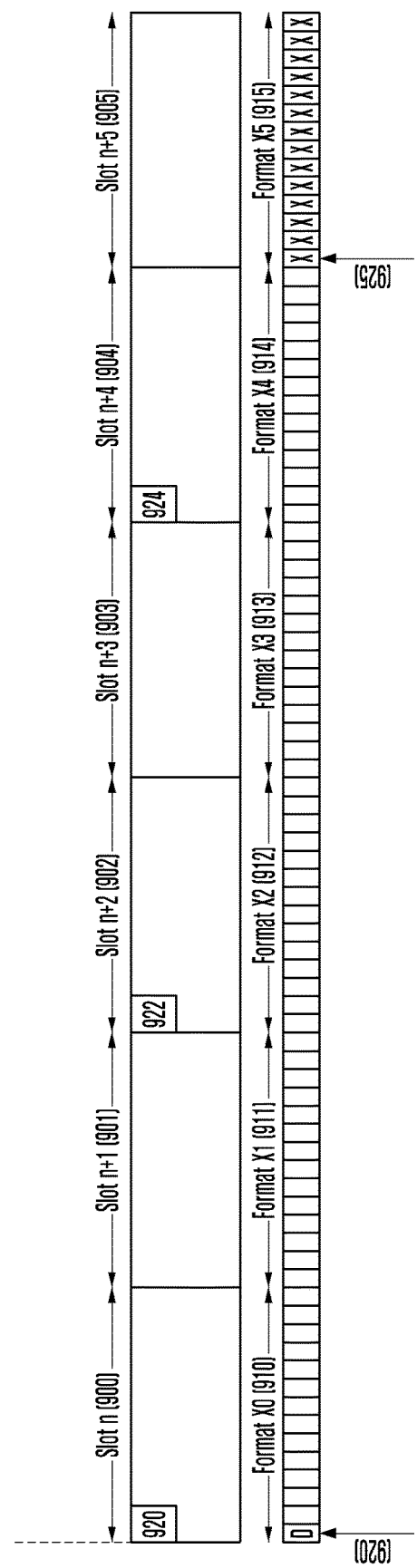
FIG. 9A illustrates channel occupancy time and a slot format in a wireless communication system according to an embodiment.

FIG. 9A illustrates channel occupancy time in a wireless communication system according to an embodiment.

Referring to FIG. 9A, the terminal is to detect SFI information in PDCCH areas 920, 922, and 924, and a period of the PDCCH area is 2 slots. Accordingly, the terminal may detect DCI which is CRC-scrambled by a SFI identifier (e.g., an SFI-RNTI or a new RNTI) in PDCCH areas 920, 922, and 924 (or CORESET) in a slot n 900, a slot (n+2) 902, and a slot (n+4) 904, according to the configured PDCCH area and the period thereof, and obtain SFIs for two slots through the detected DCI. The detected DCI may include SFI information on two or more slots, and the number of slots for which the SFI is to be included in the DCI may be configured through a higher signal. The configuration information on the number of slots for which the SFI is to be included in the DCI may be included in the same higher signal that configures the SFI information. For example, referring to FIG. 9A, the terminal may obtain SFI information 910 and 911 on the slot n 900 and the slot (n+1) 901 in the PDCCH area 920 of the slot n 900. In this case, the SFI information 910, 911, 912, 913, and 914 may have at least one value of formats shown in Table 3. The SFI information 910, 911, 912, 913, and 914 may also have a new format other than the formats shown in Table 3.

When the BS transmits SFI information in an unlicensed band, especially, when the SFI information includes a SFI for a plurality of slots, the BS may not determine SFI information for at least one slot, according to whether the channel is access in the unlicensed band. When transmitting SFI information 914 and 915 on a slot (n+4) 904 and a slot (n+5) 905 in the PDCCH 924, the BS is to determine how to indicate the SFI information on the slot (n+5) 905. For example, the BS may indicate that the SFI relating to time other than the channel occupancy time is flexible.

Hereinafter, a method of assigning a UL resource will be described.

The UL resource for transmitting a signal or data may be consecutively or inconsecutively assigned, and when a specific resource assignment type is determined, information indicating the assignment of the UL resource may be understood according to the specific resource assignment type. In the 3GPP standard, a signal and a channel are distinguishably used, but hereinafter, in the disclosure, a UL transmission signal and a UL transmission channel will be interchangeably used without separate division, or a UL transmission signal will be used as a meaning of including or representing both the UL transmission signal and the UL transmission channel because each of a UL resource assignment scheme and a UL transmission starting position determination scheme proposed in the disclosure may be commonly applied to both a UL transmission signal and a UL transmission channel. Without separate division or description, the UL resource assignment scheme and the UL transmission starting position determination scheme proposed in the disclosure may be applicable to the UL transmission signal and the UL transmission channel, respectively.

UL Resource Assignment Type 0

A UL resource assignment type 0 scheme assigns a resource in a unit of RBG including consecutive P RBs. The size P of the RBG may be configured to be one of Configuration 1 and Configuration 2, according to a higher layer, e.g., an rbg-size value of pusch-Config, and P may be determined as shown in Table 6, based on the size of the information and the size of an active UL BWP.

Table 6 shows the size of a BWP and the size of P according to an RBG configuration value. The size of a BWP is the number of PRBs constituting the BWP.

TABLE 6

| Carrier BWP Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number of RBGs ($N_{RBG}$) constituting the UL BWP ($N_{BWP}$) may be determined to be ceiling (($N_{BWP}^{size}$+ $N_{BWP}^{start}$ mod P)/P) ($N_{RBG}$=ceiling ($N_{BWP}^{size}$+$N_{BWP}^{start}$ mod P)/P)). The size of the first RBG ($RBG_0$) is P-$N_{BWP}^{start}$ mod P. If the size of ($N_{BWP}^{start}$+$N_{BWP}^{size}$) mod P is greater than 0, the size of the last RBG ($RBG_{last}$) is ($N_{BWP}^{start}$+ $N_{BWP}^{size}$) mod P, and if the size of $N_{BWP}^{start}$+$N_{BWP}^{size}$ mod P is not greater than 0, the size of the last RBG ($RBG_{last}$) is P. The size of the RBGs remaining after excluding the first and the last RBG is P. The $N_{BWP}^{start}$ indicates a CRB where the BWP relatively starts in $CRB_0$, and may be understood as a point where a specific BWP starts in the CRB. $N_{BWP}^{size}$ indicates the number of RBs included in the BWP.

The length (or the size or the number of bits) of frequency resource assignment information is same as $N_{RBG}$, and the terminal may be configured or scheduled to receive a resource configured or scheduled for UL transmission according to each RBG in an RBG unit, through a bitmap including $N_{RBG}$ bits. For example, the terminal may determine that an RBG area configured to be 1 in the bitmap is a resource assigned for UL transmission, and an RBG area configured to be 0 is not a resource assigned for UL transmission. An RBG bitmap is sequentially aligned (in an ascending order) and mapped along the axis in which frequency increases. According to this scheme, the consecutive or in consecutive RBGs may be assigned for UL transmission.

UL Resource Assignment Type 1

A UL resource assignment type 1 scheme is a scheme of assigning consecutive frequency resources in an active UL BWP. Frequency resource assignment information of the UL resource assignment type 1 scheme may be indicated to the terminal through a resource indication value (RIV). The length (or the size or the number of bits) of the frequency resource assignment information is a ceiling ($\log_2$ ($N_{BWP}$ ($N_{BWP}$+1)/2)). The RIV indicates a start RB ($RB_{start}$) and L consecutively-assigned RBs ($L_{RBs}$) of frequency assignment as follows:

$$\text{If } (L_{RBs} - 1) \leq \left\lfloor \frac{N_{BWP}}{2} \right\rfloor \text{ then}$$

$$RIV = N_{BWP}(L_{RBs} - 1) + RB_{start}$$

$$\text{Else, } RIV = N_{BWP}(N_{BWP} - L_{RBs} - 1) + (N_{BWP} - 1 - RB_{start})$$

where, $L_{RBs} \geq 1$ and shall not exceed $N_{BWP} - RB_{start}$

If $(L_{RBs}-1) \leq \lfloor N_{BWP}/2 \rfloor$ then RIV=$N_{BWP}$ ($L_{RBs}-1$)+$RB_{start}$
Else, RIV=$N_{BWP}$ ($N_{BWP}-L_{RBs}-1$)+($N_{BWP}-1-RB_{start}$)
where, $L_{RBs} \geq 1$ and shall not exceed $N_{BWP}-RB_{start}$ $N_{BWP}$ indicates the size of the active UL BWP and expressed as the number of PRBs, $RB_{start}$ indicates the first PRB where the UL resource assignment starts, and $L_{RB}$ indicates the length or the number of the consecutive PRBs. When one piece of information of DCI (e.g., a UL grant) for configuring or scheduling UL transmission, e.g., DCI format 0_0, is transmitted in a common search space (CSS), the size of the initial BWP$^{N_{BWP,0}}N_{BWP,0}$ is used.

In addition, when one DCI format of UL grant, e.g., DCI format 0_0, transmitted in a UE-specific CSS (USS), the size or the number of bits of the frequency resource assignment information of UL grant is determined by the size of the initial BWP ($N_{initial,BWP}{}^{N}{}_{initial,BWP}$), but when the UL grant is DCI for scheduling another active BWP, the value of the RIV is $RB_{start}$=0, K, 2K, ... ($N_{initial,BWP}$ $N_{initial,BWP}$−1)·K, and $L_{RB}$=K, 2K, ..., $N_{initial,BWP}$·K$^{N}{}_{initial,BWP}$, and configured as follows:

If $(L'_{RBs}-1) \leq \lfloor N_{initial,BWP}/2 \rfloor$ then RIV=$N_{initial,BWP}$($L'_{RBs}$−1+RB'$_{start}$
Else, RIV $N_{initial,BWP}$($N_{initial,BWP}$−1)+($N_{initial,BWP}$−1−RB'$_{start}$)
where, L'$_{RBs}$=$L_{RBs}$/K, RB'$_{start}$=$RB_{start}$/K, L'$_{RBs}$ L/L $N_{initial,BWP}$−RB'$_{start}$ $$\text{If } (L'_{RBs} - 1) \leq \left\lfloor \frac{N_{initial,BWP}}{2} \right\rfloor \text{ then}$$

$$RIV = N_{initial,BWP}(L'_{RBs} - 1) + RB'_{start} \text{ Else,}$$

$$RIV = N_{initial,BWP}(N_{initial,BWP} - L'_{RBs} - 1) + (N_{initial,BWP} - 1 - RB'_{start})$$

where, $L'_{RBs} = \frac{L_{RBs}}{K}, RB'_{start} = \frac{RB_{start}}{K},$ $L'_{RBs}$ is $N_{initial,BWP} - RB'_{start}$ —UL Resource Assignment Type 2

A UL resource assignment type 2 scheme assigns a UL signal or a channel transmission frequency resource to be distributed over the entire active UL BWP, wherein distances or gaps between assigned frequency resources are the same as or equivalent to each other. Since the UL resource assignment type 2 scheme evenly assigns a resource throughout the entire frequency band, it may be limited to be applied when transmitting a UL signal and a channel transmitted in a carrier, a cell, or a BWP operated in an unlicensed band in which requirements for frequency assignment such as a power spectral density (PSD) requirement and an occupancy channel bandwidth (OCB) requirement are to be satisfied.

Figure 9B:
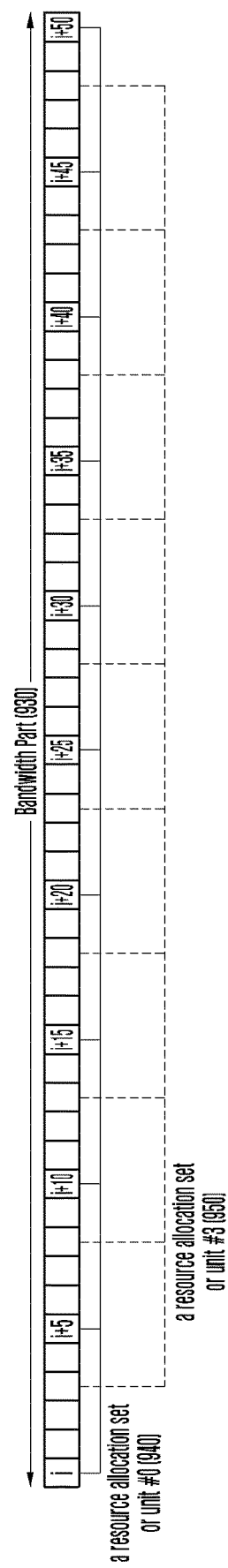
FIG. 9B illustrates a frequency resource assignment method in a wireless communication system according to an embodiment.

FIG. 9B illustrates a frequency resource assignment method in a wireless communication system according to an embodiment.

Referring to FIG. 9B, the UL resource assignment type 2 scheme is described. A terminal is configured to transmit and receive a UL signal to or from a BS through a BWP 930, and a terminal is scheduled for UL data channel transmission through the UL resource assignment type 2 scheme, and it is assumed that the bandwidth 930 includes 51 PRBs. According to the UL resource assignment type 2 scheme, the 51 PRBs include L resource allocation sets (in FIG. 9B, L=5), and each resource allocation set includes N=$N_{BWP}$/L or N=[$N_{BWP}$/L]+1 PRBs.

Referring to FIG. 9B, the first resource allocation set 940 includes 11 PRBs #i, #i+5, #i+10, #i+15, ..., #i+45, and #i+50, and the remaining resource allocation set, e.g., the fourth resource allocation set 950 includes 10 PRBs #i+3, #i+8, #i+13, #i+18, ..., and #i+48. That is, the number of PRBs included in the resource allocation set may be different according to the size of the BWP or the number of PRBs in the BWP. At least one resource allocation set configured as above may be assigned to the terminal, consecutive resource allocation sets (e.g., a resource allocation set #0, #1 or #2, #3, #4) may be assigned to the terminal through a scheme (e.g., an assignment scheme on the basis of the value of RIV) similar to the UL resource assignment type 1 scheme, or a consecutive or inconsecutive resource allocation set may be assigned to the terminal through a scheme (e.g., an assignment scheme based on a bitmap) similar to the UL resource assignment type 0 scheme.

For example, in when the consecutive resource allocation set is assigned to the terminal, similar to the UL resource assignment type 1 scheme, the terminal may determine a frequency resource area (or an assigned resource allocation set) assigned by an RIV expressed as a start RB ($RB_{start}$) of the frequency resource assignment and L consecutive resource allocation sets. Here, the value of RIV is as follows:

If $(L-1) \leq \lfloor N/2 \rfloor$ then RIV=N(L−1)+$RB_{start}$
Else, RIV=N(N−L−1)+(N−1−$RB_{start}$)

$$\text{If } (L - 1) \leq \left\lfloor \frac{N}{2} \right\rfloor \text{ then } RIV = N(L - 1) + RB_{start}$$

$$\text{Else, } RIV = N(N - L - 1) + (N - 1 - RB_{start})$$

For example, RIV=0 indicates the first resource allocation set or resource allocation set #0, and indicates that one resource allocation set including PRBs #i, #i+10, #i+20, ..., and #i+50 of FIG. 9B is assigned. Here, the length (or the size or the number of bits) of the frequency resource assignment information corresponds to ceiling (log 2 (L(L+1)/2)).

As another example, when the consecutive or inconsecutive resource allocation set is assigned through a bitmap, an L-bit bitmap for indicating the L resource allocation sets included in the BWP 930 to be in an ascending order of the frequency resources or in an ascending order of the resource allocation set indices may be configured to assign the resource allocation set through the bitmap.

In FIG. 9B, the location of the resource allocation set may be indicated through a bitmap including 5 bits, and a bitmap 10000 may indicate that the first resource allocation set, i.e., one resource allocation set including PRBs #i, #i+10, #i+20, . . . , and #i+50 of FIG. 9B, is assigned. A bitmap 00010 may indicate that the fourth resource allocation set, i.e., one resource allocation set including PRBs #i+3, #i+8, #i+13, #i+18, . . . , and #i+48 of FIG. 9B is assigned. Here, the length (or the size or the number of bits) of the frequency resource assignment information corresponds to L.

UL Resource Assignment Type 3

Figure 9C:
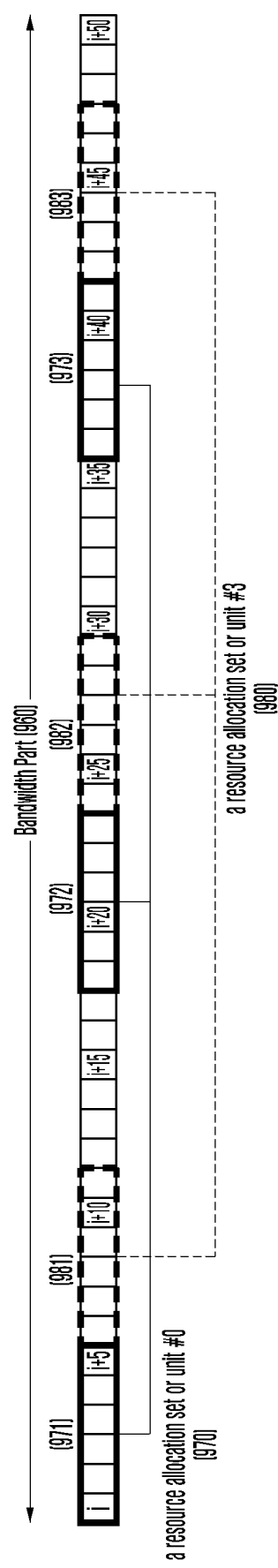
FIG. 9C illustrates a frequency resource assignment method in a wireless communication system according to an embodiment.

FIG. 9C illustrates a frequency resource assignment method in a wireless communication system according to an embodiment. Specifically, FIG. 9C illustrates a UL resource assignment type 3 scheme.

Referring to FIG. 9, the UL resource assignment type 3 scheme assigns a frequency resource for transmitting a UL signal or a channel to be distributed over the entire active UL BWP, wherein an assignment resource group (or an assignment resource block an assignment resource cluster), which is consecutive resources, e.g., 971 or 981, is distributed over the entire BWP through a scheme such as repetitive transmission 917, 972, and 973 or 981, 982, and 983. That is, an assignment resource group 970, which is consecutive resources, may repeatedly exist in the frequency resource such as 971, 972, and 973. Accordingly, a plurality of assignment resource groups may exist in a bandwidth.

In the UL resource assignment type 3 scheme, since a consecutive assignment resource group (or a block or a cluster) is distributed in the frequency band, it may be limited to be applied when transmitting a UL signal and a channel transmitted in a carrier, a cell, or a bandwidth operated in an unlicensed band in which requirements for frequency assignment such a PSD requirement and an OCB requirement are to be satisfied.

Similar to the frequency, the terminal may be configured for a time resource area of a UL data channel through the following scheme. The time resource area of the UL data channel may be indicated to the terminal through a start and length indicator value (SLIV). The SLIV is a value determined by a starting symbol (S) and L consecutively-assigned symbols (L) of the time resource assignment in a slot as follows. If L−1 is less than or equal to 7, the SLIV is 14·(L−1)+S, and if L−1 is greater than 7, the SLIV is 14·(14−L+1)+(14−1−S). Here, the value of L is greater than 0 and less than or equal to 14.

Additionally, the BS may more specifically indicate a transmission starting position or time point with respect to a UL signal or channel for transmitting a UL signal in an unlicensed band, to the terminal, or the terminal may determine the position. For example, the terminal may be indicated or configured to receive a starting symbol of UL signal transmission and the length of the UL signal transmission, or a starting symbol and an ending symbol of the UL signal transmission, the UL signal being transmitted by the terminal in a specific slot, from the BS through DCI or a higher signal. The terminal may be additionally indicated to receive a transmission starting position in the first symbol of the indicated or configured UL signal transmission.

Figure 10:
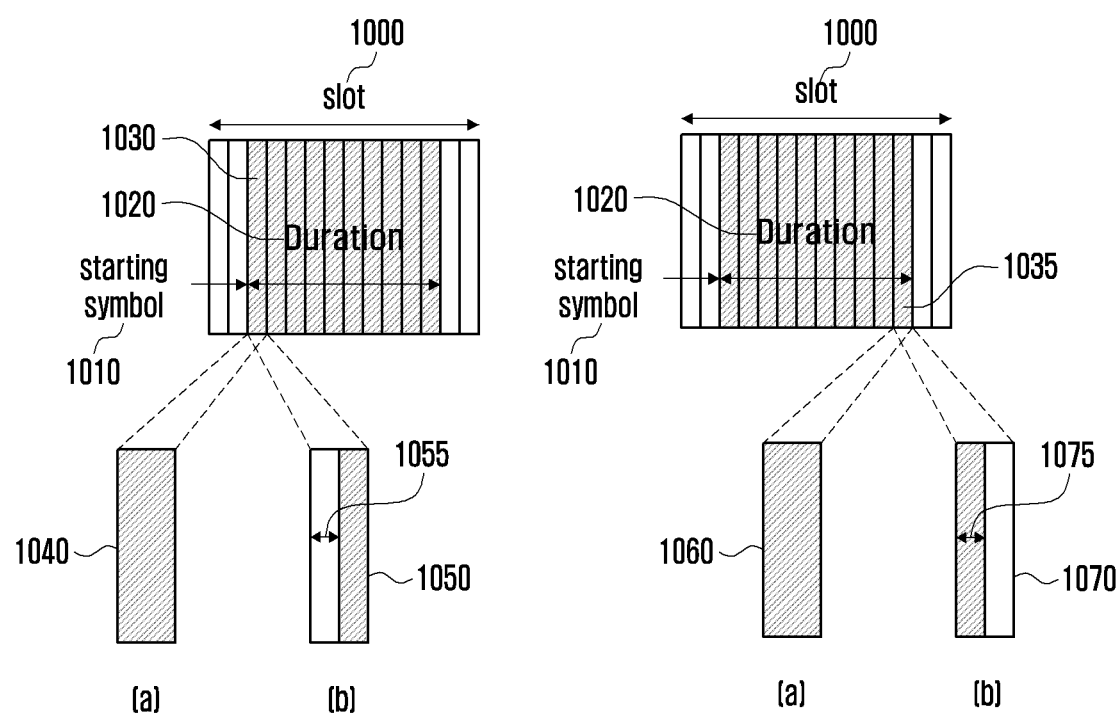
FIG. 10 illustrates a time resource assignment method in a wireless communication system according to an embodiment.

FIG. 10 illustrates a time resource assignment method in a wireless communication system according to an embodiment.

Referring to FIG. 10, the terminal having received DCI (or a UL grant) for indicating or scheduling UL signal transmission from the BS may determine a slot 1000 for transmitting the UL signal, a starting symbol 1010 where the UL signal transmission starts in the slot 1000, and a transmission length or the number of transmission symbols of the UL signal by using at least one piece of information of the DCI, e.g., time domain resource assignment information. When the terminal transmits a UL signal in an unlicensed band, the DCI may include a field more specifically indicating the transmission starting position in the first symbol of the UL signal transmission, e.g., a field (UL signal/channel starting position) indicating the transmission starting position of a UL signal or a channel. The terminal may determine the starting position of UL signal transmission in the UL starting symbol 1010 by using a value configured through the field.

Referring to the example above, the terminal may determine the starting symbol 1010 of UL signal transmission by using time domain resource assignment information of the DCI. The terminal may additionally determine whether the UL signal is transmitted from the starting time or position of the symbol 1010 as in 1040, or whether the UL signal is transmitted from a position subsequent to 1055 with reference to the starting time or position of the symbol 1010 as in 1050, by using UL signal starting position information of the DCI. As in the example above, indicating the UL signal transmission position in the symbol 1010 by dividing into two cases is merely an example, and dividing the transmission position into two or more cases may also be possible.

Similar to the method of indicating the UL transmission starting position in the transmission starting symbol of a UL signal or channel as described above, it is possible to indicate a UL transmission ending position in an transmission ending (or last) symbol of a UL signal or channel. That is, when a terminal transmits a UL signal in an unlicensed signal, the DCI may include a field more specifically indicating the transmission ending position in the last symbol of UL signal transmission, e.g., a field (a UL signal/channel ending position) indicating the ending position of a UL signal or channel. The terminal may determine the UL signal transmission ending position in the last symbol 1035 of UL transmission by using a value configured through the field.

Referring to FIG. 10, the terminal may determine the UL signal transmission ending symbol or the last symbol 1035 by using time domain resource assignment information of DCI. The terminal may additionally determine whether the UL signal is transmitted up to the ending or last time or position of the symbol 1035 as in 1060, or whether the UL signal is transmitted from the starting time or position of the symbol 1035 to the 1075 as in 1070, by using UL signal ending position information in the DCI. In this case, as in the example above, indicating the UL signal transmission position in the symbol 1035 by dividing into two cases is merely an example, and dividing the transmission position into two or more cases may also be possible.

As described above, additionally indicating the UL signal transmission starting or ending position in the UL transmission starting symbol or ending symbol is required to cause the terminal or the BS to perform a channel access procedure by using the transmission staring or ending position, or to guarantee a gap between signals or channels transmitted between a BS and a terminal, a terminal and the terminal, or a terminal and another terminal for or within a predetermined time.

Figure 11:
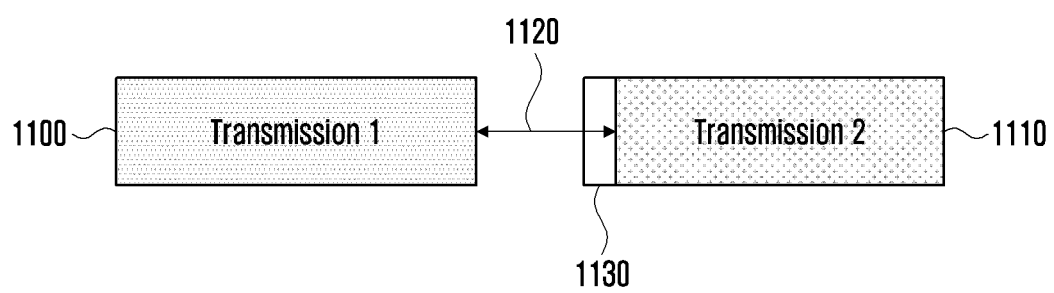
FIG. 11 illustrates a time resource assignment method in a wireless communication system according to an embodiment.

FIG. 11 illustrates a time resource assignment method in a wireless communication system according to an embodiment.

Referring to FIG. 11, a gap 1120 between first signal or channel transmission 1100 and second signal or channel transmission 1110 may be guaranteed for or within a predetermined time, and/or a channel access procedure for second signal or channel transmission may be performed in the gap guard 1120. The BS may perform a type 2 channel access procedure to occupy a channel, and the terminal may transmit a UL signal or channel within the channel occupancy time. When a gap between DL signal or channel transmission 1100 and UL signal or channel transmission 1110 of the terminal is within a predetermined time (e.g., 16 μs) in the channel occupancy time, the terminal may transmit a UL signal or channel 1110 by performing a type 3 channel access procedure (or without performing a separate channel access procedure). The gap may be positioned in the first symbol where the terminal starts the UL signal or channel transmission 1110.

When a gap between DL signal or channel transmission 1100 and UL signal or channel transmission 1110 of the terminal is within a predetermined time (e.g., 25 μs) in the channel occupancy time, the terminal may transmit a UL signal or channel 1110 by performing a type 2 channel access procedure. Accordingly, a method is provided for determining a time resource area to which a UL signal or channel such as the channel access procedure, the UL signal transmission starting position, and the UL signal transmission ending position is assigned, by using at least one piece of information among a channel access procedure performed for UL signal transmission by the BS and the terminal, the UL signal transmission starting position, the UL signal transmission ending position, and a SFI.

The terminal may transmit capability information relating to a supportable or performable UL channel access procedure type to the BS. The terminal may transmit an indication as to whether the terminal is able to perform each UL channel access procedure type or a channel access procedure type performable by the terminal, to the BS, through the capability information. When the terminal is to mandatorily support some UL channel access procedure types, the terminal may transmit whether the terminal is able to support a specific UL channel access procedure type, to the BS, through the capability information.

Similarly, the terminal may transmit capability information relating to supportable or transmittable UL signal transmission starting position to the BS. In this case, the terminal may transmit an indication as to whether the terminal is able to start transmitting a UL signal from each starting position or information on a starting position from which the terminal is able to start transmitting a UL signal, to the BS, through the capability information. When the terminal is to mandatorily support some starting positions of the UL signal transmission starting points, the terminal may transmit whether the terminal is able to start transmitting a UL signal from a specific position, to the BS, through the capability information.

The terminal may also transmit capability information relating to a supportable or transmittable UL signal ending position to the BS. In this case, the terminal may transmit an indication as to whether the terminal is able to end transmitting a UL signal at each ending position, or information on an ending position at which the terminal is able to end transmitting a UL signal, to the BS, through the capability information. When the terminal is to mandatorily support some of UL signal ending positions, the terminal may transmit whether the terminal is able to end transmitting a UL signal at a specific position, to the BS through the capability information.

Hereinafter, the disclosure will be described using an example in which the terminal transmits at least one piece of capability information of a supportable UL channel access procedure type, a UL signal transmission starting position, and a UL signal transmission ending position, to the BS, and based on this, the BS uses at least one of a UL channel access procedure type, a UL signal starting position, and a UL signal transmission ending position. However, the disclosure may also be applicable to when the terminal does not transmit capability information relating to a supportable UL channel access procedure type, a UL signal transmission starting position, and a UL signal transmission ending position, to the BS. The capability may be independent according to a frequency band or a combination of frequency bands. For example, in a 5 GHz frequency band, capability may be defined with respect to a type 1 and a type 2 channel access procedure, and in a 6 GHz frequency band, capability may be defined with respect to a type 1, a type 2, and a type 3 channel access procedure. In addition, the terminal may determine at least one of the UL channel access procedure type, the UL signal transmission starting position, and the UL signal transmission ending position according to one of various methods proposed in the disclosure or a combination of one or more methods. Further, it is possible to independently determine each of the UL channel access procedure type, the UL signal transmission starting position, and the UL signal transmission ending position, according to one of method proposed in the disclosure or a combination of one or more methods.

Embodiment 1

According to the embodiment, a method is provided determining a PDSCH/PUSCH resource area in a BS and a terminal operated in an unlicensed band. More specifically, the terminal or the BS that has received information relating to channel occupancy time transmitted by the PDSCH/PUSCH resource area from the BS or the terminal, e.g., an SFI, determines the PDSCH/PUSCH resource area according to DCI and SFI information, and the terminal or the BS that has failed to receive the information relating to channel occupancy time determines the PDSCH/PUSCH resource area according to DCI. The embodiment will be described assuming that one piece of DCI configures or schedules N1 PUSCH/PUSCHs in N1 slots. The maximum value N of N1 may be configured through a higher signal, and N1 indicating the number of actual PDSCH/PUSCH transmission slots or the number of actually transmitted PDSCH/PUSCHs as a value less than or equal to N may be included in the DCI.

Figure 12:
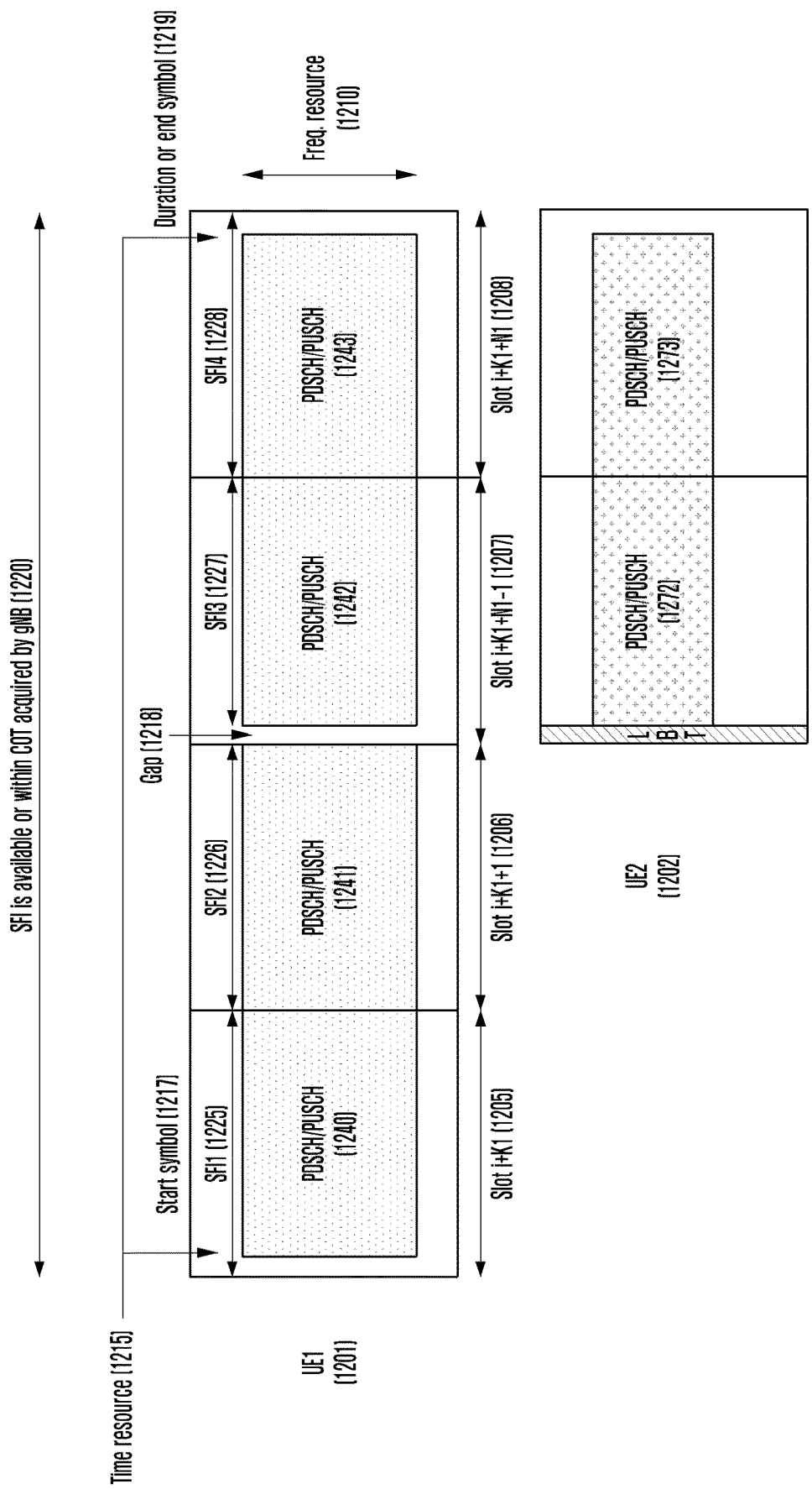
FIG. 12 illustrates a time resource assignment method in a wireless communication system according to an embodiment.

Referring to FIG. 12, another method of determining, by the terminal having received SFI information 1225, 1226, 1227, and 1228 with respect to a slot (i+K1) 1205 to a slot (i+K1+N1) 1208, time resource area information relating to at least one of N1 slots configured for PUSCH transmission, according to the received SFI information, will be described as follows. In this case, it will be described assuming a case where one piece of DCI configures or schedules N1 PUSCH transmissions in N1 slots. Here, the maximum value N of N1 may be configured through a higher layer, and N indicating the number of actual PUSCH transmission slots or the number of actually transmitted PUSCHs as a value less than or equal to N may be included in the DCI.

The terminal may determine a PUSCH transmission starting symbol in the first slot and a PUSCH transmission ending symbol in the last slot among slots having been configured or scheduled for PUSCH transmission by the BS, according to a value of a time resource assignment field of DCI for configuring or scheduling the PUSCH transmission. For example, a PUSCH transmission starting symbol position indicated by the value of the time resource assignment field of the DCI may be determined to be a PUSCH transmission starting symbol position in the first slot among slots configured for PUSCH transmission, and a PUSCH transmission ending position or the length of a PUSCH transmission interval, indicated by the value of the time resource assignment field of the DCI, may be determined to be a PUSCH transmission ending symbol position in the last slot among slots configured for PUSCH transmission or a PUSCH transmission length. In this case, the terminal may determine that all symbols from the PUSCH transmission starting symbol in the first slot to the PUSCH transmission ending symbol in the last slot, among slots configured or scheduled for the PUSCH transmission are PUSCH transmission resources. However, in the above case, since there is no gap or time to perform a channel access procedure for transmitting a UL signal or data channel of another user, multiplexing between the PUSCH transmission and another user or another UL signal or channel is difficult. Accordingly, the embodiment proposes a method of determining, by the terminal, a PUSCH transmission starting symbol in the first slot and the PUSCH transmission ending symbol in the last slot, among slots configured or scheduled for PUSCH transmission from the BS, according to a value of a time resource assignment field of DCI for configuring or scheduling the PUSCH transmission, and the remaining PUSCH transmission time resource area excluding the symbols, according to SFI information.

FIG. 12 illustrates a time resource assignment method in a wireless communication system according to an embodiment.

Referring to FIG. 12, when the terminal has received or knows SFI information 1220 relating to scheduled or configured N1 PUSCH transmission slots, the terminal may determine a PUSCH transmission starting symbol in the first slot 1205 and a PUSCH transmission ending symbol in the last slot 1208, among slots scheduled for PUSCH transmission, or a PUSCH transmission length, according to a value 1215 of a time resource field of DCI for configuring or scheduling the PUSCH transmission. A PUSCH transmission starting symbol position 1217 indicated by the value of the time resource assignment field of the DCI may be determined to be a PUSCH transmission starting symbol position 1217 in the first slot 1205 among slots configured for PUSCH transmission, and a PUSCH transmission ending position or the length 1219 of a PUSCH transmission interval, indicated by the value of the time resource assignment field of the DCI may be determined to be a PUSCH transmission ending symbol position in the last slot 1208 among slots configured for PUSCH transmission or the PUSCH transmission length 1219. When, in the value of the time resource assignment field of the DCI, the PUSCH transmission starting symbol is a symbol index #1 1217 (i.e., the second symbol in the slot) and the PUSCH transmission length is 13 symbols 1219, the terminal may determine that the PUSCH transmission starting symbol position in the first slot 1205 and the PUSCH transmission ending symbol position in the last slot 1208 among slots configured for PUSCH transmission are a symbol index #1 1217 and a symbol index #12 1219, respectively.

The terminal may determine a PUSCH transmission time resource area in a symbol and a slot remaining after excluding the symbols 1217 and 1219 according to SFI information relating to a slot configured for PUSCH transmission. When the terminal is scheduled for PUSCH transmissions 1240, 1241, 1242, and 1243 in a slot (i+K1) 1205, a slot (i+K1+1) 1206, a slot (i+K1+N1−1) 1207, and a slot (i+K1+N1) 1208 has been received and known SFI information 1225, 1226, 1227, and 1228 with respect to the slots 1205, 1206, 1207, and 1208 is scheduled for the PUSCH transmission, the terminal may determine a PUSCH transmission ending symbol in the first slot 1205, a PUSCH transmission starting symbol in the last slot 1208, and a PUSCH transmission starting symbol and a PUSCH transmission ending symbol in the remaining symbols 1206 and 1207, among PUSCH time resource area information in the slot (i+K1) 1205, the slot (i+K1+1) 1206, the slot (i+K1+N1−1) 1207, and the slot (i+K+N1) 1208, according to the SFI information. For example, it is assumed that the SFI information 1225, 1226, 1227, and 1228 on the slots 1205, 1206, 1207, and 1208 corresponds to formats 56, 1, 56, and 58 in Table 3 and Table 4, respectively. That is, the slot information indicator information 1225 on the slot (i+K1) 1205 is format 56 in Table 4, the slot information indicator information 1226 on the slot (i+K1+1) 1206 is format 1 in Table 3, the slot information indicator information 1227 on the slot (i+K1+N1−1) 1207 is format 56 in Table 4, and the SFI information 1228 on the slot (i+K1+N1) 1208 is format 58 in Table 4. Within the PUSCH time resource area determined based on the value of the time resource assignment field of DCI for configuring and scheduling PUSCH transmission (that is, with respect to symbols from the symbol 1217 to the symbol 1219), the terminal may determine that a symbol indicated as a UL (U) symbol based on the SFI information is the PUSCH transmission time resource area, and is illustrated as PUSCH areas 1240, 1241, 1242, and 1243 in FIG. 12.

When a symbol or time 1218 indicated as a flexible symbol, based on the SFI information, exists within the PUSCH time resource area determined based on the value of the time resource assignment field of DCI for configuring and scheduling for the PUSCH transmission, the terminal may determine that a Z μs (e.g., 16 μs) or (Z+TA) μs gap is produced with respect to the flexible symbol. Z is a value which may be predefined between the BS and the terminal, or configured by the BS through a higher layer. In addition, the value of Z may be configured to be another value according to the unlicensed frequency band. Here, the gap means that the terminal does not transmit a separate signal or channel for Z μs in the symbol. When a symbol length is longer than Z μs, the terminal may transmit a UL signal or channel for the time other than Z μs. That is, for a part of time in the symbol (the time remaining after excluding Z μs from the symbol length), the terminal may transmit a UL signal or channel, wherein the signal and the channel transmitted for the part of time may be a signal in which a CP for a symbol subsequent to the symbol is extended. That is, when producing a CP for a symbol subsequent to the symbol including the gap, a CP as long as the symbol length (time) −Z μs may be additionally produced and the additional CP part may be transmitted in the symbol including the gap to produce a gap. When the gap is less than or equal to 16 μs, the terminal may not perform a separate channel access procedure and perform PUSCH transmission 1242. This is the same when the terminal performs the type 3 channel access procedure and transmits the PUSCH 1242. Accordingly, the terminal has produced a gap in a UL signal or channel transmission interval, but the terminal may transmit a UL signal or channel even at the time after the gap. In this case, the terminal may determine that a terminal which has performed UL signal or channel transmission before the indicated gap guard performs the type 3 channel access procedure to perform the UL signal or channel transmission after the gap guard, without a separate indicator indicating the type of the channel access procedure, or irrespective of the type of the channel access procedure included in DCI for scheduling the UL signal or channel transmission. In addition, it may be determined that a terminal which has not performed UL signal or channel transmission before the indicated gap guard performs the type 2-2 channel access procedure and performs the UL signal or channel transmission after the gap guard, based on the result from the channel access procedure.

By the same method, the BS may instruct the UE 1 1201 to produce at least a Z µs gap within the PUSCH time resource area configured from the slot (i+K1) 1205 to the slot (i+K1+N1) 1208 through a SFI, so that the UE 2 1202 may perform the channel access procedure (e.g., type 2-2) in the gap guard 1218 to transmit a UL signal or channel in the slot (i+K1+N1-1) 1207. Accordingly, the BS may perform multiplexing with respect to one or more terminals or one or more UL signals or channels to improve performance of an unlicensed band system.

The number of flexible symbols determined by the terminal that the Z µs (e.g., 16 µs) gap is produced may be different depending on at least one of the value of Z and a SCS. For example, when the SCS is 60 kHz and Z=25 µs and two or more consecutive symbols are flexible, the terminal may determine that a gap having the length of Z is produced in one of the symbols. When N=ceiling (Z/L_symbol) consecutive symbols are flexible, the terminal may determine that a gap having the length of Z is produced using at least one of the symbols. L_symbol is the length of a symbol with respect to the SCS. When the SCS is 60 kHz, a symbol length (L_symbol) is approximately 18 µs. Therefore, when Z=25 µs, the terminal may determine that time corresponding to the length of one entire symbol and the length of (L_symbol−Z) µs of another symbol is the entire gap.

As another example, when the SCS is one of 15 kHz, 30 kHz, or 60 kHz, Z=16 µs, and one symbol is flexible, the terminal may determine that a gap having the length of Z is produced in the symbol. When two or more consecutive symbols are indicated as flexible, the terminal may also determine that no separate gap is produced in the symbols. In addition, when two or more consecutive symbols are indicated as flexible, the terminal may also determine that a gap is produced in one of the symbols (e.g., the first symbol or the last symbol of the symbols).

When the terminal has not correctly received or has not identified the SFI information, as in 1220, on a scheduled or configured PUSCH transmission slot, when the scheduled or configured PUSCH transmission is transmitted at the time other than the channel occupancy time of the BS, as in 1320, or when it may not be determined whether or not the scheduled or configured PUSCH transmission is performed in the channel occupancy time, the terminal may perform PUSCH transmission between a PUSCH transmission starting symbol in the first slot 1305 and a PUSCH transmission ending symbol in the last slot 1308 among the slots scheduled for PUSCH transmission. In addition, the terminal may determine the length of the PUSCH transmission according to a value 1315 of a time resource assignment field of DCI for configuring or scheduling the PUSCH transmission. For example, the terminal may determine that the PUSCH transmission starting symbol position 1317 indicated by the value of the time resource assignment field of the DCI is a PUSCH transmission starting symbol position 1317 in the first slot 1305 among slots configured for PUSCH transmission, and determine that a PUSCH transmission ending symbol position or the length of a PUSCH transmission interval 1319, indicated by the value of the time resource assignment field of the DCI, is a PUSCH transmission ending symbol position in the last slot 1308 among slots configured for PUSCH transmission or a PUSCH transmission length 1319. The terminal may determine that all symbols from the PUSCH transmission starting symbol position 1317 in the first slot 1305 among slots configured for PUSCH transmission to the PUSCH transmission ending symbol position in the last slot 1308 among slots configured for PUSCH transmission or the PUSCH transmission length 1319 are UL symbols, and may transmit a PUSCH using the determined UL symbols.

Change or adjustment of a PUSCH transmission time resource area with respect to the received SFI may be performed by using time required to receive a SFI of the BS or the terminal, and decode and obtain SFI information, and the SFI information obtained by the BS or the terminal. A PUSCH transmission time resource area change or adjustment time point or adjustment slot may be determined according to the minimum processing time required to change the PUSCH transmission time resource area. For example, in consideration of the minimum processing time N2 required to receive, by the terminal, DCI for scheduling PUSCH transmission from the BS and start PUSCH transmission, the terminal may change a PUSCH transmission time resource area using SFI information obtained with respect to PUSCH transmission transmitted from the last symbol in a PDCCH where a SFI is transmitted to the time after N2. The terminal may perform PUSCH transmission with respect to PUSCH transmission from the last symbol in a PDCCH where a SFI is transmitted to the time within N2, by using a PUSCH resource area determined based on the pre-determined PUSCH transmission time resource area or the PUSCH transmission time resource area that has failed to receive a SFI.

Change or adjustment of a PUSCH transmission time resource area with respect to the received SFI may be performed by using time required to receive a SFI of the BS or the terminal, and decode and obtain SFI information, and SFI information obtained by the BS or the terminal. For example, the terminal may produce a gap with respect to at least one symbol according to the received SFI. The terminal may produce a gap by puncturing a PUSCH assigned to a symbol including the gap with respect to the pre-configured PUSCH, or perform rate-matching with respect to the pre-configured PUSCH by using symbols valid for PUSCH transmission among symbols remaining after excluding a symbol including the gap. In order produce the gap, one of the puncturing method and the rate-matching method may be predefined between the BS and the terminal or the terminal may be configured by the BS through a higher layer to determine which method to be used. One of the puncturing method and the rate-matching method may also be used in consideration of the minimum processing time. That is, when a gap is produced after the minimum processing time, the rate-matching method may be used, and when a gap is produced within the minimum processing time, the puncturing method may be used.

In addition, in a method of determining or changing a PDSCH/PUSCH resource area with respect to at least one slot by using SFI information, a TBS may be determined according to the determined or changed PDSCH/PUSCH resource area, or the TBS determined with reference to the time point when PDSCH/PUSCH scheduling DCI is received may be maintained. In the NR system, the BS may transmit data by assigning a frequency resource having the arbitrary number of PRBs and a time resource having the arbitrary number of slots or symbols to the terminal, and scheduling information may be transmitted to the terminal via DCI, a configuration transmitted from higher signaling, or a combination thereof. When scheduling information is given to the BS and the terminal, the TBS may be determined in the following order:
  Stage 1-1: Determine the number of temporary information bits (A)
  Stage 1-2: Determine the number of temporary code blocks (CBs), performing byte alignment (a process of making a multiple of eight), and making a multiple of the number of temporary CBs (C, B)
  Stage 1-3: Determine TBS remaining after excluding the number of CRC bits (TBS)

In stage 1-1, a temporary TBS value may be determined in consideration of an amount of a resource area, by which data to be transmitted can be mapped. The number of temporary information bits may be determined by a combination of one or more a code rate (R), a modulation order ($Q_m$), the number of REs to which data is rate-matched and mapped, the number of assigned PRBs or RBs (#PRB), the number of assigned OFDM symbols, the number of assigned slots, and a reference value of the number of REs mapped in one PRB.

A may be determined using Equation (2):

$$A = N_{RE} \times Q_m \times R \times v \qquad (2)$$

In Equation (2), $Q_m$, which indicates a modulation order, and R, which indicates a code rate, may be included in DCI and transmitted to the terminal. v indicates the number of layers used for the transmission and may be transmitted to the terminal via DCI, higher signaling, or a combination thereof. $N_{RE}$ may be determined by the BS by using the number of REs mapped via rate matching at the time of data transmission. When both a BS and a terminal know resource assignment information, the BS and the terminal may have the same understanding on $N_{RE}$. In general, data should be mapped via the rate-matching method when $N_{RE}$ is calculated. However, due to a special reason, such as CSI-RS, URLLC, or UCI transmission, data may be punctured so that the NE may be calculated to also include an RE which is not actually mapped. This allows the BS and the terminal to have the same understanding on the TBS even when a part of data that is supposed to be arbitrarily mapped without notifying the terminal by the BS has not been transmitted via the puncturing method.

The BS may transmit information on $Q_m$ and R by transmitting an MCS index to the terminal through a defined MCS table. The modulation order may be QPSK, 16QAM, 64QAM, 256QAM, and 1024QAM, etc., and $Q_m$ may be 2 ($Q_m=2$) for QPSK, $Q_m$ may be 4 ($Q_m=4$) for 16QAM, $Q_m$ may be 6 ($Q_m=6$) for 64QAM, $Q_m$ may be 8 ($Q_m=8$) for 256QAM, and $Q_m$ may be 10 ($Q_m=10$) for 1024QAM. That is, $Q_m$ may indicate the number of bits transmittable in the modulated symbol. $Q_m$ and R may be transmitted together via the MCS index, or each of $Q_m$ and R may be transmitted in each bit field. Alternatively, A may be determined according to Equation (3):

$$A = \text{(the number of assigned PRBs)} \times \text{(the number of reference REs per 1 PRB)} \times Q_m \times R \times v \qquad (3)$$

In stage 1-2, the number of temporary code blocks (e.g., the number of temporary CBs) C is determined by using A determined in stage 1-1, and A is made to be a multiple of eight and a multiple of the number of temporary CBs based on the determined number of temporary code blocks. This is for performing byte alignment on the length of CRC added to the determined TBS and TB and making the length to be a multiple of a CB.

In stage 1-3, a process of excluding the number of bits which are added for CRC, among above-obtained information bits to be transmitted, may be performed.

Therefore, when a PUSCH transmission time domain resource changes, the number of $N_{REs}$ may be changed in a TBS determination method, and accordingly, the TBS can be changed or re-determined.

When the terminal fails to identify the SFI information with respect to a slot configured for PUSCH transmission, at the time of receiving DCI for scheduling PUSCH transmission, the terminal may calculate $N_{RE}$ of each slot, and may accordingly calculate the TBS, with respect to the PUSCH by using the PUSCH time domain resource information included in DCI.

Figure 13:
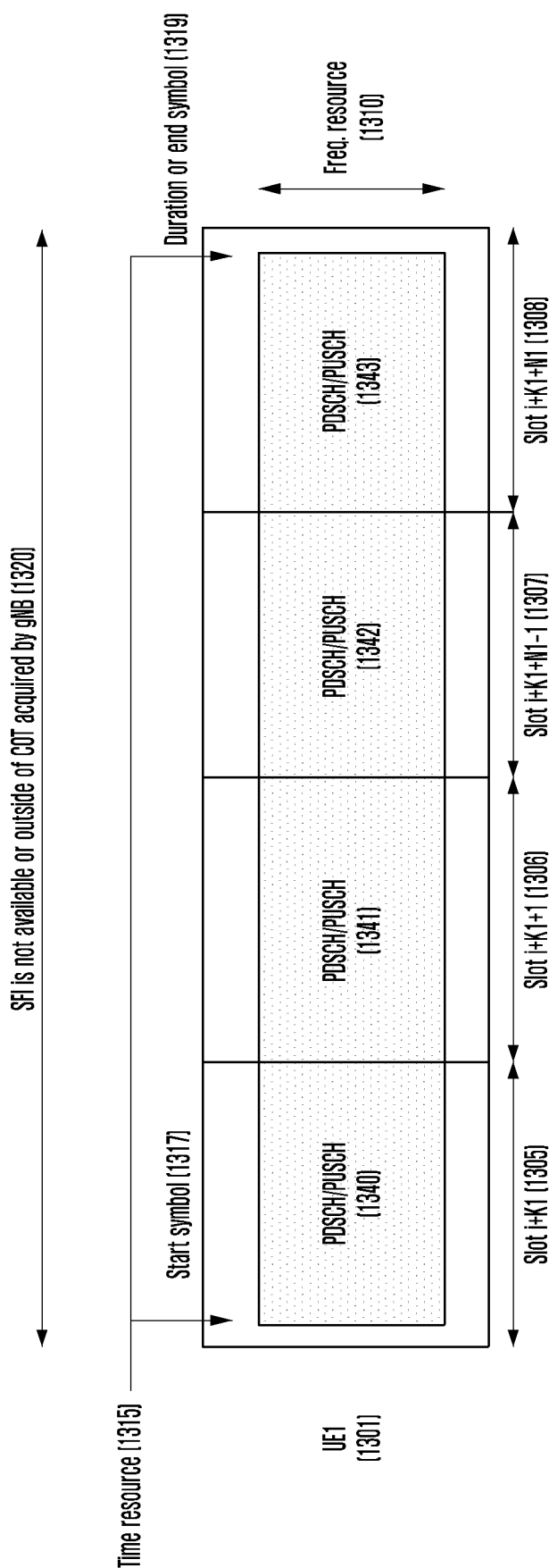
FIG. 13 illustrates a time resource assignment method in a wireless communication system according to an embodiment.

FIG. 13 illustrates a time resource assignment method in a wireless communication system according to an embodiment.

Referring to FIG. 13, the terminal may calculate $N_{RE}$ and may calculate the TBS with respect to each of PUSCHs 1340, 1341, 1342, and 1343 in the each of slots 1305, 1306, 1307, and 1308 configured for PUSCH transmission, using the time domain resource assignment information 1315 included in the DCI. When the terminal receives the SFI information with respect to slots 1305, 1306, 1307, and 1308 configured for PUSCH transmission before the scheduled PUSCH transmission time point or before the minimum processing time N2 required to receive, by the terminal, a PDCCH and to transmit a PUSCH, with reference to the scheduled transmission time point, e.g., the slot (i+K1)−N2 or before the slot (i+K1), the terminal may assume the PUSCH transmission time domain resource assignment such as PUSCHs 1240, 1241, 1242, and 1243 of FIG. 12, and calculate (or change or re-calculate) a TBS.

When the terminal receives the SFI information with respect to the PUSCH transmission slot before the scheduled PUSCH transmission time point or before the minimum processing time N2 required with reference to the scheduled PUSCH transmission time point, the terminal may calculate a TBS by using the time domain resource assignment information 1215 and the SFI information included in DCI, as in FIG. 12. When the terminal receives the SFI information with respect to the PUSCH transmission slot before the scheduled PUSCH transmission time point or after the minimum processing time N2 required with reference to the scheduled PUSCH transmission time point, the terminal may perform transmission by using the TBS calculated based on the time domain resource assignment information 1315 and the SFI information included in DCI (i.e., the terminal may not use the SFI with respect to the slot), or may perform transmission by puncturing the PUSCH in a symbol determined to be invalid for PUSCH transmission through a SFI, as in FIG. 13. That is, in the above case, the calculated TBS may not be changed.

Another TBS calculation method of changing or re-determining a TBS due to the change of a PUSCH transmission time domain resource is described as follows.

When changing or re-determining a TBS due to the change of a PUSCH transmission time domain resource, since the terminal is to perform processing (e.g., data encoding, resource mapping, etc.) with respect to data, overhead of the terminal may increase. Accordingly, in order to prevent the overhead of the terminal from unnecessarily increasing, the terminal may use NR calculated according to FIG. 12 or FIG. 13 and a TBS obtained therefrom without calculating the NR and changing the TBS, irrespective of whether there is a change in the PUSCH transmission time domain resource.

However, when the TBS is calculated by using the time domain resource assignment information 1315 as in FIG. 13, but data is transmitted by performing rate-matching with respect to the changed PUSCH transmission time resource after the SFI is received as in FIG. 12, the BS may not perform decoding due to the high code rate of the data. For example, when the time domain resource assignment information 1315 or the number of symbols included in DCI is greater than the changed PUSCH transmission time domain resource or the number of symbols, when transmitting the calculated TBS through the changed PUSCH transmission time area, the code rate for data increases. Accordingly, the terminal may map data with reference to the time domain resource assignment information 1315 included in DCI, and when the PUSCH transmission time domain resource is changed, the terminal may perform puncturing with respect to a resource or a symbol other than the changed PUSCH transmission time domain resource and may not transmit the same.

Embodiment 2

In the embodiment, a method is provided for determining a PDSCH/PUSCH time resource area in a BS and a terminal operated in an unlicensed band. More specifically, a method is provided for determining at least one gap guard with respect to PDSCH/PUSCHs transmitted in consecutive multiple slots, wherein the at least one gap guard is determined through DCI transmitted to a specific terminal (UE-specific DCI). In Embodiment 2, it is assumed that one piece of DCI configures or schedules N1 PDSCH/PUSCHs in N1 slots. The maximum value N of N1 may be configured through a higher signal, and N1 indicating the number of actual PDSCH/PUSCH transmission slots or the number of actually transmitted PDSCH/PUSCHs as a value that is less than or equal to N may be included in the DCI.

The BS may indicate at least one gap guard in the PDSCH/PUSCH transmission slot by using at least one field (e.g., a gap indicator) among fields of DCI for configuring or scheduling reception of N1 PDSCHs or transmission of N1 PUSCHs in multiple slots. The terminal may receive DCI for configuring or scheduling reception of N1 PDSCHs or transmission of N1 PUSCHs in multiple slots, and may determine a gap guard position in the PDSCH reception or the PUSCH transmission slot through a value of at least one field among the fields of DCI.

the gap indicator may include a bitmap of N1 or N1-1 bitstream for indicating a gap guard with respect to N1 slots or N1-1 slots remaining after the first slot of the N1 slots. When the gap guard is configured for a maximum of one time in the N1 slots, the gap guard may include ceiling (log 2(N1)) or ceiling (log 2(N1-1)) bits, and indicate one slot among the N1 slots through the gap indicator. According to the number of slots capable of configuring a gap guard, the gap indicator may include bits smaller than the ceiling (log 2(N1)) or ceiling (log 2(N1-1)) bits. For example, the BS may also indicate whether the gap guard predefined between the BS and the terminal or configured through a higher signal by the BS exists, to the terminal by using a gap indicator including 1 bit. The gap guards may be predefined between the BS and the terminal to exist in all N1-1 slots remaining after excluding at least first slot among the configured or scheduled N1 slots, or the same may be configured to the terminal by the BS through a higher signal. The terminal may determine whether a gap guard exists in the slots through a gap indicator of DCI. For example, when the gap indicator is 0, the terminal may determine that a gap guard does not exist in the slots. When the gap indicator is 1, the terminal may determine that a gap guard exists in the slots.

As another example, it may be predefined between the BS and the terminal that a gap guard exists in the ceiling $(N1/M)^{th}$ or the floor $(N1/M)^{th}$ slot or in the ceiling $(N1/M)+a\ 1^{th}$ or the floor $(N1/M)+1^{th}$ slot, among the configured or scheduled N1 slots or the same may be configured to the terminal by the BS through a higher signal. When the gap indicator is 0, the terminal may determine that a gap guard does not exist in the ceiling $(N1/M)^{th}$ or the floor $(N1/M)^{th}$ slot or in the ceiling $(N1/M)+1^{th}$ or the floor $(N1/M)+1^{th}$ slot. When the gap indicator is 1, the terminal may determine that a gap guard exists in the ceiling $(N1/M)^{th}$ or the floor $(N1/M)^{th}$ slot or in the ceiling $(N1/M)+1^{th}$ or the floor $(N1/M)+1^{th}$ slot.

As another example, it may be predefined between the BS and the terminal that a gap guard exists in the odd-numbered slots or in the even-numbered slots among the configured or scheduled N1 slots, or the same may be configured to the terminal by the BS through a higher signal. When the gap indicator is 0, the terminal may determine that a gap guard does not exist in the slots. When the gap indicator is 1, the terminal may determine that a gap guard exists in the slots.

As another example, it may be predefined between the BS and the terminal or the terminal may be configured by the BS through a higher signal with respect to at least one slot set in which a gap guard may exist among the configured or scheduled N1 slots. For example, it may be predefined between the BS and the terminal that a gap guard may exist in the $2^{nd}$, $5^{th}$, $6^{th}$ and $7^{th}$ slots among the configured or scheduled N1 slots, or the same may be configured to the terminal by the BS through a higher signal. When the gap indicator is 0, the terminal may determine that a gap guard does not exists in the slots. When the gap indicator is 1, the terminal may determine that gap guards exist in the slots.

The gap guard indication using 1 bit is described as an example above and the examples thereof are merely illustrative and are not limited thereto. Further, Embodiment 2 assumes that the gap guard occupies symbols from a symbol of the first symbol index to an N=ceiling (Z/L_symbol) symbol in an ascending order of symbol indices in a slot. However, the gap guard may occupy symbols from a symbol of the last symbol index to an N=ceiling (Z/L_symbol) symbol in a descending order of symbol indices in a slot.

The terminal may determine that a Z μs (e.g., 16 μs) gap or a (Z+TA) μs gap is to be produced with respect to a slot which has been determined by the gap indicator that a gap guard exists therein. In this case, Z is a value which may be predefined between the BS and the terminal or a value which may be configured by the BS through a higher signal. In addition, the value of Z may be configured differently depending on an unlicensed frequency band. The gap may indicate that the terminal does not transmit a separate signal or channel for Z μs in the symbol. When a symbol length is longer than Z μs, the terminal may transmit a UL signal or channel for the time other than Z μs. That is, for a part of time in the symbol (the time remaining after excluding Z μs from the symbol length), the terminal may transmit a UL signal or channel, wherein the signal and the channel transmitted for the part of time may be a signal in which a CP for a symbol subsequent to the symbol is extended. That is, when producing a CP for a symbol subsequent to the symbol including the gap, a CP as long as the symbol length (time) −Z μs may be additionally produced and the additional CP part may be transmitted in the symbol including the gap to produce a gap. When the gap is less than or equal to 16 μs, the terminal may not perform a separate channel access procedure and may perform PUSCH transmission. This is the same as the case where the terminal performs the type 3 channel access procedure and transmits the PUSCH. The terminal has produced a gap in a UL signal or channel transmission interval, but the terminal may transmit a UL signal or channel even at the time after the gap. The terminals may determine that a terminal which has performed UL signal or channel transmission before the indicated gap guard performs the type 3 channel access procedure to perform the UL signal or channel transmission after the gap guard, without a separate indicator indicating the type of the channel access procedure, or irrespective of the type of the channel access procedure included in DCI for scheduling the UL signal or channel transmission. In addition, it may be determined that a terminal which has not performed UL signal or channel transmission before the indicated gap guard performs the type 2-2 channel access procedure and performs the UL signal or channel transmission after the gap guard, based on the result from the channel access procedure.

By the same method, the BS may enable the UE 1 1201 to produce at least a Z μs gap in the slot (i+K1+N1-1) 1207 within the PUSCH time resource area configured from the slot (i+K1) 1205 to the slot (i+K1+N1) 1208 through a SFI, so that the UE 2 1202 may perform the channel access procedure (e.g., type 2-2) in the gap guard 1218 to transmit a UL signal or channel in the slot (i+K1+N1-1) 1207. Accordingly, the BS may perform multiplexing with respect to one or more terminals or one or more UL signals or channels to improve performance of an unlicensed band system.

The number of symbols determined by the terminal that the Z μs (e.g., 16 μs) gap is produced may be different depending on at least one of the value of Z and a SCS. For example, when the SCS is 60 kHz and Z=25 μs, two or more consecutive symbols are required for a gap guard. In other words, N=ceiling (Z/L_symbol) consecutive symbols become a gap guard. For example, when the SCS is 60 kHz, a symbol length (L_symbol) is approximately 18 μs. Therefore, when Z=25 μs, the terminal may determine that time corresponding to the length of one entire symbol and the length of (L_symbol−Z) μs of another symbol is the entire gap.

As another example, when the SCS is one of 15 kHz, 30 kHz, or 60 kHz and Z=16 μs, the terminal may determine that a gap having the length of Z is produced in one symbol.

Change or adjustment of a PUSCH transmission time resource area with respect to the received SFI may be performed by using time required to receive a SFI of the BS or the terminal, and decode and obtain SFI information, and the SFI information obtained by the BS or the terminal. A PUSCH transmission time resource area change or adjustment time point or adjustment slot may be determined according to the minimum processing time required to change the PUSCH transmission time resource area. In consideration of the minimum processing time N2 required to receive, by the terminal, DCI for scheduling PUSCH transmission from the BS and start PUSCH transmission, the terminal may change a PUSCH transmission time resource area using SFI information obtained with respect to PUSCH transmission transmitted from the last symbol in a PDCCH where a SFI is transmitted to the time after N2. The terminal may perform PUSCH transmission with respect to PUSCH transmission from the last symbol in a PDCCH where a SFI is transmitted to the time within N2, by using a PUSCH resource area determined based on the pre-determined PUSCH transmission time resource area or the PUSCH transmission time resource area which has failed to receive a SFI.

Change or adjustment of a PUSCH transmission time resource area with respect to the received SFI may be performed by using time required to receive a SFI of the BS or the terminal, and decode and obtain SFI information, and SFI information obtained by the BS or the terminal. For example, the terminal may produce a gap with respect to at least one symbol according to the received SFI. The terminal may produce a gap by puncturing a PUSCH assigned to a symbol including the gap with respect to the pre-configured PUSCH, or perform rate-matching with respect to the pre-configured PUSCH by using symbols valid for PUSCH transmission among symbols remaining after excluding a symbol including the gap. In order produce the gap, one of the puncturing method and the rate-matching method may be predefined between the BS and the terminal or the terminal may be configured by the BS through a higher layer to determine which method to be used. One of the puncturing method and the rate-matching method may also be used in consideration of the minimum processing time. That is, when a gap is produced after the minimum processing time, the rate-matching method may be used, and when a gap is produced within the minimum processing time, the puncturing method may be used.

In a method of determining or changing a PDSCH/PUSCH resource area with respect to at least one slot by using SFI information, a TBS may be determined according to the determined or changed PDSCH/PUSCH resource area, or the TBS determined with reference to the time point when PDSCH/PUSCH scheduling DCI is received may be maintained.

In the NR system, the BS may transmit data by assigning a frequency resource having the arbitrary number of PRBs and a time resource having the arbitrary number of slots or symbols to the terminal, and scheduling information may be transmitted to the terminal via DCI, a configuration transmitted from higher signaling, or a combination thereof. When the scheduling information is given to the BS and the terminal, the TBS may be determined in the following order:

Stage 1-1: Determine the number of temporary information bits (A)

Stage 1-2: Determine the number of temporary CBs, performing byte alignment (a process of making a multiple of eight), and making a multiple of the number of temporary CBs (C, B)

Stage 1-3: Determine TBS remaining after excluding the number of CRC bits (TBS)

In stage 1-1, a temporary TBS value may be determined in consideration of an amount of a resource area, by which data to be transmitted can be mapped. The number of temporary information bits may be determined by a combination of one or more a code rate (R), a modulation order ($Q_m$), the number of REs to which data is rate-matched and mapped, the number of assigned PRBs or RBs (#PRB), the number of assigned OFDM symbols, the number of assigned slots, and a reference value of the number of REs mapped in one PRB.

For example, A may be determined by the following equation: $A=N_{RE} \times Q_m \times R \times v$. Here, $Q_m$ indicating a modulation order and R indicating a code rate may be included in DCI and transmitted to the terminal. v indicating the number of layers used for the transmission may be transmitted to the terminal via DCI, higher signaling, or a combination thereof. NE may be determined by the base station by using the number of REs mapped via rate matching at the time of data transmission. When both a base station and a terminal know resource assignment information, the base station and the terminal may have the same understanding on $N_{RE}$. In general, data is supposed to be mapped via the rate-matching method when $N_{RE}$ is calculated. However, due to a special reason, such as CSI-RS, URLLC, or UCI transmission, data may be punctured so that the $N_{RE}$ may be calculated to also include an RE which is not actually mapped. This is for enabling the base station and the terminal to have the same understanding on the TBS even in a case where a part of data which is supposed to be arbitrarily mapped without notifying the terminal by the base station has not been transmitted via the puncturing method.

The BS may transmit information on $Q_m$ and R by transmitting an MCS index to the terminal through a defined MCS table. The modulation order may be QPSK, 16QAM, 64QAM, 256QAM, and 1024QAM, etc., and $Q_m$ may be 2 ($Q_m$=2) for QPSK, $Q_m$ may be 4 ($Q_m$=4) for 16QAM, $Q_m$ may be 6 ($Q_m$=6) for 64QAM, $Q_m$ may be 8 ($Q_m$=8) for 256QAM, and $Q_m$ may be 10 ($Q_m$=10) for 1024QAM. That is, $Q_m$ may indicate the number of bits transmittable in the modulated symbol. $Q_m$ and R may be transmitted together via the MCS index, or each of $Q_m$ and R may be transmitted in each bit field. Alternatively, A may be determined according to the following equation: A=(the number of assigned PRBs)×(the number of reference REs per 1 PRB)×$Q_m$×R×v.

In stage 1-2, the number of temporary CBs C is determined by using A determined in stage 1-1, and A is made to be a multiple of eight and a multiple of the number of temporary CBs based on the determined number of temporary CBs. This is for performing byte alignment on the length of CRC added to the finally determined TBS and TB and making the length to be a multiple of a CB.

In stage 1-3, a process of excluding the number of bits which are added for CRC, among above-obtained information bits to be transmitted may be performed.

Therefore, when a PUSCH transmission time domain resource changes, the number of $N_{RE}$s may be changed in a TBS determination method, and accordingly, the TBS can be changed or re-determined.

When the terminal fails to identify the SFI information with respect to a slot configured for PUSCH transmission, at the time of receiving DCI for scheduling PUSCH transmission, as in FIG. 13, the terminal may calculate $N_{RE}$ of each slot, and may accordingly calculate the TBS, with respect to the PUSCH by using the PUSCH time domain resource information 1315 included in DCI.

For example, as illustrated in FIG. 13, the terminal may calculate NR and accordingly may calculate the TBS with respect to each of PUSCHs 1340, 1341, 1342, and 1343 in the each of slots 1305, 1306, 1307, and 1308 configured for PUSCH transmission, using the time domain resource assignment information 1315 included in the DCI. When the terminal receives the SFI information with respect to slots 1305, 1306, 1307, and 1308 configured for PUSCH transmission before the scheduled PUSCH transmission time point or before the minimum processing time N2 required to receive, by the terminal, a PDCCH and to transmit a PUSCH, with reference to the scheduled transmission time point, e.g., the slot (i+K1)−N2 or before the slot (i+K1), the terminal may assume the PUSCH transmission time domain resource assignment such as PUSCHs 1240, 1241, 1242, and 1243 of FIG. 12, and calculate (or change or re-calculate) a TBS.

When the terminal receives the SFI information with respect to the PUSCH transmission slot before the scheduled PUSCH transmission time point or before the minimum processing time N2 required with reference to the scheduled PUSCH transmission time point, the terminal may calculate a TBS by using the time domain resource assignment information 1215 and the SFI information included in DCI, as illustrated in FIG. 12. When the terminal receives the SFI information with respect to the PUSCH transmission slot before the scheduled PUSCH transmission time point or after the minimum processing time N2 required with reference to the scheduled PUSCH transmission time point, the terminal may perform transmission by using the TBS calculated based on the time domain resource assignment information 1315 and the SFI information included in DCI (i.e., the terminal may not use the SFI with respect to the slot), or may perform transmission by puncturing the PUSCH in a symbol determined to be invalid for PUSCH transmission through a SFI, as in FIG. 13. That is, in the above case, the calculated TBS may not be changed.

Another TBS calculation method of changing or re-determining a TBS due to the change of a PUSCH transmission time domain resource is described as follows.

When changing or re-determining a TBS due to the change of a PUSCH transmission time domain resource, since the terminal is to perform processing with respect to data, overhead of the terminal may increase. Accordingly, in order to prevent the overhead of the terminal from unnecessarily increasing, the terminal may use $N_{RE}$ calculated according to FIG. 12 or FIG. 13 and a TBS obtained therefrom without calculating the $N_{RE}$ and changing the TBS, irrespective of whether there is a change in the PUSCH transmission time domain resource.

However, when the TBS is calculated by using the time domain resource assignment information 1315 as in FIG. 13, but data is transmitted by performing rate-matching with respect to the changed PUSCH transmission time resource after the SFI is received as in FIG. 12, the BS may not perform decoding due to the high code rate of the data. For example, when the time domain resource assignment information 1315 or the number of symbols included in DCI is greater than the changed time PUSCH transmission domain resource assignment information or the number of symbols, when transmitting the calculated TBS through the changed PUSCH transmission time area, the code rate for data increases. Accordingly, the terminal may map data with reference to the time domain resource assignment information 1315 included in DCI, and when the PUSCH transmission time domain resource is changed, the terminal may perform puncturing with respect to a resource or a symbol other than the changed PUSCH resource time domain resource and may not transmit the same.

Embodiment 3

In the embodiment, a method is provided for determining a PDSCH/PUSCH time resource area in a BS and a terminal operated in an unlicensed band. More specifically, a method is provided for determining at least one gap guard with respect to PDSCH/PUSCHs transmitted in consecutive multiple slots, wherein the at least one gap guard is determined through DCI commonly transmitted to multiple terminal groups (cell-common or group-common DCI).

In Embodiment 3, it is assumed that one piece of DCI configures or schedules N1 PDSCH/PUSCHs in N1 slots. The maximum value N of N1 may be configured through a higher signal, and N1 indicating the number of actual PDSCH/PUSCH transmission slots or the number of actually transmitted PDSCH/PUSCHs as a value less than or equal to N may be included in the DCI.

The BS may indicate a gap guard in at least one slot via DCI commonly transmitted to at least one terminal. An indicator indicating the gap guard may be transmitted via DCI in which a SFI information or channel occupancy time information of the BS is transmitted, but may also be transmitted via separate DCI. The BS may additionally include an offset value T with respect to a slot where a gap guard exists with reference to a slot where DCI including the gap indicator field is transmitted, wherein the offset value is greater than 0. This allows the BS to guarantee time required while the terminal having received the gap indicator changes at least one piece of PDSCH reception or PUSCH transmission configuration information (e.g., a time resource area or a TBS) configured or scheduled according to the received gap indicator information. In this case, a case where the offset value includes 0 is not excluded.

The offset T may be in a symbol, symbol group, or slot unit, may be predefined between the BS and the terminal, or may be configured by the BS to the terminal by using a higher signal. The offset T may be defined or configured to be one or more values, and the BS may transmit one of the defined or configured offset values via DCI including the gap indicator field. A value of one offset field may indicate multiple offset values different from each other, and the terminal having received the value may determine that a gap exists with respect to a slot or a symbol corresponding to each offset value. When the terminal having received DCI including the gap indicator field has determined that the gap indicator field indicates the existence of a gap (e.g., the gap indicator=1), the terminal may determine that a gap exists in a slot subsequent to the slot corresponding to the offset value with reference to the slot in which DCI including the gap indicator field is received. When the unit of the offset value is a symbol, the terminal may determine that a gap exists in a symbol subsequent to the symbol corresponding to the offset value with reference to the last symbol in a control channel area (or CORESET) in which DCI including the gap indicator field is transmitted, or in a slot including the symbol.

The terminal may determine that a Z µs (e.g., 16 µs) gap or a (Z+TA) µs gap is to be produced with respect to a slot which has been determined by the gap indicator that a gap guard exists therein. Z is a value which may be predefined between the BS and the terminal or a value which may be configured by the BS through a higher signal. In addition, the value of Z may be configured differently depending on an unlicensed frequency band. The gap may indicate that the terminal does not transmit a separate signal or channel for Z µs in the symbol. When a symbol length is longer than Z µs, the terminal may transmit a UL signal or channel for the time other than Z µs. When a symbol length is longer than Z µs, the terminal may transmit a UL signal or channel for the time other than Z µs. That is, for a part of time in the symbol (i.e., the time remaining after excluding Z µs from the symbol length), the terminal may transmit a UL signal or channel, wherein the signal and the channel transmitted for the part of time may be a signal in which a CP for a symbol subsequent to the symbol is extended. When producing a CP for a symbol subsequent to the symbol including the gap, a CP as long as the symbol length (time) −Z µs may be additionally produced and the additional CP part may be transmitted in the symbol including the gap to produce a gap. When the gap is less than or equal to 16 µs, the terminal may not perform a separate channel access procedure and may perform PUSCH transmission. This is the same as when the terminal performs the type 3 channel access procedure and transmits the PUSCH. In other words, the terminal has produced a gap in a UL signal or channel transmission interval, but the terminal may transmit a UL signal or channel even at the time after the gap. The terminal may determine that a terminal which has performed UL signal or channel transmission before the indicated gap guard performs the type 3 channel access procedure to perform the UL signal or channel transmission after the gap guard, without a separate indicator indicating the type of the channel access procedure, or irrespective of the type of the channel access procedure included in DCI for scheduling the UL signal or channel transmission. In addition, it may be determined that a terminal which has not performed UL signal or channel transmission before the indicated gap guard performs the type 2-2 channel access procedure and performs the UL signal or channel transmission after the gap guard, based on the result from the channel access procedure.

Referring again to FIG. 12, the BS may indicate the UE 1 1201 to produce at least a Z µs gap in the slot (i+K1+N1-1) 1207 within the PUSCH time resource area configured from the slot (i+K1) 1205 to the slot (i+K1+N1) 1208 through a gap indicator transmitted via group-common DCI. For example, when a gap indicator is activated in group-common DCI transmitted in the slot i, and the value of a gap indicator offset field is (K1+N1-1), the terminal configured for PUSCH transmission in the slot (i+K1+N1-1) 1207 may produce at least a Z µs gap in the slot (i+K1+N1-1) 1207, so that the UE 2 1202 may perform the channel access procedure (for example, type 2-2) in the gap guard 1218 to transmit a UL signal or channel in the slot (i+K1+N1-1) 1207. Accordingly, the BS may perform multiplexing with respect to one or more terminals or one or more UL signals or channels to improve performance of an unlicensed band system.

The number of symbols determined by the terminal that the Z µs (e.g., 16 µs) gap is produced may be different depending on at least one of the value of Z and a SCS. For example, when the SCS is 60 kHz and Z=25 µs, two or more consecutive symbols are required for a gap guard. N=ceiling (Z/L_symbol) consecutive symbols become a gap guard.

When the SCS is 60 kHz, a symbol length (L_symbol) is approximately 18 µs. Therefore, when Z=25 µs, the terminal may determine that time corresponding to the length of one entire symbol and the length of (L_symbol−Z) µs of another symbol is the entire gap. As another example, when the SCS is one of 15 kHz, 30 kHz, or 60 kHz and Z=16 µs, the terminal may determine that a gap having the length of Z is produced in one symbol.

Change or adjustment of a PUSCH transmission time resource area with respect to the received gap indicator may be performed by using time required to receive a gap indicator of the BS or the terminal, and decode and obtain gap indicator information, and the gap indicator information obtained by the BS or the terminal. A PUSCH transmission time resource area change or adjustment time point or adjustment slot may be determined according to the minimum processing time required to change the PUSCH transmission time resource area. In consideration of the minimum processing time N2 required to receive, by the terminal, DCI for scheduling PUSCH transmission from the BS and start PUSCH transmission, the terminal may change a PUSCH transmission time resource area using gap indicator information obtained with respect to PUSCH transmission transmitted from the last symbol in a PDCCH where a gap indicator is transmitted to the time after N2. The terminal may perform PUSCH transmission with respect to PUSCH transmission from the last symbol in a PDCCH where a gap indicator is transmitted to the time within N2, by using a PUSCH resource area determined based on the pre-determined PUSCH transmission time resource area or the PUSCH transmission time resource area which has failed to receive a gap indicator.

Change or adjustment of a PUSCH transmission time resource area with respect to the received gap indicator may be performed by using time required to receive a gap indicator of the BS or the terminal, and decode and obtain gap indicator information, and gap indicator information obtained by the BS or the terminal. For example, the terminal may produce a gap with respect to at least one symbol according to the received gap indicator. The terminal may produce a gap by puncturing a PUSCH assigned to a symbol including the gap with respect to the pre-configured PUSCH, or perform rate-matching with respect to the pre-configured PUSCH by using symbols valid for PUSCH transmission among symbols remaining after excluding a symbol including the gap. In order produce the gap, one of the puncturing method and the rate-matching method may be predefined between the BS and the terminal or the terminal may be configured by the BS through a higher layer to determine which method to be used. One of the puncturing method and the rate-matching method may also be used in consideration of the minimum processing time. That is, when a gap is produced after the minimum processing time, the rate-matching method may be used, and when a gap is produced within the minimum processing time, the puncturing method may be used.

In a method of determining or changing a PDSCH/PUSCH resource area with respect to at least one slot by using gap indicator information, a TBS may be determined according to the determined or changed PDSCH/PUSCH resource area, or the TBS determined with reference to the time point when PDSCH/PUSCH scheduling DCI is received may be maintained.

In the NR system, the BS may transmit data by assigning a frequency resource having the arbitrary number of PRBs and a time resource having the arbitrary number of slots or symbols to the terminal, and scheduling information may be transmitted to the terminal via DCI, a configuration transmitted from higher signaling, or a combination thereof. When the scheduling information is given to the BS and the terminal, the TBS may be determined in the following order:

Stage 1-1: Determine the number of temporary information bits (A)

Stage 1-2: Determine the number of temporary CBs, performing byte alignment (a process of making a multiple of eight), and making a multiple of the number of temporary CBs (C, B)

Stage 1-3: Determine TBS remaining after excluding the number of CRC bits (TBS)

In stage 1-1, a temporary TBS value may be determined in consideration of an amount of a resource area, by which data to be transmitted can be mapped. The number of temporary information bits may be determined by a combination of one or more a code rate (R), a modulation order ($Q_m$), the number of REs to which data is rate-matched and mapped, the number of assigned PRBs or RBs (#PRB), the number of assigned OFDM symbols, the number of assigned slots, and a reference value of the number of REs mapped in one PRB. For example, A may be determined using Equation (2) as described above.

The BS may transmit information on $Q_m$ and R by transmitting an MCS index to the terminal through a defined MCS table. The modulation order may be QPSK, 16QAM, 64QAM, 256QAM, and 1024QAM, etc., and $Q_m$ may be 2 ($Q_m=2$) for QPSK, $Q_m$ may be 4 ($Q_m=4$) for 16QAM, $Q_m$ may be 6 ($Q=6$) for 64QAM, $Q_m$ may be 8 ($Q_m=8$) for 256QAM, and $Q_m$ may be 10 ($Q_m=10$) for 1024QAM. That is, $Q_m$ may indicate the number of bits transmittable in the modulated symbol. $Q_m$ and R may be transmitted together via the MCS index, or each of $Q_m$ and R may be transmitted in each bit field. Alternatively, A may be determined according to Equation (3) as described above.

In stage 1-2, the number of temporary CBs C is determined by using A determined in stage 1-1, and A is made to be a multiple of eight and a multiple of the number of temporary CBs based on the determined number of temporary CBs. This is for performing byte alignment on the length of CRC added to the finally determined TBS and TB and making the length to be a multiple of a CB.

In stage 1-3, a process of excluding the number of bits which are added for CRC, among above-obtained information bits to be transmitted, may be performed.

Therefore, when a PUSCH transmission time domain resource changes, the number of $N_{REs}$ may be changed in a TBS determination method, and accordingly, the TBS can be changed or re-determined.

When the terminal fails to identify the gap indicator information with respect to a slot configured for PUSCH transmission, at the time of receiving DCI for scheduling PUSCH transmission, the terminal may calculate, as illustrated in FIG. 13, NR of each slot, and may accordingly calculate the TBS, with respect to the PUSCH by using the PUSCH time domain resource information 1315 included in DCI.

For example, as illustrated in FIG. 13, the terminal may calculate NR and accordingly may calculate the TBS with respect to each of PUSCHs 1340, 1341, 1342, and 1343 in the each of slots 1305, 1306, 1307, and 1308 configured for PUSCH transmission, using the time domain resource assignment information 1315 included in the DCI. When the terminal receives the gap indicator information with respect to slots 1305, 1306, 1307, and 1308 configured for PUSCH transmission before the scheduled PUSCH transmission time point or before the minimum processing time N2 required to receive, by the terminal, a PDCCH and to transmit a PUSCH, with reference to the scheduled transmission time point, for example, the slot (i+K1)−N2 or before the slot (i+K1), the terminal may assume the PUSCH transmission time domain resource assignment such as PUSCHs 1240, 1241, 1242, and 1243 of FIG. 12, and calculate (or change or re-calculate) a TBS.

When the terminal receives the gap indicator information with respect to the PUSCH transmission slot before the scheduled PUSCH transmission time point or before the minimum processing time N2 required with reference to the scheduled PUSCH transmission time point, the terminal may calculate a TBS by using the time domain resource assignment information 1215 and the gap indicator information included in DCI, as in illustrated FIG. 12.

When the terminal receives the gap indicator information with respect to the PUSCH transmission slot before the scheduled PUSCH transmission time point or after the minimum processing time N2 required with reference to the scheduled PUSCH transmission time point, the terminal may perform transmission by using the TBS calculated based on the time domain resource assignment information 1315 and the gap indicator information included in DCI (i.e., the terminal may not use the gap indicator with respect to the slot), or may perform transmission by puncturing the PUSCH in a symbol determined to be invalid for PUSCH transmission through a gap indicator, as in FIG. 13. That is, in the above case, the calculated TBS may not be changed.

Another TBS calculation method of changing or re-determining a TBS due to the change of a PUSCH transmission time domain resource is described as follows.

When changing or re-determining a TBS due to the change of a PUSCH transmission time domain resource, since the terminal is to perform processing with respect to data, overhead of the terminal may increase. Accordingly, in order to prevent the overhead of the terminal from unnecessarily increasing, the terminal may use $N_{RE}$ calculated according to FIG. 12 or FIG. 13 and a TBS obtained therefrom without calculating the $N_{RE}$ and changing the TBS, irrespective of whether there is a change in the PUSCH transmission time domain resource.

However, when the TBS is calculated by using the time domain resource assignment information 1315 as illustrated in FIG. 13, but data is transmitted by performing rate-matching with respect to the changed PUSCH transmission time resource after the SFI is received as illustrated in FIG. 12, the BS may not perform decoding due to the high code rate of the data. For example, when the time domain resource assignment information 1315 or the number of symbols included in DC is greater than the changed PUSCH transmission time domain resource assignment information or the number of symbols, when transmitting the calculated TBS through the changed PUSCH transmission time area, the code rate for data increases. Accordingly, the terminal may map data with reference to the time domain resource assignment information 1315 included in DCI, and when the PUSCH transmission time domain resource is changed, the terminal may perform puncturing with respect to a resource or a symbol other than the changed PUSCH resource time domain resource and may not transmit the same.

Embodiment 4

In the embodiment, a method is provided for determining a PUSCH transmission/reception resource area in a BS and a terminal operated in an unlicensed band. More specifically, the terminal may be configured to use a transmission method of transmitting a UL signal or channel according to transmission or reception configuration information pre-configured via a higher signal and/or DCI without receiving scheduling DCI, from the BS. The transmission method is referred to as a semi-persistent scheduling (SPS) scheme, a grant-free (unauthorized) scheme, or a configured grant scheme. In the SPS, the grant-free, or the configured grant scheme, since the terminal may transmit a UL signal or channel during the time when the BS is to occupy and use an unlicensed band, or while the BS is occupying and using the unlicensed band after the channel access procedure without receiving scheduling DCI from the BS, efficient operation of the BS may be difficult. Therefore, in Embodiment 4, a method is provided for determining a UL signal or channel transmittable resource based on an SPS, a grant-free (unauthorized), or a configured grant scheme, and the terminal may perform transmission in a UL signal or channel transmission resource based on the scheme determined to be valid.

The embodiments described hereinafter may be implemented in a combination with one or more of Embodiments 1 to 3. For example, the terminal and the BS may be operated by a scheme in a combination of Embodiment 4 and Embodiment 1, and the terminal and the BS may be operated by a scheme in a combination of two or more Embodiments 1, 2, and 3 and Embodiment 4.

A procedure of transmitting a UL signal or channel of the terminal may be largely divided into two cases as follows.

The terminal may receive DCI transmitted via a DL control channel (e.g., a PDCCH) from the BS, and perform UL signal or channel transmission (e.g., a PUSCH) according to the received DCI. In the disclosure, a scheme in which the terminal receives DCI and performs UL transmission or reception according to the received DCI may be defined as a first UL transmission or reception scheme or a first transmission type.

For another UL transmission or reception method, a transmission method in which the terminal may transmit a UL signal or channel according to transmission or reception configuration information pre-configured via a higher signal or DCI, without receiving separate DCI from the BS may be proposed, which corresponds to the SPS, the grant-free or the configured grant transmission scheme. In the disclosure, a scheme in which the terminal may perform UL transmission without receiving DCI may be referred to as a second UL transmission scheme, a second UL transport scheme, or a second transmission type. The second UL transmission or reception of the terminal may start after the terminal receives DCI indicating activation with respect to the second UL transmission configured via a higher signal from the BS. When the terminal receives DCI indicating release of the second UL transmission from the BS, the terminal may not perform the configured second UL transmission.

As described above, a scheme in which all configuration information relating to the second UL transmission scheme is received by using a higher signal or DCI and activated or released may be defined as a type 2 second transmission scheme. A scheme in which it is determined that the terminal receives all configuration information relating to the second UL transmission via a higher signal, without receiving separate DCI for activation or release with respect to second UL transmission of the terminal, and the second UL transmission is activated immediately after receiving the configuration information may be defined as a type 1 second transmission scheme. The BS may reconfigure or release configuration related to the type 1 second transmission scheme configured to the terminal, by reconfiguring a higher signal relating to the type 1 second transmission scheme.

The terminal may receive configuration information for UL transmission of the second transmission scheme from the BS via a higher signal as follows:

frequencyHopping: A field indicating whether intra-slot hopping or inter-slot hopping is used. When the field is missing, frequency hopping is inactivated.

cg-DMRS-Configuration: An indicator of a demodulation reference signal (DMRS) configuration information.

mcs-Table: A field indicating whether a 256QAM MCS table or a new64QAM MCS table is used when transmitting a PUSCH without transform precoding. When the field is missing, a 64QAM MCS table is used.

mcs-TableTransformPrecoder: A field indicating an MCS table used by the terminal when transmitting a transform precoding-based PUSCH. When this field is missing, a 64QAM MCS table is used.

uci-OnPUSCH: An indicator of whether to applies a beta-offset by using one of a dynamic and a quasi-static scheme.

resourceAllocation: An indication of whether a resource allocation type is 1 or 2.

rbg-Size: An indication of one of two configurable RBG sizes.

powerControlLoopToUse: An indication of whether to apply closed loop power control.

p0-PUSCH-Alpha: An indication of whether to apply a p0-PUSCH-alpha value.

transformPrecoder: An indication of whether to apply transformer precoding. When this field is missing, msg3 configuration information is to be followed.

nrofHARQ-Processes: An indication of the number of configured HARQ process.

repK: An indication of the number of times of repetitive transmission.

repK-RV: A field that is inactivated when, at the time of repetitive transmission, an RV pattern applied for each repetitive transmission and the number of times of repetitive transmission is 1.

periodicity: An indication of a transmission periodicity and exists from the minimum 2 symbol to 640 to 5120 slot units according to the maximum SCS.

configuredGrantTimer: A timer, configured in multiple periodicity units, for guaranteeing re-transmission.

According to the type 1 second transmission scheme, the terminal may additionally receive the configuration information below via a higher signal (e.g., rrc-ConfiguredUplinkGrant) from the BS. According to the type 2 second transmission scheme, the terminal may receive at least one piece of configuration information below via DCI.

timeDomainOffset: A value indicating the first slot where UL transmission of the second transmission or reception type starts, and is information in a slot unit based on the system frame number (SFN) 0.

timeDomainAllocation: A field indicating a UL transmission time resource area of the second transmission or reception type, and a startSymbolAndLength or an SLIV value.

frequencyDomainAllocation: A field indicating a UL transmission frequency resource area of the second transmission or reception type.

antennaPort: An indication of antenna port configuration information applied for UL transmission of the second transmission or reception type.

dmrs-SeqInitialization: A field configured when the transform precoder is inactivated.

precodingAndNumberOfLayers srs-ResourceIndicator: A field indicating SRS resource configuration information.

mcsAndTBS: An indication of an MCS and a TBS applied for UL transmission of the second transmission or reception type.

frequencyHoppingOffset: An indication of a frequencyhoppingoffset value.

pathlossReferenceIndex

Configuration information relating to the second transmission scheme may be configured according to a primary cell (Pcell) or a secondary cell (Scell). In addition, the configuration information may be configured according to each BWP. One or a plurality of second transmission schemes may be configured according to a specific cell or each BWP.

A method of determining a UL signal or channel transmission resource (hereinafter, referred to as a second UL transmission resource) by a terminal according to the second transmission scheme will be described as follows.

The terminal may be configured by the BS through a higher signal to receive periodicity information P and an offset value relating to a second UL transmission resource. Each of the periodicity and the offset value may be in at least one of the absolute time (e.g., ms), a slot, or a symbol unit. Generally, the value of the offset value may be less than or equal to the periodicity, and the units of the periodicity and the offset value may be different from each other. In addition, the offset value may be an offset value with reference to specific time (e.g., SFN 0).

In this case, according to the type 2 second UL transmission, the terminal may receive the offset information via DCI for activating the type 2 second UL transmission. The offset value may be an offset value with reference to the DCI reception slot.

More specifically, the terminal may be configured by the BS via a higher signal to receive periodicity information and an offset value relating to the second UL transmission resource. In this case, the offset value is a value applied with reference to the specific time (e.g., SFN 0) or a slot corresponding the specific time according to the type 1 second UL transmission, and the offset value is a value applied with reference to a slot having received DCI for activating the second UL transmission according to the type 2 second UL transmission. The terminal may determine the $N^{th}$ UL transmission resource based on the offset value or the periodicity information configured via the higher signal, and may be expressed in Equation (4) below.

Equation (4) may be used to determine the type 1 second UL transmission resource.

$$[(SFN \times numberOfSlotsPerFrame \times numberOfSymbolsPerSlot)+(\text{slot number in the frame} \times numberOfSymbolsPerSlot)+\text{symbol number in the slot}]=(timeDomainOffset \times numberOfSymbolsPerSlot+symbolstart+N \times periodicity) \bmod (1024 \times numberOfSlotsPerFrame \times numberOfSymbolsPerSlot), \text{ for all } N >= 0 \quad (4)$$

Equation (5), below, may be used to determine the type 2 second UL transmission resource.

$$[(SFN \times numberOfSlotsPerFrame \times numberOfSymbolsPerSlot)+(\text{slot number in the frame} \times numberOfSymbolsPerSlot)+\text{symbol number in the slot}]=[(SFNstart\ time \times numberOfSlotsPerFrame \times numberOfSymbolsPerSlot+slotstart\ time \times numberOfSymbolsPerSlot+symbolstart\ time)+N \times periodicity] \bmod (1024 \times numberOfSlotsPerFrame \times numberOfSymbolsPerSlot), \text{ for all } N >= 0 \quad (5)$$

In Equations (4) and (5), numberOfSlotsPerFrame indicates the number of a slot included in a radio frame defined or configured in a carrier or a cell configured for the second UL transmission or for 10 ms. SFN_start time or slot_start time indicates a slot having received DCI for indicting a start or activation of the second UL transmission. The offset value is a value configured via a higher signal (in Equation (4)), or a value received via time domain resource assignment information included in DCI for starting or activating the second UL transmission (in Equation (5)).

The terminal may be configured to receive at least one of HARQ process IDs via a higher signal with respect to UL transmission through the second UL transmission scheme configured as above, and the HARQ process ID may be calculated with respect to the configured resource as shown in Equation (6).

$$\text{HARQ Process ID}=[\text{floor}(CURRENT\_symbol/periodicity)] \bmod nrofHARQ\text{-}Processes \quad (6)$$

In Equation (6), CURRENT_symbol=(SFN×numberOfSlotsPerFrame×numberOfSymbolsPerSlot+slot number in the frame×numberOSymbolsPerSlot+symbol number in the slot), and numberOfSlotsPerFrame and numberOfSymbolsPerSlot may mean the number of consecutive slots constituting of a frame and the number of consecutive symbols constituting a slot, respectively. nrofHARQ-Processes is the number of an HARQ process configured by the BS to the terminal via a higher signal with respect to the UL transmission through the second UL transmission scheme, and may generally have a value from 1 to 16. CURRENT_symbol is an index of the first symbol with respect to the initial transmission during repK times of repetitive transmission.

The terminal which is to transmit a PUSCH in the second UL transmission scheme via the unlicensed band may perform the channel access procedure without receiving scheduling DCI from the BS, and then transmit a second UL signal or channel via the second UL transmission resource. Accordingly, even when the BS is to occupy and use the unlicensed band, or while the BS is occupying and using the unlicensed band, the terminal may transmit a second UL signal or channel.

Therefore, according to one of information relating to whether the BS occupies or uses the unlicensed band, and channel occupancy time of the BS (e.g., at least one of information on a channel occupancy starting slot and/or symbol of the BS, information on a channel occupancy ending slot and/or symbol of the BS, or information on a channel occupancy slot and/or symbol of the remaining BS), and information on the SFI information relating to at least one of slots in channel occupancy time of the BS indicated by DCI, the terminal may determine whether it is possible to transmit a second UL signal or channel in the configured second UL transmission resource.

Additionally, the BS may indicate to the terminal whether it is possible to transmit a second UL signal or channel in channel occupancy time of the BS, by using at least one field (a second UL transmittable indicator or a COT sharing indicator) among DCI transmitted via a group-common control channel. When the terminal receives DCI transmitted via the group-common control channel, and a second UL transmittable indicator of DCI indicates that transmission is allowed or possible (or sharing is allowed or possible), the terminal may determine that the second UL signal or channel transmission is possible via the second UL transmission resource, and transmit the second UL signal or channel. When the second UL transmittable indicator of the DCI indicates that transmission is disallowed or impossible (or sharing is disallowed or impossible), the terminal may abort or omit the second UL signal or channel transmission via the second UL transmission resource, and may not transmit the second UL signal or channel. In this case, the terminal may be configured by the BS via a higher signal to receive whether the DCI transmitted via the group-common control channel includes the second UL transmittable indicator or the COT sharing indicator field. Here, it may be predefined between the BS and the terminal that DCI transmitted via the group-common control channel for the unlicensed band cell always includes the second UL transmittable indicator or the COT sharing indicator field.

Hereinafter, for convenience of description, determining, by the terminal, whether the second UL signal or channel is transmittable in the configured second UL transmission resource indicates determining whether the second UL signal or channel is transmittable with respect to the second UL transmission resource configured in at least one symbol of the slot k.

When DCI transmitted via at least one of a group-common control channel and a DL control channel does not include a second UL transmittable indicator or a COT sharing indicator field (Case 1), a condition and a method of determining, by the terminal, whether transmission of a second UL signal or channel is possible is as follows. When a second UL transmission resource is included in unlicensed band occupancy time of the BS (Case 1-1) or not included (Case 1-2), the terminal may determine whether the second UL signal or channel is transmittable according to at least one of second UL transmission resource or slot format information with respect to a slot including the second UL transmission resource.

Case 1-1, wherein the second UL transmission resource is included in the unlicensed band occupancy time of the BS, will be described below:

When the terminal configured to receive the SFI information via DCI has received DCI including the slot format information with respect to at least one of the second UL transmission resource or the slot including the second UL transmission resource, when the second UL resource is indicated by a UL symbol and/or a flexible symbol, or when the higher signal configuration information is not provided, the terminal may determine that the configured or activated second UL transmission resource is a resource valid for the second UL signal or channel transmission, and transmit the second UL signal or channel via the resource (operation 1). Even when the second UL transmission resource is indicated by a UL symbol and/or a flexible symbol, the terminal may also determine that the configured and activated second UL transmission resource is a resource not valid for the second UL signal or channel transmission, and abort or omit the second UL signal or channel transmission via the resource. That is, the terminal may not perform the second UL signal or channel via the second UL transmission resource (operation 2).

When the terminal configured to receive the SFI information via DCI has failed to receive DCI including the slot format information with respect to at least one of the second UL transmission resource or the slot including the second UL transmission resource, when the second UL resource is indicated by a UL symbol and/or a flexible symbol via higher signal configuration information (e.g., TDD-UL-DL-ConfigurationCommon or TDD-UL-DL-ConfigDedicated), or when the higher signal configuration information is not provided, the terminal may determine that the configured and activated second UL transmission resource is a resource valid for the second UL signal or channel transmission, and transmit the second UL signal or channel via the resource (operation 1). In this case, when the second UL transmission resource is indicated by a UL symbol and/or a flexible symbol via higher signal configuration information (for example, TDD-UL-DL-ConfigurationCommon or TDD-UL-DL-ConfigDedicated), the terminal may determine that the configured and activated second UL transmission resource is a resource not valid for the second UL signal or channel transmission, and abort or omit the second UL signal or channel transmission via the resource. That is, the terminal may not perform the second UL signal or channel via the second UL transmission resource (operation 2).

When the terminal not configured to receive the SFI information via DCI has received information relating to the slot format via a higher signal (an SIB and/or an RRC), when the second UL resource is indicated by a UL symbol and/or a flexible symbol via higher signal configuration information (e.g., TDD-UL-DL-ConfiguarationCommon or TDD-UL-DL-ConfigDedicated), the terminal may determine that the configured and activated second UL transmission resource is a resource valid for the second UL signal or channel transmission, and transmit the second UL signal or channel via the resource. In this case, even when the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource not valid for the second UL signal or channel transmission, and abort and omit the second UL signal or channel transmission via the resource. That is, the terminal may not perform the second UL signal or channel via the second UL transmission resource (operation 2).

The terminal that has not received or has not been provided with the slot format information with respect to the second UL transmission resource via a higher signal and DCI may determine that the configured and activated second UL transmission resource is a resource not valid for the second UL signal or channel transmission, and abort or omit the second UL signal or channel transmission via the resource. That is, the terminal may not transmit the second UL signal or channel via the second UL transmission resource (operation 2). Even though the terminal has failed to receive the slot format information with respect to the second UL transmission resource, the terminal may determine that the configured and activated second UL transmission resource is a resource valid for the second UL signal or channel transmission, and transmit the second UL signal or channel via the resource (operation 1).

Case 1-2, wherein the second UL transmission resource is not included in the unlicensed band occupancy time of the BS, will be described below:

When the terminal has at least received information relating to a slot format via a higher signal (an SIB and/or an RRC), when the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource valid for the second UL signal or channel transmission, and transmit the second UL signal or channel via the resource (operation 1). Even when the second UL transmission resource is indicated by a UL symbol and/or a flexible symbol via higher signal configuration information (e.g., TDD-UL-DL-ConfigurationCommon or TDD-UL-DL-ConfigDedicated), the terminal may also determine that the configured and activated second UL transmission resource is a resource not valid for the second UL signal or channel transmission, and abort or omit the second UL signal or channel transmission via the resource. That is, the terminal may not perform the second UL signal or channel via the second UL transmission resource (operation 2). The above-described case may be applied to when the terminal configured to receive the SFI information via DCI has not at least received DCI including the slot format information with respect to a second UL transmission resource or a slot including the second UL transmission resource.

When DCI transmitted via at least one of a group-common control channel and a DL control channel includes a second UL transmittable indicator or a COT sharing indicator field (Case 2), when a second UL transmission resource is included in unlicensed band occupancy time of the BS (Case 2-1) or not included (Case 2-2), the terminal may determine whether the second UL signal or channel is transmittable according to at least one piece of slot format information with respect to a second UL transmission resource or a slot including the second UL transmission resource.

In Case 2-1, where the second UL transmission resource is included in the unlicensed band occupancy time of the BS, when a second UL transmittable indicator indicates that transmission is allowed (or sharing is allowed) through a second UL transmittable indicator or a COT sharing indicator field included in the DCI received by the terminal will be described below:

when the terminal configured to receive the SFI information via DCI has received at least one piece of DCI including the slot format information with respect to the second UL transmission resource or the slot including the second UL transmission resource, when the second UL transmission resource is indicated by a UL symbol and/or a flexible symbol, the terminal may determine the configured and activated second UL transmission resource is a resource valid for the second UL signal or channel transmission, and transmit the second UL signal or channel via the resource (operation 1).

When the terminal configured to receive the SFI information via DCI has failed to receive at least one piece of DCI including the second UL transmission resource or the slot including the second UL transmission resource, when the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource valid for the second UL signal or channel transmission, and transmit the second UL signal or channel via the resource (operation 1). This may occur when it is determined that the second UL transmittable indicator or the COT sharing indicator field information is applied only for a slot or time in which the SFI is transmitted via the DCI. In this case, when the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource not valid for the second UL signal or channel transmission, and abort or omit the second UL signal or channel transmission via the resource. That is, the terminal may not perform the second UL signal or channel via the second UL transmission resource (operation 2). This may occur when it is determined that the second UL transmittable indicator or the COT sharing indicator field information is applied to the entire channel occupancy time of the BS.

When the terminal not configured to receive information relating to the slot format via DCI has received the information relating to the slot format via a higher signal (an SIB and/or an RRC), when the second UL transmission resource is a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource valid for the second UL signal or channel transmission, and transmit the second UL signal or channel via the resource. Even when the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource not valid for the second UL signal or channel transmission, and abort or omit the second UL signal or channel transmission via the resource. That is, the terminal may not transmit the second UL signal or channel via the second UL transmission resource (operation 2).

The terminal that has not received or has not been provided with the slot format information with respect to the second UL transmission resource via a higher signal and DCI may determine that the configured and activated second UL transmission resource is a resource valid for the second UL signal or channel transmission, and abort or omit the second UL signal or channel transmission via the resource. That is, the terminal may not transmit the second UL signal or channel via the second UL transmission resource (operation 2). Even though the terminal has not provided with the slot format information relating to the second UL transmission resource, the terminal may determine that the configured and activated second UL transmission resource is a resource not valid for the second UL signal or channel transmission, and transmit the second UL signal or channel via the resource (operation 1).

When the second UL transmission resource is included in the unlicensed band occupancy time of the BS (Case 2-1), a case (Case 2-1-2) where a second UL transmittable indicator indicates that transmission is disallowed or impossible (or sharing is disallowed or impossible) through a second UL transmittable indicator or a COT sharing indicator field included in the DCI received by the terminal, will be described below:

When the terminal configured to receive the SFI information via DCI has received at least one piece of DCI including the slot format information relating to the second UL transmission resource or the slot including the second UL transmission resource, even when the second UL transmission resource is indicated by a UL symbol and/or a flexible symbol, the terminal may determine that the second UL transmission resource configured and activated according to the second UL transmittable indicator or the COT sharing indicator field information is a resource not valid for the second UL signal or channel transmission, and abort and omit the second UL signal or channel resource via the resource. That is, the terminal may not perform the second UL signal or channel via the second UL transmission resource (operation 2).

When the terminal configured to receive the SFI information via DCI has not received at least one piece of DCI including the slot format information relating to the second UL transmission resource or the slot including the second UL transmission resource, when the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource valid for the second UL signal or channel transmission, and transmit the second UL signal or channel via the resource (operation 1). This may occur when it is determined that the second UL transmittable indicator or the COT sharing indicator field information is applied only for a slot or time in which the SFI is transmitted via the DCI. When the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource not valid for the second UL signal or channel transmission, and abort or omit the second UL signal or channel transmission via the resource. That is, the terminal may not transmit the second UL signal or channel via the second UL transmission resource (operation 2). This may occur when it is determined that the second UL transmittable indicator or the COT sharing indicator field information is applied to the entire channel occupancy time of the BS.

When the terminal configured to receive information relating to the slot format via DCI has received information relating to the slot format via a higher signal (an SIB and/or an RRC), when the second UL transmission resource is indicated by a UL symbol and/or a flexible symbol via the higher signal configuration information (e.g., TDD-UL-DL-ConfigurationCommon or TDD-UL-DL-ConfigDedicated), the terminal may determine that the configured and activated second UL transmission resource is valid for the second UL signal or channel transmission, and transmit the second UL signal or channel via the resource (operation 1). When the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource not valid for the second UL signal or channel transmission, and abort or omit the second UL signal or channel transmission via the resource. That is, the terminal may not transmit the second UL signal or channel via the second UL transmission resource (operation 2).

The terminal that has not received or has not been provided with the slot format information with respect to the second UL transmission resource via a higher signal and DCI may determine that the configured and activated second UL transmission resource is a resource valid for the second UL signal or channel transmission, and transmit the second UL signal or channel via the resource (operation 1). Even though the terminal has not been provided with the higher signal slot format information relating to the second UL transmission resource, the terminal may determine that the configured and activated second UL transmission resource is a resource not valid for the second UL signal or channel transmission, and abort or omit the second UL signal or channel transmission via the resource. That is, the terminal may not transmit the second UL signal or channel via the second UL transmission resource (operation 2).

When the second UL transmission resource is not included in the unlicensed band occupancy time of the BS (Case 2-2), a condition and a method of determining, by the terminal, whether transmission of a second UL or channel is possible as descried below:

When the terminal has received at least one piece of the slot format information relating to the second UL transmission resource via a higher signal, when the second UL transmission resource is indicated by a UL symbol and/or a flexible symbol via higher signal configuration information (e.g., TDD-UL-DL-ConfigurationCommon or TDD-UL-DL-ConfigDedicated), the terminal may determine that the configured and activated second UL transmission resource is a resource valid for the second UL signal or channel transmission, and transmit the second UL signal or channel via the resource (operation 1).

The terminal that has not received or has not been provided with the slot format information relating to the second UL transmission resource via a higher signal and DCI may determine that the configured and activated second UL transmission resource is a resource valid for the second UL signal or channel transmission, and may transmit the second UL signal or channel via the resource (operation 1). Even though the terminal has not been provided with the higher signal slot format information relating to the second UL transmission resource, the terminal may determine that the configured and activated second UL transmission resource is a resource not valid for the second UL signal or channel transmission, and abort or omit the second UL signal or channel transmission via the resource. That is, the terminal may not transmit the second UL signal or channel via the second UL transmission resource (operation 2).

The terminal may be configured to perform the second UL signal or channel transmission by the operation 1 or operation 2 with respect to the second UL transmission resource configured and activated by the BS via the higher signal. Whether to perform the second UL signal or channel transmission by the operation 1 or operation 2 with respect to the second UL transmission resource may be configured or defined differently depending on whether the cell or the BWP to which the second UL transmission resource is configured is a licensed band or an unlicensed band. For example, when the second UL resource is in the cell or the BWP of the unlicensed band, the terminal may perform the second UL signal or channel transmission with respect to the second UL transmission resource by the same method as operation 1, and when the second UL resource is in the cell or the BWP of the licensed band, the terminal may be configured or predefined to perform the second UL signal or channel transmission with respect to the second UL transmission resource by the same method as operation 2. The operation method with respect to the second UL transmission resource may be independently configured or defined according to various cases and/or conditions included in various embodiments of the disclosure.

For example, when the second UL transmission resource is included in the unlicensed band occupancy time of the BS, the second UL transmittable indicator indicates that the transmission is allowed (or sharing is allowed) through the second UL transmittable indicator or the COT sharing indicator field. When the terminal configured to receive the SFI information via DCI has received at least one piece of DCI including the second format information relating to the second UL transmission resource or the slot including the second UL transmission resource, when the second UL transmission resource is a UL symbol or a flexible symbol, the terminal may follow operation 1 When the terminal configured to receive the SFI information via DCI has failed to receive at least one piece of DCI including the slot format information relating to the second UL transmission resource or the slot including the second UL transmission resource may be configured or defined to follow operation 2.

Additionally, the operation method with respect to the second UL transmission resource may also be independently configured or defined according to whether the slot format information indicated by the second UL transmission resource via a higher signal and/or DCI is a UL symbol or a flexible symbol.

When the second UL transmission resource is included in the unlicensed band occupancy time of the BS, the second UL transmittable indicator indicates that the transmission is allowed (or sharing is allowed) through the second UL transmittable indicator or the COT sharing indicator field included in the DCI received by the terminal, and the terminal configured to receive the SFI information via DCI has received at least one piece of DCI including the SFI information relating to the second UL transmission resource or the slot including the second UL transmission resource, when the second UL transmission resource is a UL symbol, the terminal may follow operation 1. However, when the second UL transmission resource is a flexible symbol, the terminal may follow operation 2.

In addition, the terminal may determine that the BS is not occupying an unlicensed band when the terminal has failed to receive or identify information relating to whether the BS occupies an unlicensed band via DCI transmitted through a DL group-common control channel or a DL control channel, or according to detection, including DM-RS detection, with respect to a part or an entirety of a signal or channel among DL control signals or data channels. Additionally, the terminal may determine that a second UL transmission resource is not a resource in the unlicensed band occupancy time of the BS through at least one of the terminal failing to receive or identify information relating to the channel occupancy time of the BS and a the terminal failing to receive or identify SFI information indicated by the DCI.

Similarly, the terminal may determine that the BS is occupying and using an unlicensed band when the terminal has received or has been provided with information relating to whether the BS occupies an unlicensed band via DCI transmitted through a DL group-common control channel or a DL control channel, or through detection, including DM-RS detection, with respect to a part or an entirety of a signal or a channel among DL control signals or data channels. Additionally, the terminal may determine that a second UL transmission resource is a resource in the unlicensed band occupancy time of the BS through at least one of a case where the terminal has received or has been provided with information relating to channel occupancy time of the BS and a case where the terminal has received or has been provided with SFI information indicated via DCI.

Figure 14:
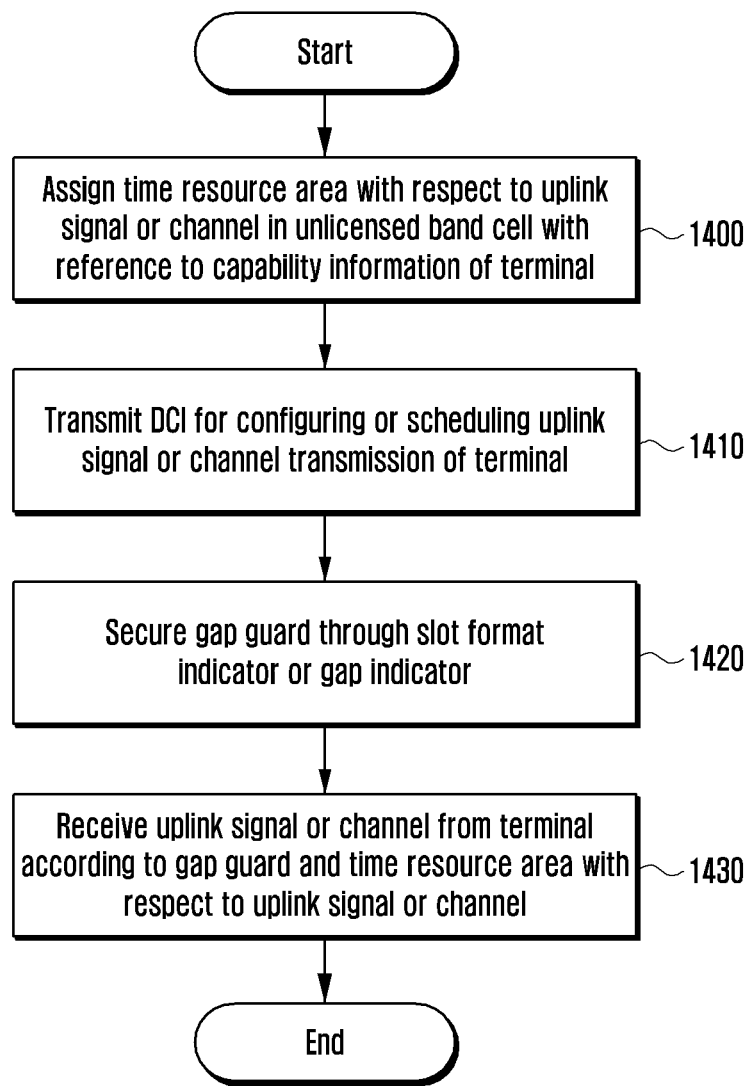
FIG. 14 is a flowchart illustrating base station operations for determining a time resource assignment area in wireless communication system according to an embodiment.

FIG. 14 is a flowchart illustrating BS operations for determining a time resource area and a gap guard of a UL signal or channel in a wireless communication system according to an embodiment.

Referring to FIG. 14, in step 1400, a BS determines one or more UL channel access procedure types that can be used by a terminal in an unlicensed band cell, one or more UL signal or channel transmission starting positions, the number of PDSCH/PUSCHs or the number of slots configurable by one piece of DCI, a gap guard, etc., according to capability information of the terminal. In addition, the BS may determine configuration information for UL signal or channel transmission via the unlicensed band by the terminal, in consideration of at least one piece of the above information and configure the same for the terminal. In this case, without capability information of the terminal, one or more UL channel access procedure types that can be used by the terminal in the unlicensed band cell, one or more UL signal or channel transmission starting positions, the number of PDSCH/PUSCHs or the number of slots configurable by one piece of DCI, a gap guard, etc., may be predefined. The information on a UL channel access procedure type, a UL signal or channel starting position, the number of PDSCH/PUSCHs or the number of slots configurable by one piece of DCI, a gap guard, etc., may be independent according to unlicensed band frequency or national or regional regulations.

In step 1410, the base station may transmit DCI for configuration or scheduling uplink signal or channel transmission of the terminal and receive, in step 1430, an uplink signal or channel transmitted by the terminal at the configured or scheduled position. In this case, the terminal may also configure or schedule at least one uplink signal or channel transmissions in at least one slot via DCI. If the base station determines that configuration for a gap guard is required in the uplink signal or channel transmission slot of the configured or scheduled terminal, the base station may transmit the determined gap guard position information to the terminal according to various embodiments, in step 1420. The base station which has transmitted, in step 1420, the gap guard information to the terminal may receive, in step 1430, the uplink signal or channel transmitted by the terminal according to the configured or scheduled information in step 1410 and the gap guard information in step 1420.

Figure 15:
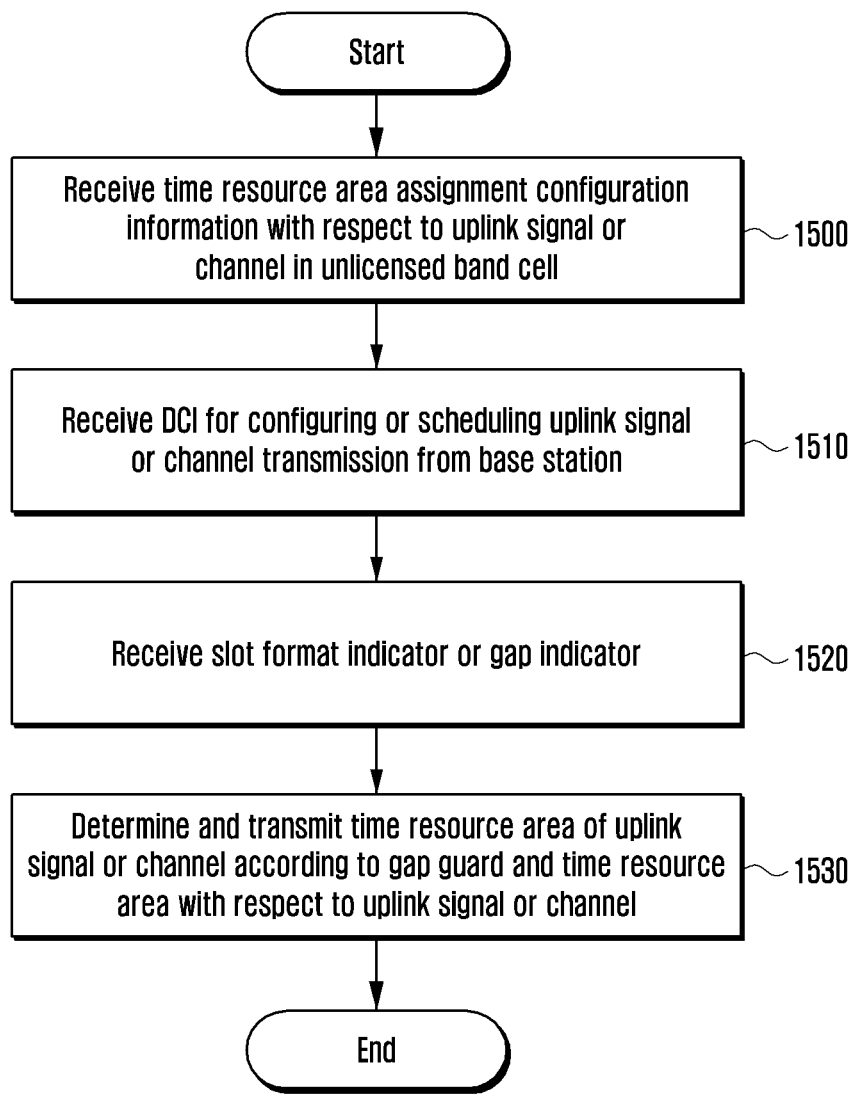
FIG. 15 is a flowchart illustrating terminal operations for determining a time recourse assignment area in a wireless communication system according to an embodiment.

FIG. 15 is a flowchart illustrating terminal operations for determining a time resource area and a gap guard of a UL signal or channel in a wireless communication system according to an embodiment.

Referring to FIG. 15, in or before step 1500, the terminal may transmit capability information including one or more UL channel access procedure types which can be used by the terminal in an unlicensed band cell, one or more UL signal or channel transmission starting positions, the number of PDSCH/PUSCHs or the number of slots configurable by one piece of DCI, a gap guard, and etc., to the BS. Without transmitting the capability information including the information, one or more UL channel access procedure types which can be used by the terminal in an unlicensed band cell, one or more UL signal or channel transmission starting positions, the number of PDSCH/PUSCHs or the number of slots configurable by one piece of DCI, a gap guard, etc., can be predefined. In addition, the information on a UL channel access procedure type, a UL signal or channel transmission starting position, the number of PDSCH/PUSCHs or the number of slots configurable by one piece of DCI, a gap guard, etc., may be independent according to unlicensed band frequency or national or regional regulations.

In step 1500, the terminal receives configuration information on one or more UL channel access procedure types with respect to UL signal or channel transmission, one or more UL signal or channel transmission starting positions, the number of PDSCH/PUSCHs or the number of slots configurable by one piece of DCI, and a gap guard, from the BS. From the configuration information, the terminal may determine the size of a UL channel access procedure type indicator field of DCI, a UL signal or channel transmission starting position indicator field, an indicator for the number of PDSCH/PUSCHs or the number of slots configurable by one piece of DCI, a gap indicator, etc.

In step 1510, the terminal receives DCI for configuring or scheduling UL signal or channel transmission.

In step 1520, the terminal receives at least one piece of DCI among group common DCI including the received DCI, a SFI, channel occupancy time information of the BS, or gap indicator information. The terminal having received the DCI may determine at least one of the length of a gap guard and whether a gap guard exists in UL signal or channel transmission slot configured or scheduled by a method according to various embodiments.

In step 1530, the terminal determines the gap guard or the time resource area of the UL signal or channel, etc., received in step 1520, and transmits the UL signal or channel according to the determined result.

In the disclosure, although expressions, such as "greater than or equal to" and "less than or equal to," have been used in order to determine whether or not a specific condition (or criterion) is fulfilled, these are merely examples and do not exclude the expressions "greater than", "less than", etc. A condition described as the expression "greater than or equal to" can be replaced by the expression "greater than", and a condition described as the expression "less than or equal to" can be replaced by the expression "less than".

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

The programs may be stored in an attachable storage device which may access the electronic device through communication networks such as the Internet, intranet, a local area network (LAN), a WLAN, and a storage area network (SAN) or a combination thereof. Such a storage device may access the electronic device via an external port. Further, a separate storage device on the communication network may access a portable electronic device.

In the above-described detailed embodiments, elements are expressed in singular or plural forms according to presented detailed embodiments. However, the singular forms or plural forms are selected for the convenience of description, and the disclosure is not limited by elements expressed in the singular or the plural. Therefore, either an element expressed in the plural may also include a single element or an element expressed in the singular may also include multiple elements.

The embodiments of the disclosure described and shown above and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, Embodiments 1, 2, 3 and 4 may be employed in combination, as necessary. For example, the methods provided in the disclosure above may be partially combined to operate a BS and a terminal. Further, although the above embodiments have been described by way of the 5G and NR systems, other variants based on the technical idea of the embodiments may be implemented in other systems such as the LTE, LTE-A, and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, downlink control information (DCI) including an indicator associated with an uplink transmission in a channel occupancy time (COT);
    identifying whether an uplink resource associated with a configured grant for an uplink signal is allocated within the COT;
    identifying a configuration for a symbol corresponding to the uplink resource based on at least one of a higher layer signaling or a slot format indicator (SFI) in the DCI, in response to the indicator allowing the uplink transmission in the COT and the uplink resource being allocated outside the COT; and
    transmitting, to the base station, the uplink signal on the uplink resource outside the COT, in response to the symbol corresponding to the uplink resource being available for an uplink transmission based on the identified configuration.

2. The method of claim 1, wherein the symbol corresponding to the uplink resource is identified as available for an uplink transmission, in response to the configuration indicating uplink or flexible for the symbol.

3. The method of claim 1, further comprising receiving, from the base station, a system information block (SIB) including the configuration.

4. The method of claim 1, wherein the uplink signal is transmitted, in response to the configuration not being provided and the indicator allowing the uplink transmission in the COT.

5. The method of claim 1, wherein the uplink signal is not transmitted, in response to the indicator not allowing the uplink transmission in the COT, the configuration not being provided, and the uplink resource being allocated outside the COT.

6. A terminal in a wireless communication system, the terminal comprising:
    a transceiver configured to transmit and receive a signal; and
    a controller coupled with the transceiver and configured to:
        receive, from a base station, downlink control information (DCI) including an indicator associated with an uplink transmission in a channel occupancy time (COT),
        identify whether an uplink resource associated with a configured grant for an uplink signal is allocated within the COT,
        identify a configuration for a symbol corresponding to the uplink resource based on at least one of a higher layer signaling or a slot format indicator (SFI) in the DCI, in case that the indicator allows the uplink transmission in the COT and the uplink resource is allocated outside the COT, and
        transmit, to the base station, the uplink signal on the uplink resource outside the COT, in case that the symbol corresponding to the uplink resource is available for an uplink transmission based on the identified configuration.

7. The terminal of claim 6, wherein the symbol corresponding to the uplink resource is identified as available for the uplink transmission, in case that the configuration indicates uplink or flexible for the symbol.

8. The terminal of claim 6, wherein the controller is further configured to receive, from the base station, a system information block (SIB) including the configuration.

9. The terminal of claim 6, wherein the uplink signal is transmitted, in case that the configuration is not provided and the indicator allows the uplink transmission in the COT.

10. The terminal of claim 6, wherein the uplink signal is not transmitted, in case that the indicator does not allow the uplink transmission in the COT, the configuration is not provided, and the uplink resource is allocated outside the COT.

11. A method performed by a base station in a wireless communication system, the method comprising:
    transmitting, to a terminal, downlink control information (DCI) including an indicator associated with an uplink transmission in a channel occupancy time (COT); and
    receiving, from the terminal, an uplink signal on an uplink resource outside the COT, in response to the indicator allowing the uplink transmission in the COT, the uplink resource being allocated outside the COT, and a symbol corresponding to the uplink resource being available for an uplink transmission,
    wherein the uplink resource is associated with a configured grant, and
    wherein a configuration for the symbol corresponding to the uplink resource is provided to the terminal based on at least one of higher layer signaling or a slot format indicator (SFI) in the DCI.

12. The method of claim 11, wherein the symbol corresponding to the uplink resource is identified as available for an uplink transmission, in response to the configuration indicating uplink or flexible for the symbol.

13. The method of claim 11, further comprising transmitting, to the terminal, a system information block (SIB) including the configuration.

14. The method of claim 11, wherein the uplink signal is received, in response to the configuration not being provided to the terminal and the indicator allowing the uplink transmission in the COT.

15. The method of claim 11, wherein the uplink signal is not received, in response to the indicator not allowing the uplink transmission in the COT, the configuration not being provided to the terminal, and the uplink resource being allocated outside the COT.

16. A base station (BS) in a wireless communication system, the BS comprising:
    a transceiver configured to transmit and receive a signal; and a controller coupled with the transceiver and configured to:
- transmit, to a terminal, downlink control information (DCI) including an indicator associated with an uplink transmission in a channel occupancy time (COT); and
- receive, from the terminal, an uplink signal on an uplink resource outside the COT, in case that the indicator allows the uplink transmission in the COT, the uplink resource is allocated outside the COT, and a symbol corresponding to the uplink resource is available for an uplink transmission, wherein the uplink resource is associated with a configured grant, and wherein a configuration for the symbol corresponding to the uplink resource is provided to the terminal based on at least one of higher layer signaling or a slot format indicator (SFI) in the DCI.

17. The BS of claim 16, wherein the symbol corresponding to the uplink resource is identified as available for an uplink transmission, in case that the configuration indicates uplink or flexible for the symbol.

18. The BS of claim 16, wherein the controller is further configured to transmit, to the terminal, a system information block (SIB) including the configuration.

19. The BS of claim 16, wherein the uplink signal is received, in case that the configuration is not provided to the terminal and the indicator allows the uplink transmission in the COT.

20. The BS of claim 16, wherein the uplink signal is not received, in case that the indicator does not allow the uplink transmission in the COT, the configuration is not provided to the terminal, and the uplink resource is allocated outside the COT.

* * * * *